US007307667B1

(12) United States Patent
Yeh et al.

(10) Patent No.: US 7,307,667 B1
(45) Date of Patent: Dec. 11, 2007

(54) METHOD AND APPARATUS FOR AN INTEGRATED HIGH DEFINITION TELEVISION CONTROLLER

(75) Inventors: Gerard Yeh, Redwood City, CA (US); David Auld, San Jose, CA (US); Jackson F. Lee, Palo Alto, CA (US); Joseph Cesana, Palo Alto, CA (US); Hsiang O-Yang, Santa Clara, CA (US); Xianliang Zha, Folsom, CA (US); Zeljko Markovic, San Francisco, CA (US)

(73) Assignee: Zoran Corporation, Sunnyvale, CA (US)

( * ) Notice: Subject to any disclaimer, the term of this patent is extended or adjusted under 35 U.S.C. 154(b) by 363 days.

(21) Appl. No.: 10/880,201

(22) Filed: Jun. 28, 2004

Related U.S. Application Data

(60) Provisional application No. 60/482,921, filed on Jun. 27, 2003, provisional application No. 60/438,322, filed on Jun. 27, 2003, provisional application No. 60/483,048, filed on Jun. 27, 2003, provisional application No. 60/483,049, filed on Jun. 27, 2003, provisional application No. 60/483,323, filed on Jun. 27, 2003.

(51) Int. Cl.
*H04N 5/46* (2006.01)
*H04N 5/907* (2006.01)
(52) U.S. Cl. ................. 348/555; 348/554; 348/715; 348/714; 348/567; 345/542; 345/541
(58) Field of Classification Search ........... 348/554, 348/555, 714, 715, 716, 720, 721, 719, 718, 348/571, 567; 345/542, 519, 541
See application file for complete search history.

(56) References Cited

U.S. PATENT DOCUMENTS

| | | | | |
|---|---|---|---|---|
| 4,602,275 A | * | 7/1986 | Smith et al. | 348/450 |
| 4,760,525 A | * | 7/1988 | Webb | 712/2 |
| 5,068,650 A | * | 11/1991 | Fernandez et al. | 345/547 |
| 5,790,138 A | * | 8/1998 | Hsu | 345/542 |
| 6,247,084 B1 | * | 6/2001 | Apostol et al. | 710/108 |
| 6,526,583 B1 | * | 2/2003 | Auld et al. | 725/139 |
| 6,570,579 B1 | * | 5/2003 | MacInnis et al. | 345/629 |
| 6,717,583 B2 | * | 4/2004 | Shimomura et al. | 345/542 |
| 6,839,063 B2 | * | 1/2005 | Nakatsuka et al. | 345/534 |
| 6,853,385 B1 | * | 2/2005 | MacInnis et al. | 345/629 |
| 6,864,896 B2 | * | 3/2005 | Perego | 345/542 |
| 6,885,378 B1 | * | 4/2005 | Tsai et al. | 345/557 |
| 7,106,339 B1 | * | 9/2006 | Grindstaff et al. | 345/543 |
| 7,110,006 B2 | * | 9/2006 | MacInnis et al. | 345/629 |
| 7,171,521 B2 | * | 1/2007 | Rowlands et al. | 711/141 |
| 7,243,172 B2 | * | 7/2007 | Oner et al. | 710/66 |
| 2006/0294324 A1 | * | 12/2006 | Chang et al. | 711/154 |

* cited by examiner

*Primary Examiner*—David Ometz
*Assistant Examiner*—Jean W. Désir
(74) *Attorney, Agent, or Firm*—Blakely Sokoloff Taylor & Zafman LLP

(57) ABSTRACT

A method and an apparatus for an integrated high definition television controller are described. The integrated high definition digital television controller includes two or more the following functions in a single chip: MPEG2 Transport, Audio and Video Decoders, Video input capture and converter, flexible video scan rate converter, de-interlace processor, display controller and video D/A converters, graphics controller, a unified local bus, N-plane alpha blending, a warping engine, audio digital signal processor, disk drive interface, peripheral bus interfaces, such as PCI bus and local bus interfaces, various I/O peripherals, a bus bridge with a partitioned chip, and a CPU with caches. The integrated controller, in one embodiment, is designed to handle multiple television standards (for example ATSC, ARIB, DVB, AES, SMPTE, ITU) and designed to be deployed in various countries in the world.

35 Claims, 34 Drawing Sheets

(Read Data Conversion)

(Write Data Conversion)

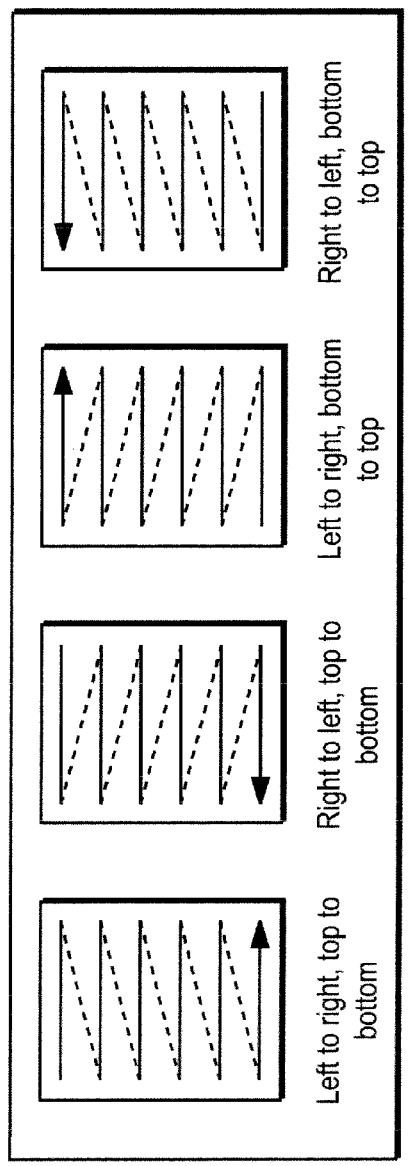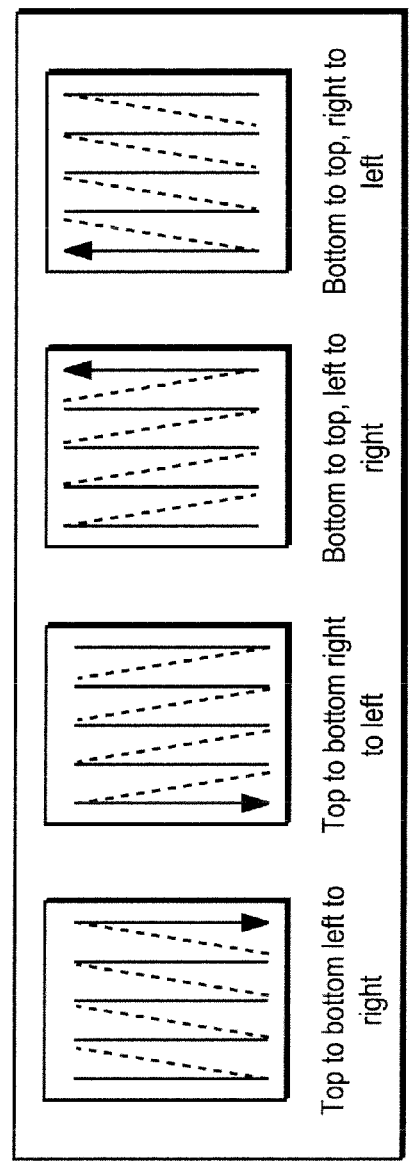
FIG. 27A
FIG. 27B

METHOD AND APPARATUS FOR AN INTEGRATED HIGH DEFINITION TELEVISION CONTROLLER

REFERENCE TO RELATED APPLICATIONS

The present invention is related to, and claims the benefit of U.S. Provisional Patent Applications No. 60/482,921, 60/438,322, 60/483,048, 60/483,049, and 60/483,323, all filed on Jun. 27, 2003, and incorporates all of those applications in their entirety.

FIELD OF THE INVENTION

This disclosure relates generally to television controllers, and in particular relates to integrated high definition television controllers.

BACKGROUND OF THE INVENTION

As television systems are gradually being outfitted with high definition capabilities, manufacturers are faced with the need to provide advanced functionality systems while minimizing cost. Conventional digital television controller systems incorporate multiple hardware processor chips. The use of separate chips increases overall system and production costs, leading to a higher cost for high definition television systems. Thus there is a need for a cost-effective platform for providing high definition television capability.

FIG. 1 illustrates a conventional digital television controller system incorporating multiple hardware processor chips. These processors typically include dedicated memory controller bridges to external memory storage. Control and synchronization among the various processor units is achieved using one or many control buses connected in various ways.

SUMMARY OF THE INVENTION

An integrated high definition digital television controller includes two or more the following functions in a single chip: MPEG2 Transport, Audio and Video Decoders, Video input capture and converter, flexible video scan rate converter, de-interlace processor, display controller and video D/A converters, graphics controller, a unified local bus, N-plane alpha blending, a warping engine, audio digital signal processor, disk drive interface, peripheral bus interfaces, such as PCI bus and local bus interfaces, various I/O peripherals, a bus bridge with a partitioned chip, and a CPU with caches. The integrated controller, in one embodiment, is designed to handle multiple television standards (for example ATSC, ARIB, DVB, AES, SMPTE, ITU) and designed to be deployed in various countries in the world.

BRIEF DESCRIPTION OF THE DRAWINGS

While the present invention is subject to various modifications and alternative forms, specific embodiments thereof have been shown by way of example in the drawings and will herein be described in detail. The present invention should be understood to not be limited to the particular forms disclosed, but on the contrary, the present intention is to cover all modifications, equivalents, and alternatives falling within the spirit and scope of the invention.

FIG. 27A shows examples of read and write pixel scanning order.

FIG. 27B shows examples of write pixel scanning order.

DETAILED DESCRIPTION

In the following description numerous specific details are set forth, such as specific examples of data signals, named components, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention. Thus, the specific details set forth are merely exemplary.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Overview of the Television Controller

Figure 2:
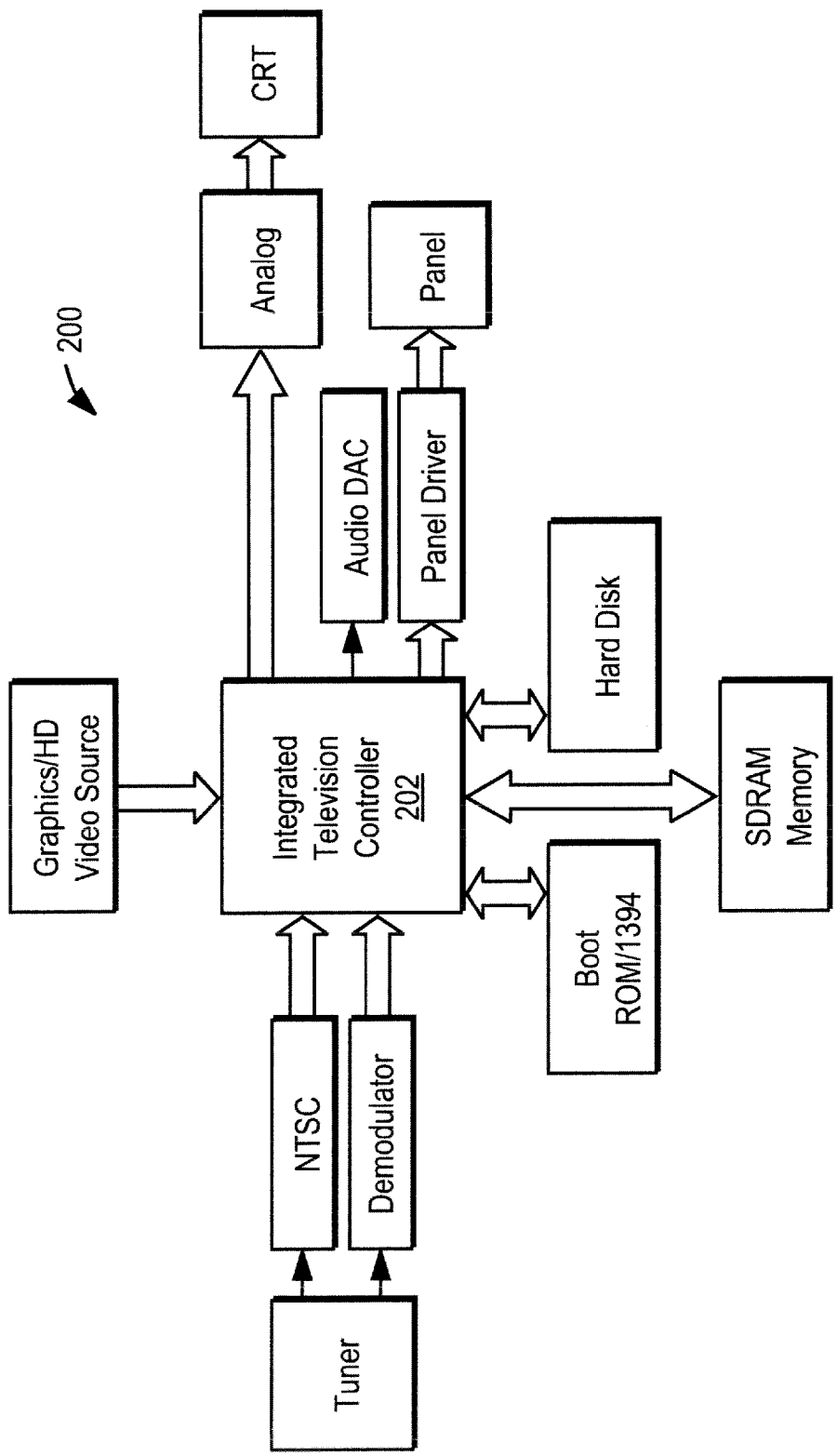
FIG. 2 is block diagram of one embodiment of an integrated digital television controller system.

As shown in FIG. 2, the present invention provides an integrated high definition digital television controller. In one embodiment, the integrated controller 202 includes the following functions: MPEG2 Transport, Audio and Video Decoders, Video input capture and converter, flexible video scan rate converter, de-interlace processor, display controller and video D/A converters, graphics controller, audio digital signal processor, disk drive interface, peripheral bus interfaces, such as PCI bus and local bus interfaces, various I/O peripherals and a CPU with caches. In one embodiment, the integrated controller is designed to handle multiple television standards (e.g. ATSC, ARIB, DVB, AES, SMPTE, ITU) and designed to be deployed in various countries in the world. Such a multiple HD-SD functionality with high quality graphics and audio is integrated into a single chip.

Figure 6:
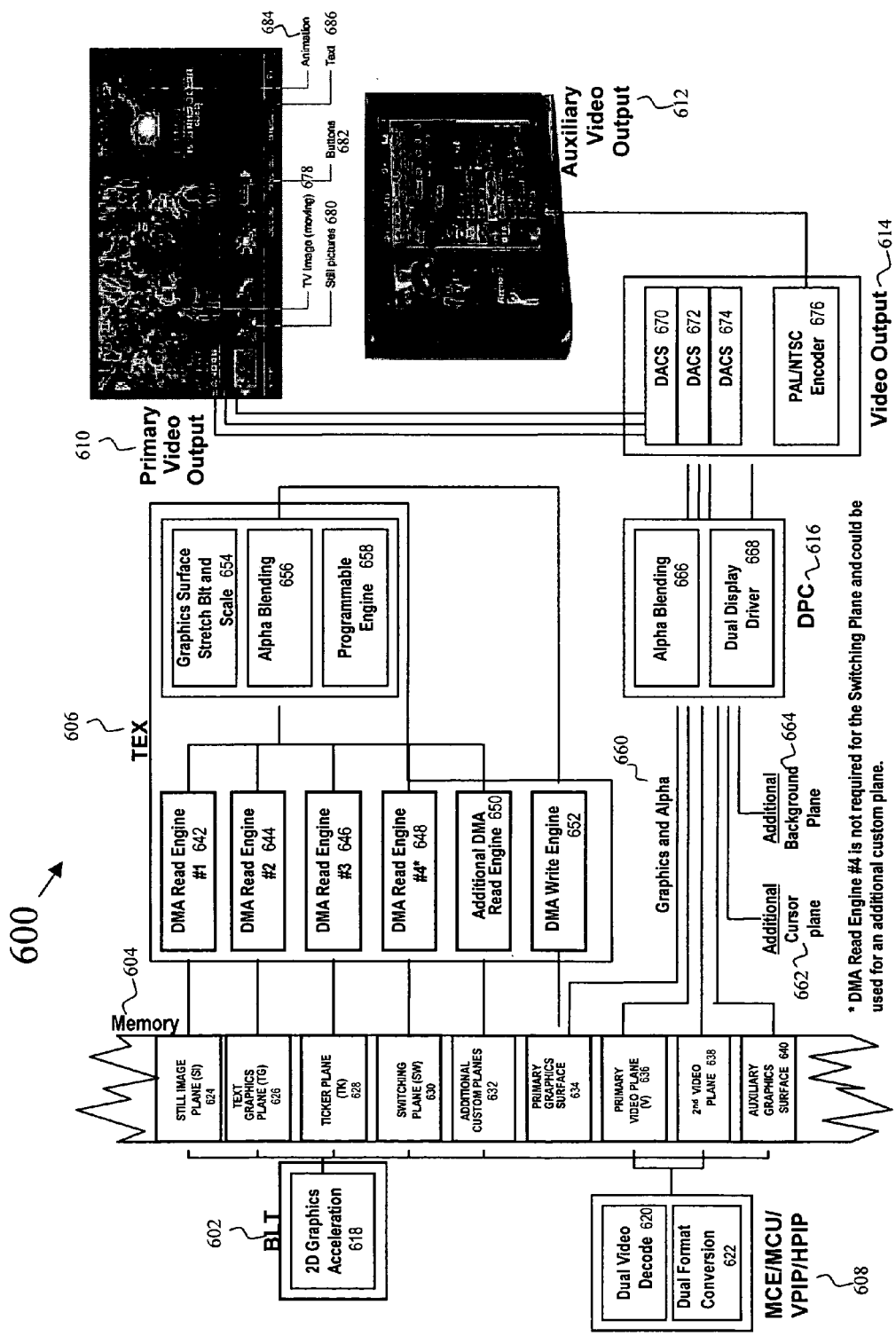
FIG. 6 is a block diagram of one embodiment of the memory allocation.

The development and concurrent executions of software, firmware and hardware tasks are used to achieve the television controller functions. The integration of hardware components and interfaces into a single chip allows for a cost effective implementation of the television controller systems. The highly complex system on chip must include and effective and efficient structure to handle control, synchronization, data flow, and ease of integration. Furthermore, this highly integrated chip must optimize real time tasks as well as batch process such as graphics rendering. A faster memory interface enables all functions to be processed around a unified memory. One embodiment of allocating this unified memory is shown in FIG. 6. CPU integration as well as other processing units such as video, graphics and other signal processing allows the multiple HD or SD video, high quality graphics, audio, and other data to be processed in a concurrent, shared, or cooperative manner in the unified memory, eliminating the need to copy or move data within the system.

Figure 1:
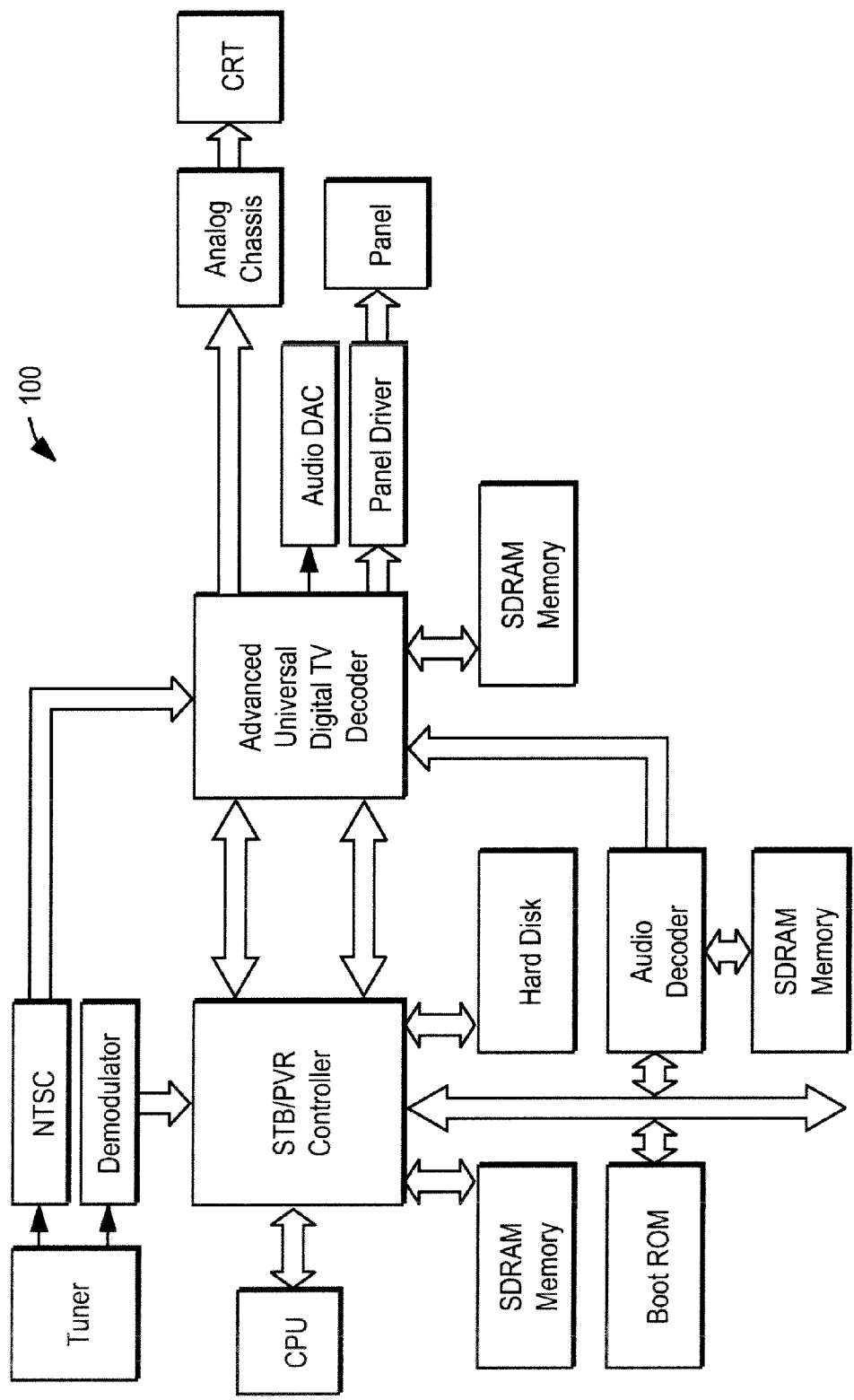
FIG. 1 shows an embodiment of a prior art digital television controller system.

FIG. 2 shows an embodiment of a digital television system 200 including the integrated controller 202 of the present invention. Compared to the conventional system 100 of FIG. 1, the STB/PVR and the display functions are integrated into a single chip 202. In one embodiment, integrated controller 202 includes a fast memory interface, which enables functions to be processed around a unified memory. Integrated controller 202 includes an integrated central processing unit (CPU) as well as other processing units such as a graphics processor and a signal processor. The integrated controller 202 allows for multiple high definition (HD), standard definition (SD) video, high quality graphics, and audio.

Figure 3:
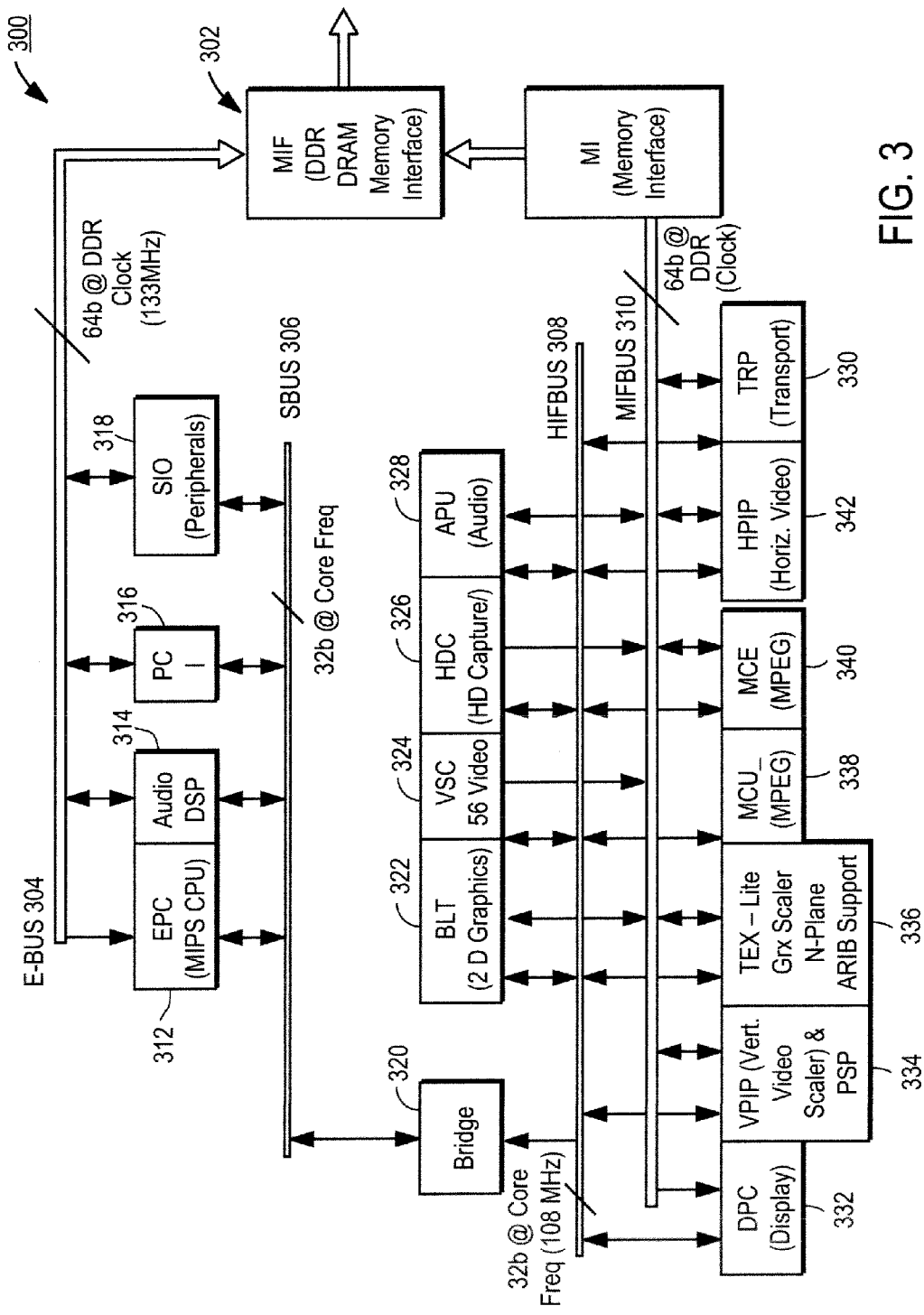
FIG. 3 is a block diagram of one embodiment of the integrated television controller.
Figure 4:
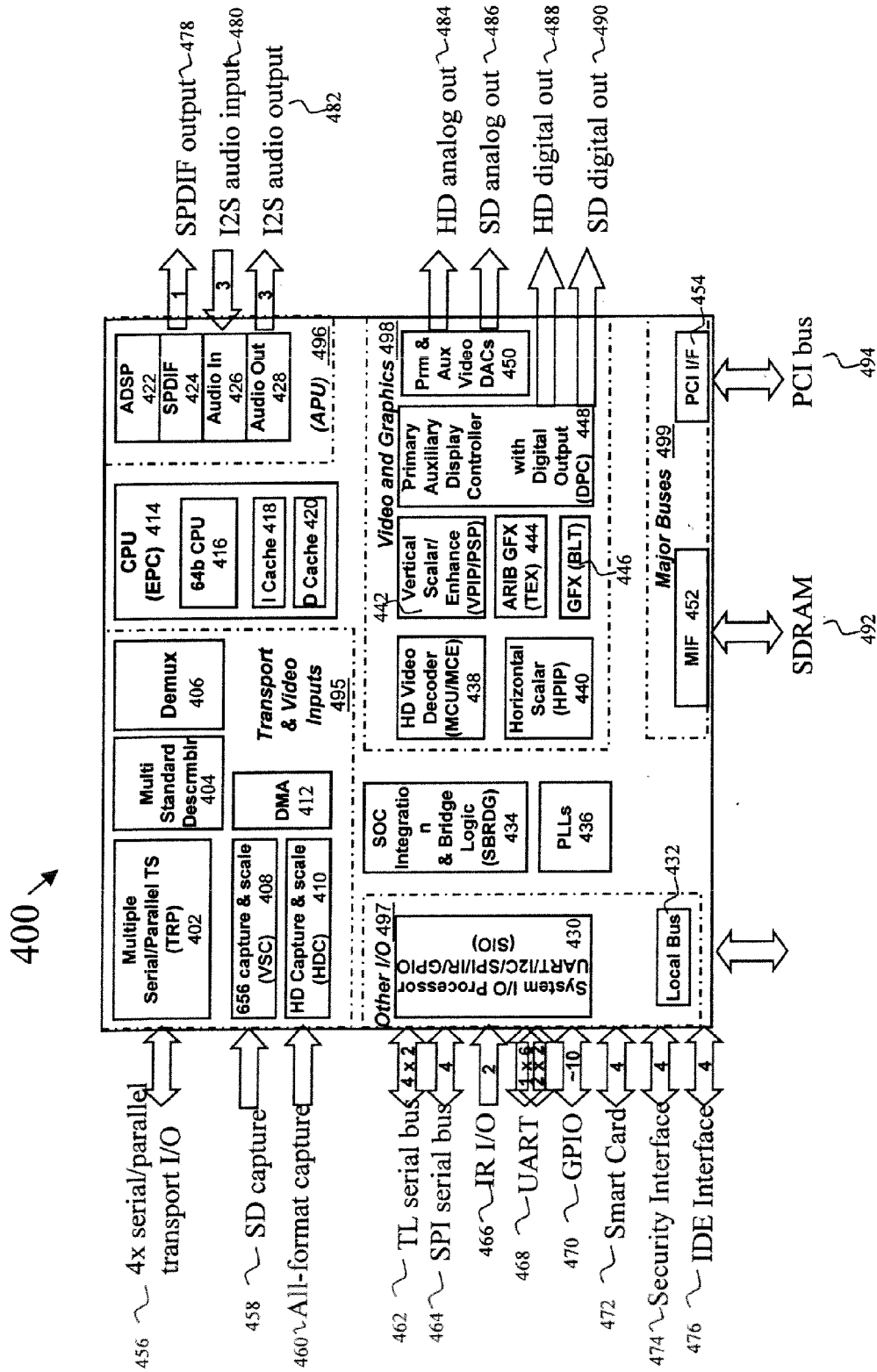
FIG. 4 is a block diagram of one embodiment of external interfaces of the integrated television controller.

FIG. 3 illustrates a block diagram of an embodiment of integrated controller 202. The memory bus architecture is designed to take advantage of the nature of the clients. EBUS 304 includes clients with low bandwidth, low latency requirements. For example, in one embodiment, EBUS 304 handles the cache line refill requests from the CPU 312, since although lines are small in terms of size, refilling the cache needs to occur quickly for the CPU 312 to resume operation after a cache miss.

The internal bus architecture of the integrated controller 300 is designed around multiple protocols. The SBUS 306 and HBUS 308 (also referred to as HIFBUS) enable internal resource accesses for elements that have a low latency tolerance and request that are low bandwidth. The EBUS 304 enables low latency accesses with low bandwidth, and the MIFBUS 310 is used for elements that tolerate high latency, and require high bandwidth. In one embodiment, the HBUS is used to couple processing elements within the integrated controller 300. In one embodiment, the SBUS 306 is used to couple control elements or bus masters within the integrated controller 300. Thus the HBUS and SBUS run at core clock frequencies.

In one embodiment, EBUS 304 is a 64 bit bus at a 133 MHz clock speed. In one embodiment, SBUS 306 is a 32 bit bus at 108 MHz clock speed. In one embodiment, HBUS 308 is a 108 MHz 32 bit bus. In one embodiment, MIFBUS 310 is a 64 bit DDR SDRAM at a 133 MHz clock speed. EBUS and MIFBUS are connected to a 64 bit DDR SDRAM memory bus through the memory controller interface.

A bus bridge 320 translates different system bus protocols, and enables the functional partitioning of the chip. Arbitration for accesses is designed according to multiple priority levels to provide high efficiency of the internal resource accesses. In one embodiment, an interrupt controller (not shown) that can re-direct any interrupt in the system to any interrupt handler on or off-chip may be used with the present system. In one embodiment, the interrupt controller resides in the SBUS bridge 320 and provides full flexibility to software for uniformly distributing the interrupt software routine among PCI external master, ADSP, EPC and SIO.

Memory performance and high bandwidth are important for a high definition system with high quality graphics. In one embodiment, low latency is provided for by scheduling transactions at a very fine granularity. Memory access efficiency is provided for by the partitioning of the memory clients according to the block diagram bus architecture as illustrated in FIG. 3, in one embodiment. By partitioning the chip, bus arbitration is simplified, and memory access efficiency is improved. Internal memory interface arbitration and dynamic scheduling provide a high performance system.

Because this architecture is designed around multiple system masters, in one embodiment, control operation and synchronization are handled at software level by means of semaphore message passing programming mechanisms. In addition, real-time timers are used, in one embodiment, to allow the recovery execution of programs. In case of bad execution or loss of program pointer, in one embodiment a multi level real time counter interrupts the CPU, enabling a program recovery without re-booting the complete system.

Figure 7:
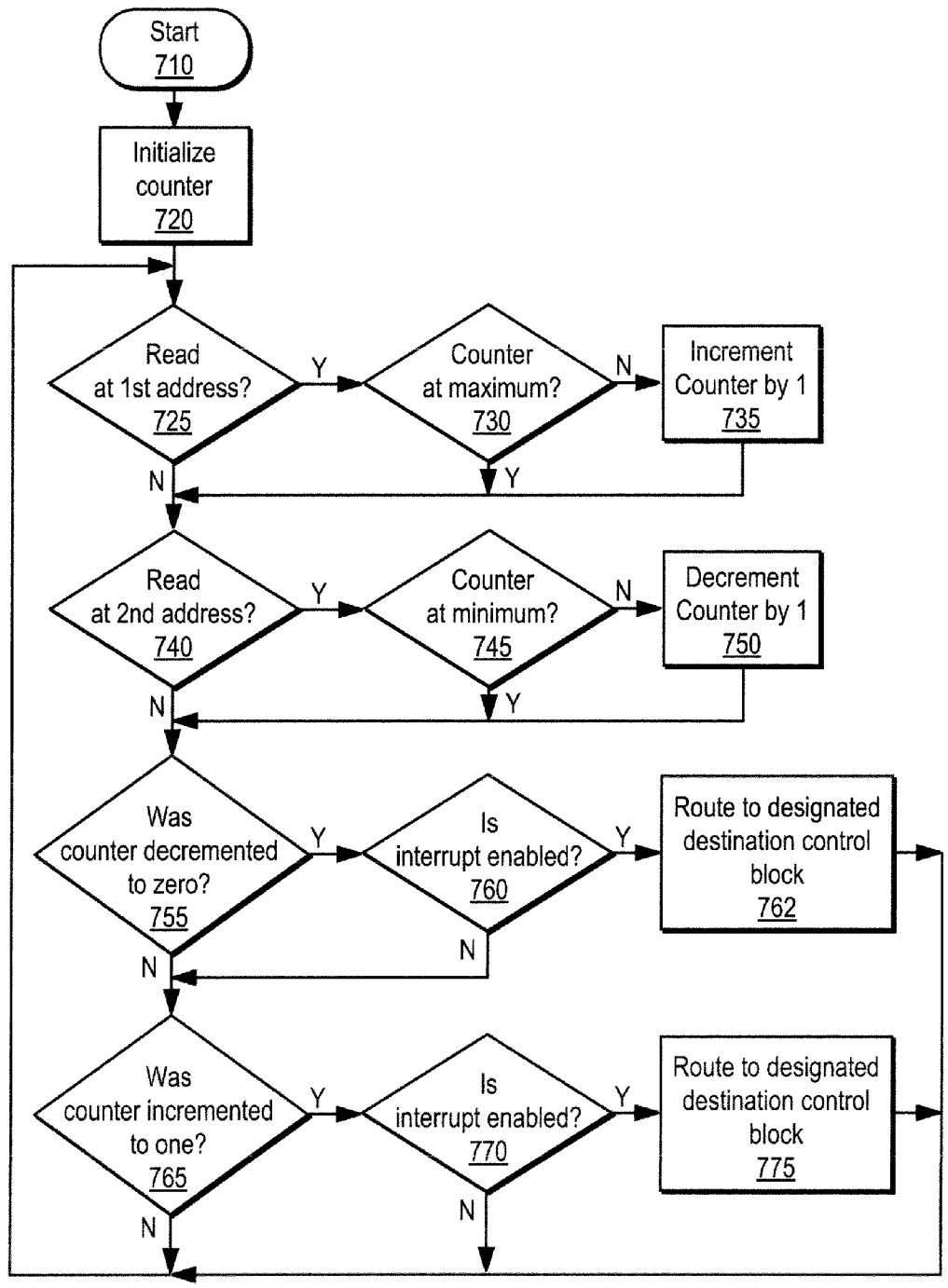
FIG. 7 is a flowchart of one embodiment of the synchronization programming mechanism using counters.

To support these synchronization programming mechanisms, in one embodiment, special synchronization hardware is designed into the SBRDG unit. FIG. 7 is a flowchart of one embodiment of the synchronization programming mechanisms that may be used. In one embodiment, each synchronization hardware primitive is a signed binary counter. There are three operations associated with each counter. First, the value of register can be written, or initialized (block 720). In one embodiment, the counter has a signed value, i.e. the counter may have a positive or a negative value. In one embodiment, the counter stores a 10 bit signed number. Second, when a read to the counter is detected at a first address (725), it will produce the value of counter and increment the counter by 1 (block 735). Third, when a read operation to the second address of the counter is detected (block 740) will produce the value of the counter and decrement the counter by 1 (block 750). Whether incrementing or decrementing, counter wrapping is not allowed (blocks 730, 745). When the counter is at the maximum value, further read-increment operations will have no effect on the counter value. When the counter is at the minimum value, further read-decrement operations will have no effect on the counter value. In one embodiment, two interrupts are provided. First type of interrupt is for counter decrementing to zero (block 755). The second interrupt is caused by counter incrementing above zero (block 765). In another embodiment, these interrupts may be set at any other value. Each of these interrupts may be routed to a destination control block (block 762, 775). In one embodiment, the destination control block to which the interrupt is routed is programmable.

As an example of synchronization programming mechanism, the synchronization counter value can be initialized to a positive number such as 2 by the counter write operation (block 720). This number, 2, represents the number of concurrent jobs that must finish before the system can proceed to a subsequent task. Furthermore, these two predecessor tasks are executed on two different control blocks, such as EPC (CPU) and ADSP (Digital Signal Processor). When a predecessor task finishes, the synchronization counter is decremented (block 750). When the second predecessor task finishes, the synchronization counter will be decremented (block 750), and the counter will reach zero. If the decrement-to-zero interrupt (block 755) associated with synchronization counter is enabled (block 760), the interrupt is triggered (block 762). The interrupt is routed to the destination control block (block 762), such as Super Input/Output (SIO), according to configuration. The successor task running on SIO can be launched. Synchronization of three tasks has been achieved with this mechanism.

Figure 5:
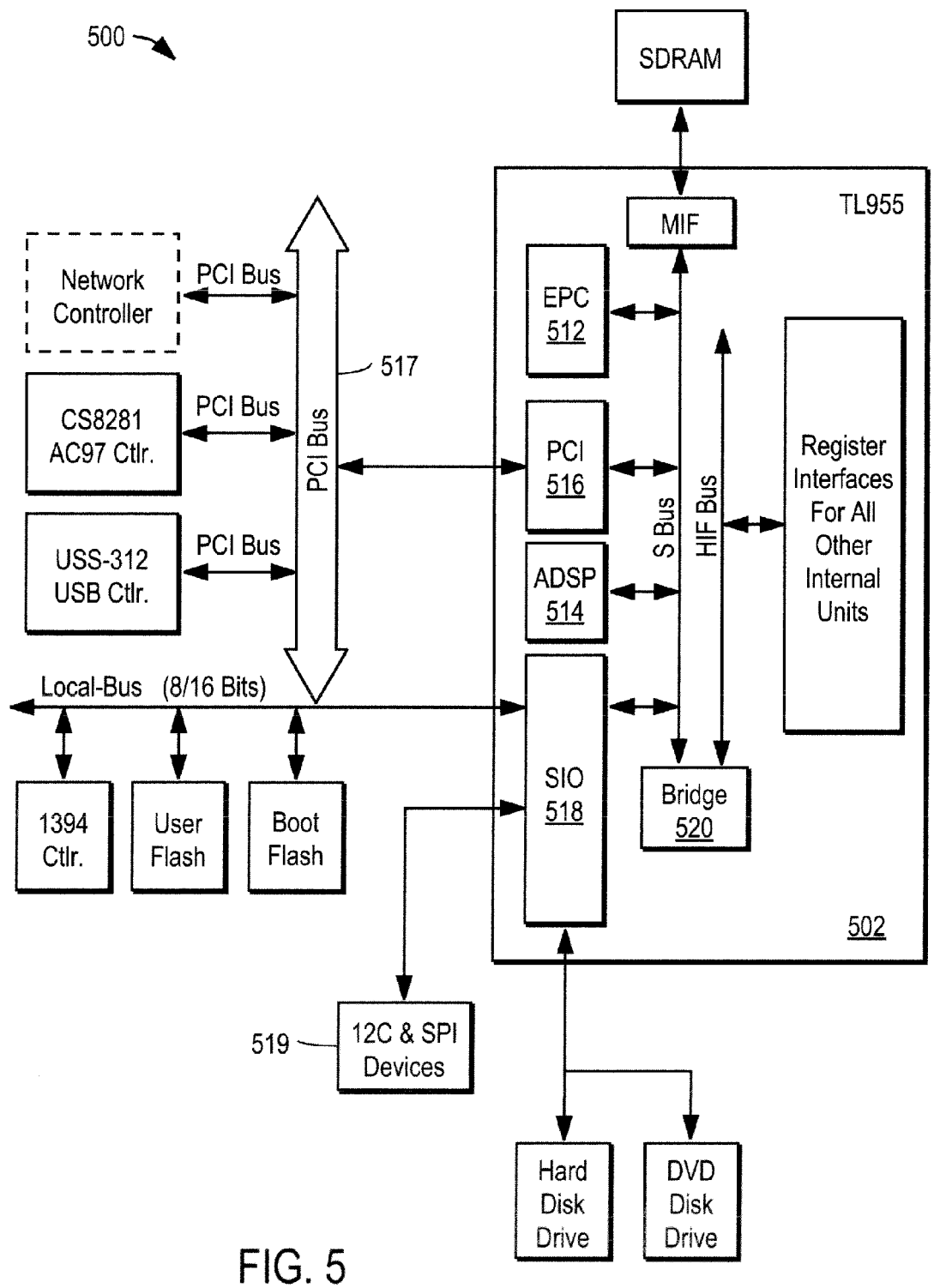
FIG. 5 is a block diagram of one embodiment of the control structure of the integrated television controller with external devices.

FIG. 5 is a block diagram of one embodiment of the control structure of the integrated television controller with external devices. Integrated controller 502 includes control blocks EPC 512, Audio DSP 514, PCI 516 and SIO 518. In one embodiment, the EPC block 512 includes an embedded CPU with caches. In one embodiment, the embedded CPU is a MIPS 64-bit CPU. The Audio DSP block 514 is the audio digital signal processing block with cache. In one embodiment, ADSP 514 provides support for Dolby AC3, AAC, MPEG1 Layer 2 and MP3.

The PCI block 516 is the interface unit to a PCI bus 517. PCI block 516 and interface includes an external PCI master controller which may issue commands or take interrupts through the PCI interface 516. The SIO block 518 includes a micro-controller to handle real-time tasks and to control the serial IOs 519, such as smart cards, $I^2C$, UARTs, infrared control receivers and transmitters, and other serial peripheral interface (SPI) devices. In one embodiment, SIO block 518 also provides copy protection through the AES (Advanced Encryption Standard) encryption/decryption algorithm before audio and video streams are stored on a hard disk 530.

EPC 512, ADSP 514, external PCI master 512 and SIO 518 are used to control and synchronize on-chip units or external hardware devices. In one embodiment, control register access, status register access, interrupt control, arbitration, synchronization, and memory access are available operations for EPC 512, ADSP 514, PCI 516 and SIO 518. In one embodiment, SIO 518 includes clock generation circuits, PLLs and clock dividers as well as power management.

In one embodiment, an interrupt controller to redirect interrupts in the system 500 to an interrupt handler on or off-chip is also provided. In one embodiment, the interrupt controller resides in the SBUS bridge 520 and provides flexibility to software for uniformly distributing the interrupt software routine among the PCI external master 516, ADSP 514, EPC 512 and SIO 518.

In one embodiment, specific functions, such as graphics unit, include link lists that off load the CPU from having to reprogram the unit upon each individual task. In one embodiment, the architecture of SOC 502 is designed around multiple system masters, which allows control operation and synchronization to be handled at a software level by means of semaphore message passing programming mechanisms.

In one embodiment, real time timers allow for robust recovery of CPU as embodied in the EPC block without rebooting the entire system. For example, in the case of a bad execution or loss of a program pointer of the CPU, the CPU enters into a faulty state, commonly known as "crashed." In on embodiment, a real time counter value is programmed by the CPU. When the real time counter value decrements to zero, an interrupt is generated for a control block. This control block can be the CPU. The interrupted control block, such as the CPU, will execute the real time counter interrupt handling routine. This interrupt handling routine can correct or clear the faulty state, enabling a program recovery without rebooting the entire system. Therefore, the digital television processing blocks can continue without interruption even as the CPU crashes and recovers automatically.

Referring again to FIG. 3, in one embodiment, EPC 312, Audio DSP 314, PCI 316 and SIO 318 are control blocks in the system 500 as described above with respect to FIG. 5. BLT 322, VSC 324, HDC 326, APU 328, DPC 332, VPI-PSP 334, TEX 336, MCU 338, MCE 340, HPIP 342, and TRP 330 are processing blocks within SOC 502.

In one embodiment, BLT 322 is a 2-D graphics accelerator that includes block transfer, multiple graphics pixel formats, blending and dithering operations. VSC 324 is a standard definition (Multi BT.656 format) video capture and scaling unit. HDC 326 is a flexible video format capturing and scaling unit capable of handling high-definition and standard-definition video. APU 328 is an audio processing unit. DPC 332 is a display controller which provides video and graphics scaling, blending multiple video and graphics regions, and dual video output rate capability. Dual video enables receiving different streams, one from high definition source and the other from a standard definition source. In one embodiment, DPC 332 includes a triple DAC (digital to analog converter) for high definition analog video signals. The high definition analog video signals include standards such as EIA-770.1-A, EIA-770.2-a, EIA-770.3-a, and VESA. In one embodiment, DPC 332 includes a second triple DAC (digital to analog converter) for the standard definition analog video signals. The standard definition analog video signals include composite, S-video, or RGB.

VPIP 334 and HPIP 342 provide vertical and horizontal scale factors from the native image. PSP 334 converts interlaced video frames into non-interlaced video frames. TEX 336 is a multi-plane blender and graphics scaler. The Texture Engine TEX 336, in one embodiment, may have multiple DMA read engines, as shown in FIG. 6. Each engine may be associated with a particular memory section in the unified memory.

Returning to FIG. 3, MCU 338 and MCE 340 concurrently decode a compressed bitstream into video. TRP 330 is a transport de-multiplexer with descrambling capabilities. These processing blocks consume the high-bandwidth processing associated with large or stream data types in the digital television controller system 300, including graphics, video, audio, compressed bitstreams.

The MCU 338 also is a control block that provides fine-grain control of the MCE block 340. In one embodiment, MCU 338 has the capability to access other processing blocks. The control blocks permit the processing units to fetch data from the SDRAM or a chip interface, and to output data to a chip interface or the SDRAM. The data is processed as they flow from the input to the output of a processing block. The memory control function is handled by the memory interface unit, MIF 302. The connections between EPC 312, ADSP 314, PCI 316, SIO 318 and processing block are handled by a bus bridge unit 320.

In one embodiment the processing blocks do not participate in control functions. Therefore, a simplified interface, HBUS 308, is used for uni-direction control programming from control blocks to the processing blocks. Interrupts from a processing block are sent into the control blocks via the Bridge unit 320. Because MCU 338 also can program processing blocks, the Bridge unit 320 can arbitrate transaction requests between EPC 312, ADSP 314, PCI 316, SIO 318, and MCU 338 to prevent access collision. The MCU 338 can transact on the HIFBUS 308 if a control block is accessing another control block using the SBUS 306.

The performance of the memory access is important for achieving the functions of a digital television controller system. The main performance measure for each of the processing blocks is bandwidth usually with a deadline constraint. To optimize for these performance parameters, a dedicated bus unit, MIFBUS 310, is used for processing block memory access operations. Memory accesses to local SDRAM memory are routed through MIFBUS 310 and optimized for high bandwidth and meeting deadline accesses in the memory interface block, MIF 302.

The integrated high-definition television controller of the present invention has various interfaces to handle other components needed to complete the television controller system. In one embodiment, a universal local bus is used to access certain external components.

Universal Local Bus

Universal local bus couples the integrated controller to external devices, in one embodiment. In one embodiment, the integrated controller is a system-on-a-chip (SOC). The local area bus is a multi-protocol bus, which handles various external devices with various protocols. In one embodiment, protocols are constructed from protocol building blocks, which simplify the addition of new device support.

Figure 8:
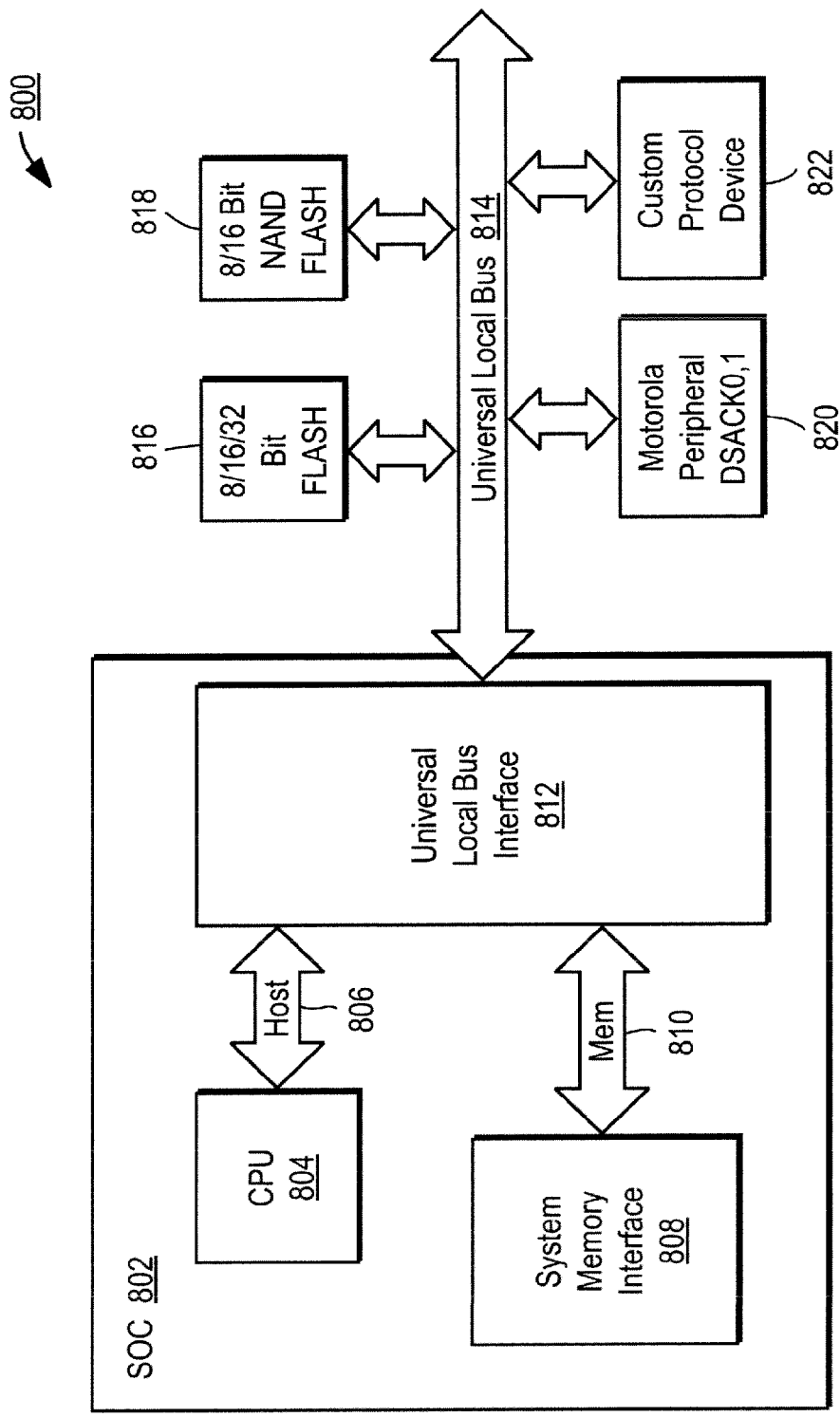
FIG. 8 is an overview block diagram of one embodiment of a local bus system.

FIG. 8 illustrates an embodiment of a local bus system 800. In one embodiment, local bus system 800 includes system-on-a-chip (SOC) 802, universal local bus 814, and devices 816, 818, 820 and 822. In one embodiment, SOC 802 is the integrated television controller. In one embodiment SOC 802 is an integrated circuit including a central processing unit (CPU) 804, a system memory interface 808, and universal local bus interface 812. On the host side, there are two main local bus access models 806 and 810. A "Direct Access" bus model 806 allows the external Host (CPU 804) to place read or write cycles in the address space mapped to the Local Bus address space. A "DMA Access" bus model 810 allows data to be directly transferred between a local bus device and the system memory.

Universal local bus interface 812 is a module on SOC 802, which interfaces peripheral devices 816, 818, 820 and 822 with SOC 802. The SOC 802 may need to interface with external peripheral devices with different bus protocols depending on the specific application. In one embodiment, devices 816, 818, 820 and 822 each have different protocols. In one embodiment, devices 816, 818, 820 and 822 are legacy devices having different protocols. For example, the devices may be controller chips for peripheral devices such as memory devices, storages devices, UARTs, modems, or I$^2$C devices, among others. For example, in one embodiment, device 816 is an 8/16/32 bit flash device, device 818 is an 8/16 bit NAND flash device, device 820 is a Motorola style peripheral DSACK(0,1) device, and device 822 has a custom protocol. In one embodiment, the devices may include an Atmel AM29C10 flash memory chip. The universal local bus interface 812 is able to dynamically change from one protocol to another.

Figure 9:
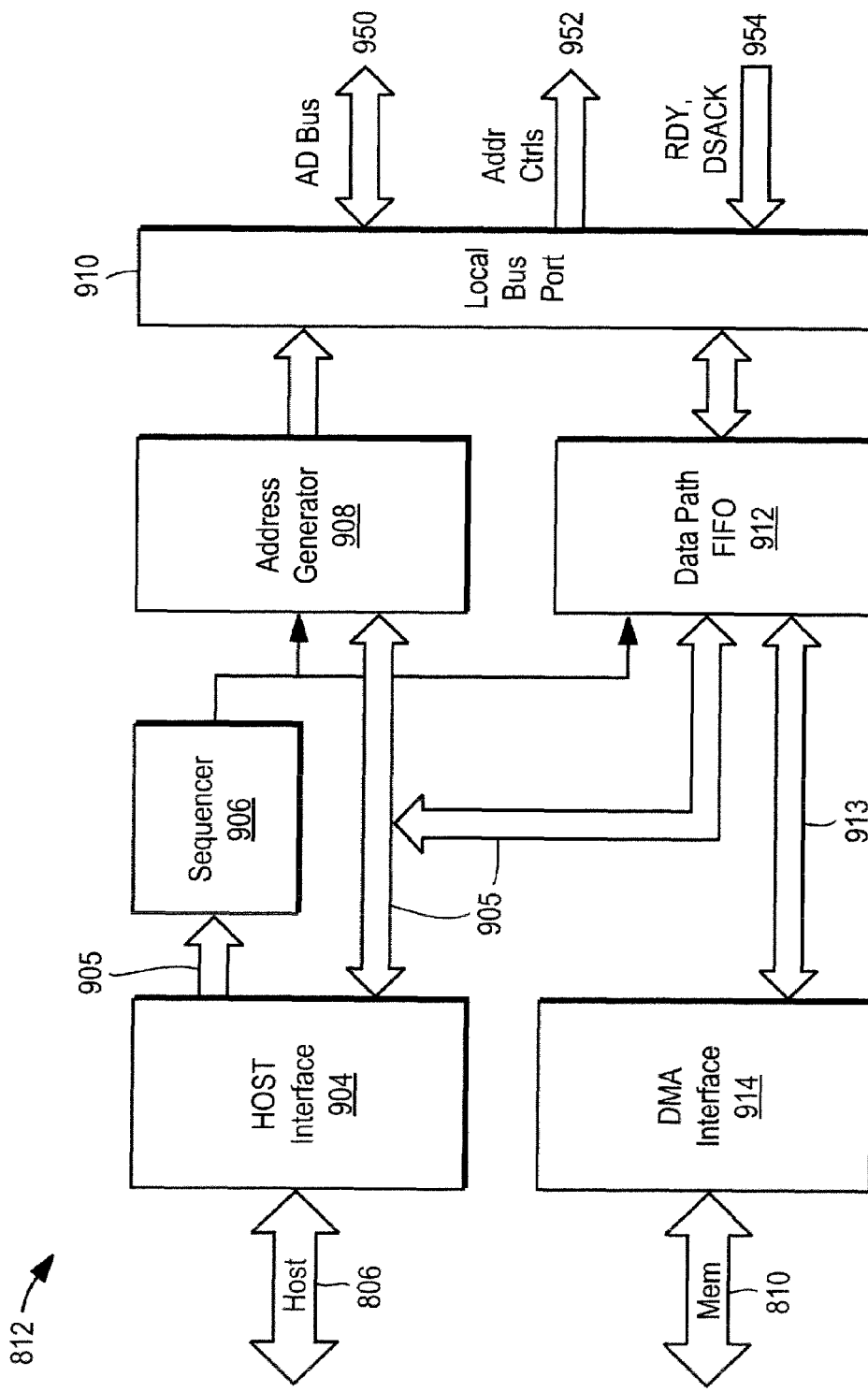
FIG. 9 is a block diagram of control flow for an embodiment of a universal local bus interface.

FIG. 9 is a block diagram of control flow for an embodiment of a universal local bus interface 812. In one embodiment, universal local bus interface 812 includes a host interface 904, sequencer 906, address generator 908, local bus port 910, data path FIFO logic 912, and DMA interface 914. The host interface 904 allows the Host CPU 804 of the SOC 802 to interface with the universal local bus interface 812 over host bus 905 to control read and write operations to the local devices 816, 818, 820, 822. For example, Host CPU 804 may program the DMA interface 914 to transfer N number of bytes from one of the peripheral devices to the system memory.

In one embodiment, DMA interface 914 interfaces the universal local bus interface 812 to the memory controller on the SOC 802. Local bus port 910 interfaces with the peripheral devices and Address Data Bus 950. Local bus port 910 provides Write Data signals, Address and Control signals 952, and receives Read Data signals, Ready and Data Size Acknowledge (DSACK) signals 954. Address generator 908 calculates the next local bus address. The next local bus address is either reloaded by the Host 804 or modified by a circuit which sequencer 906 controls by adding or subtracting a programmed offset value. An embodiment of the address generator 908 is described below with respect to FIG. 10.

In one embodiment, sequencer 906 executes an individual protocol by combining the elementary protocol building blocks of the supported protocols. In one embodiment, this is accomplished by deconstructing each protocol, and including the elementary instructions within the sequencer 906. For example, a custom protocol may be supported by including the elementary building blocks (instructions) required for that protocol within the sequencer 906. Sequencer 906 stores the elementary protocol building blocks in a program memory and is reprogrammable to combine them to interface with any device using any supported protocol. A protocol is supported if all of its elementary building blocks are supported. This simplifies verification of an SOC 802 including the universal local bus interface 812, since only the elementary building blocks are verified, instead of verifying an entire protocol for every specific supported device.

Data Path FIFO 912 module handles data stream between the local bus 814 and internal resources over Host bus 905 or DMA bus 913. Data Path FIFO 912 includes a Read Data Buffer and a Write Data Buffer, which are described in more detail below.

Figure 10:
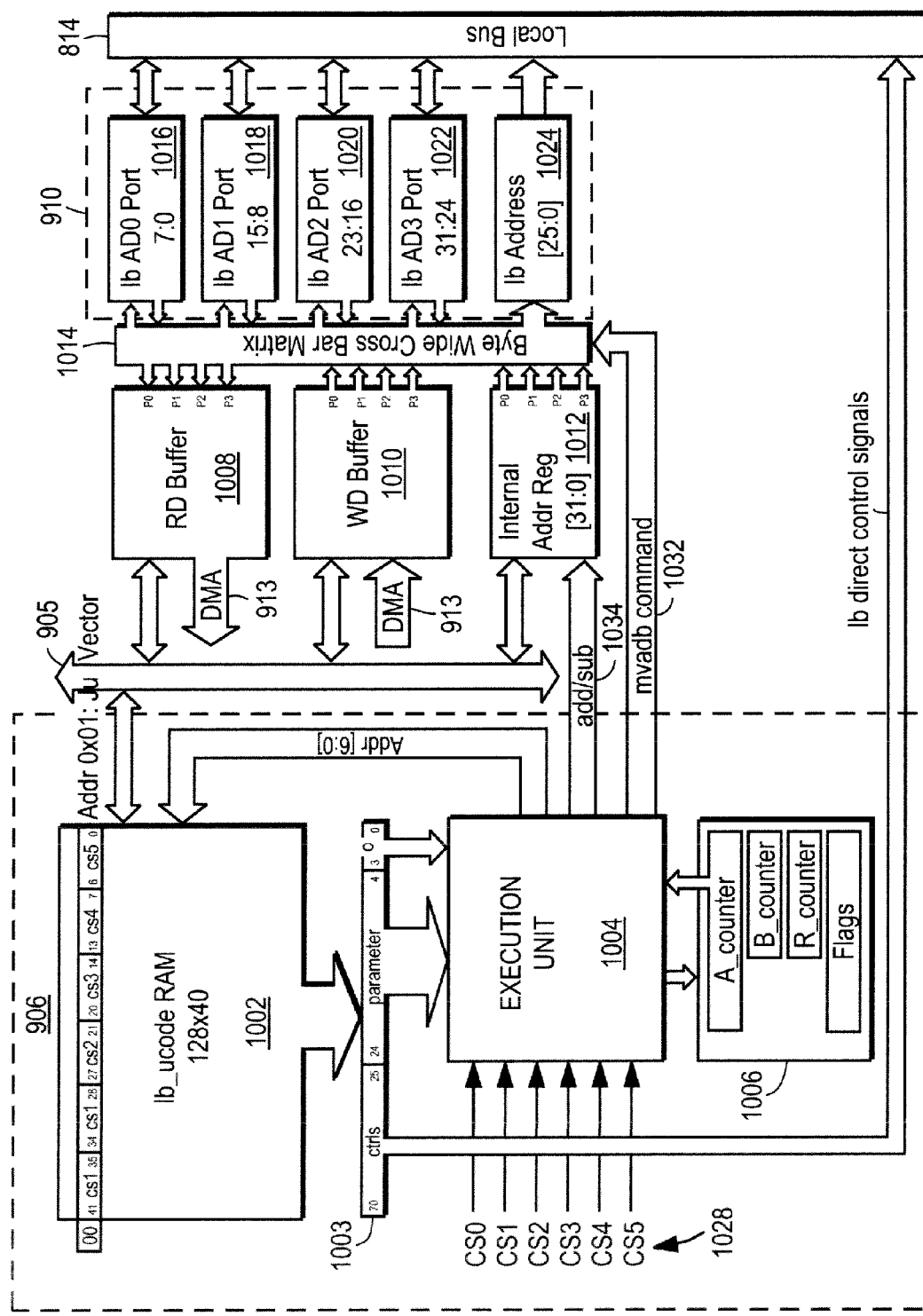
FIG. 10 illustrates functional data flow of an embodiment of the universal local bus interface.

FIG. 10 illustrates functional data flow of an embodiment of the universal local bus interface 812. The data flow illustrates the interconnections between the various modules of the universal local bus interface 812. In one embodiment, the sequencer 906 includes a memory 1002 and an execution unit 1004. In one embodiment, microcode is stored in memory 1002 within the sequencer 906. The programmable sequencer 906, in one embodiment, handles each device protocol cycle-by-cycle. In one embodiment, the sequencer 906 includes random access memory (RAM) for executing the microcode. The size of memory 1002 storing the microcode may be varied for specific applications and specific protocols supported. Local bus microcode runs on the memory 1002 to combine required elements for the device protocols. The sequencer 906, in one embodiment, reads sequence instructions from the memory 1002 each clock cycle and toggles/samples the interface signals. The microcode sends instructions 1003 to the execution unit 1004. In one embodiment, the microcode is stored in a 40 bit wide 428 location deep memory 1002. In one embodiment, each 40 bit line of code has a 4 bit Opcode, 50 bit parameter field, and a 46 bit control signal.

In one embodiment, an instruction line 1003 consists of Opcode, Parameter, and Control fields. Execution unit 1004 uses the instruction line 1003 to execute the combined control signals, move data to or from a peripheral device in an indicated manner, generate the address, and perform other elementary steps used to build the specific device protocol. Execution unit 1004 also includes chip select logic for determining chip selects 1028. In one embodiment, chip selects CS0-CS5 are available. The execution unit 1004 includes internal registers 1006. In one embodiment, the internal registers 1006 include flags, two 8 bit counters (B_counter, R_counter) and one 46 bit counter (A counter). The counters provide the execution unit 1004 with the ability to perform loop operations or repeat a number of cycles as may be required by the device protocols.

Host bus 905, in one embodiment, allows the Host 804 to control the microcode, to read data from Read Data Buffer 1008, to write data to the Write Data Buffer 1010, or to access the address register 1012. The address register 1012 is part of the address generator 908. The Data Path FIFO 912 includes the Read Data Buffer 1008 and Write Data Buffers 1010, which are FIFO-like buffers. Data flows into the Read Data Buffer 1008 from the local bus 814, and data flows out to either the Host 804 through the host bus 905 or to the DMA interface 913. Data flows into the Write Data Buffer 1010 from either the host bus 905 or the DMA interface 913, and data flows out to the local bus 814.

In one embodiment, the local bus port 910 includes data ports 1016, 1018, 1020 and 1022 and an address port 1024. Additional ports may be provided depending on the specific application requirements. The cross bar matrix 1014 (also called a Port Mapper 1014) allows for mapping of data or addresses between the ports 1016, 1018, 1020, 1022, 1024 and the Buffers 1008, 1010 or the Address Register 1012.

When the universal local bus interface 812 accesses a device over multiple cycles, the address may be changed, in one embodiment. For example, in one embodiment, the execution unit 1004 increments or decrements an address in the address register 1012 through an Add/Subtract signal 1034. Execution unit 1004 may also use a move command 1032 to move an address or data to or from a port 1016, 1018, 1020, 1022 or 1024. For example, in one embodiment, when writing to a device, the address is moved from the address register 1012 to the address port 1024, the data is moved from the Write Data Buffer 1010 to a data port, and the strobe signal is toggled.

Figure 11:
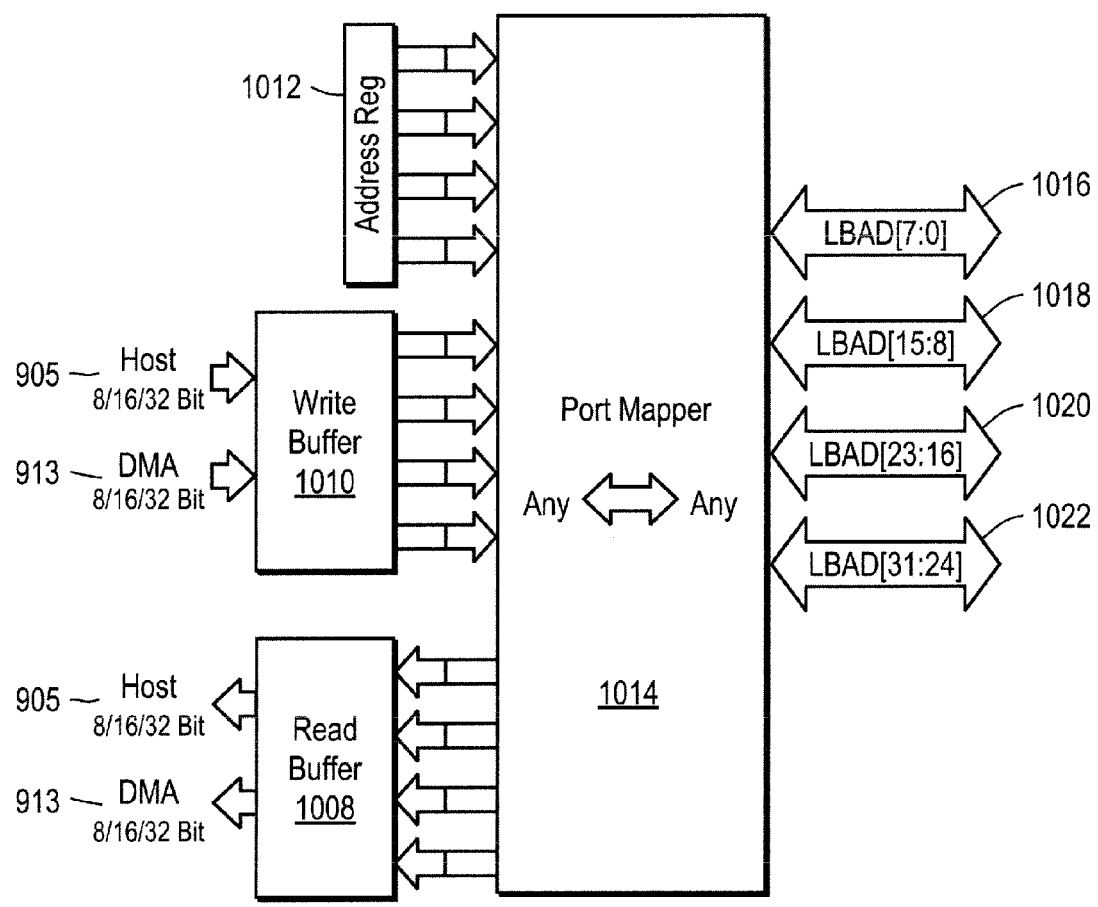
FIG. 11 is a block diagram of an embodiment of a universal local bus Port Mapper.

FIG. 11 is a block diagram of an embodiment of a universal local bus Port Mapper 1014. In one embodiment, Port Mapper 1014 is a crossbar switch matrix 1014 which maps data between any of ports 1016, 1018, 1020, or 1022 and any of the address register 1012, Write Data Buffer 1010, or Read Data Buffer 1008. In one embodiment, Port Mapper 1014 is able to map any of four bytes to any of four 40 bit local bus ports 1016, 1018, 1020, or 1022. It will be appreciated that other embodiments may include additional ports or ports of different sizes. Port Mapper 1014 allows any address to be written from the address register 1012 to any port 1016, 1018, 1020, 1022 or 1024. Similarly, Port Mapper 1014 allows any data to be written from the Write Data Buffer 1010 to any port 1016, 1018, 1020, or 1022. Additionally, Port Mapper 1014 allows for any data to be read from any port 1016, 1018, 1020, or 1022 to the Read Data Buffer 1008.

Figure 12A:
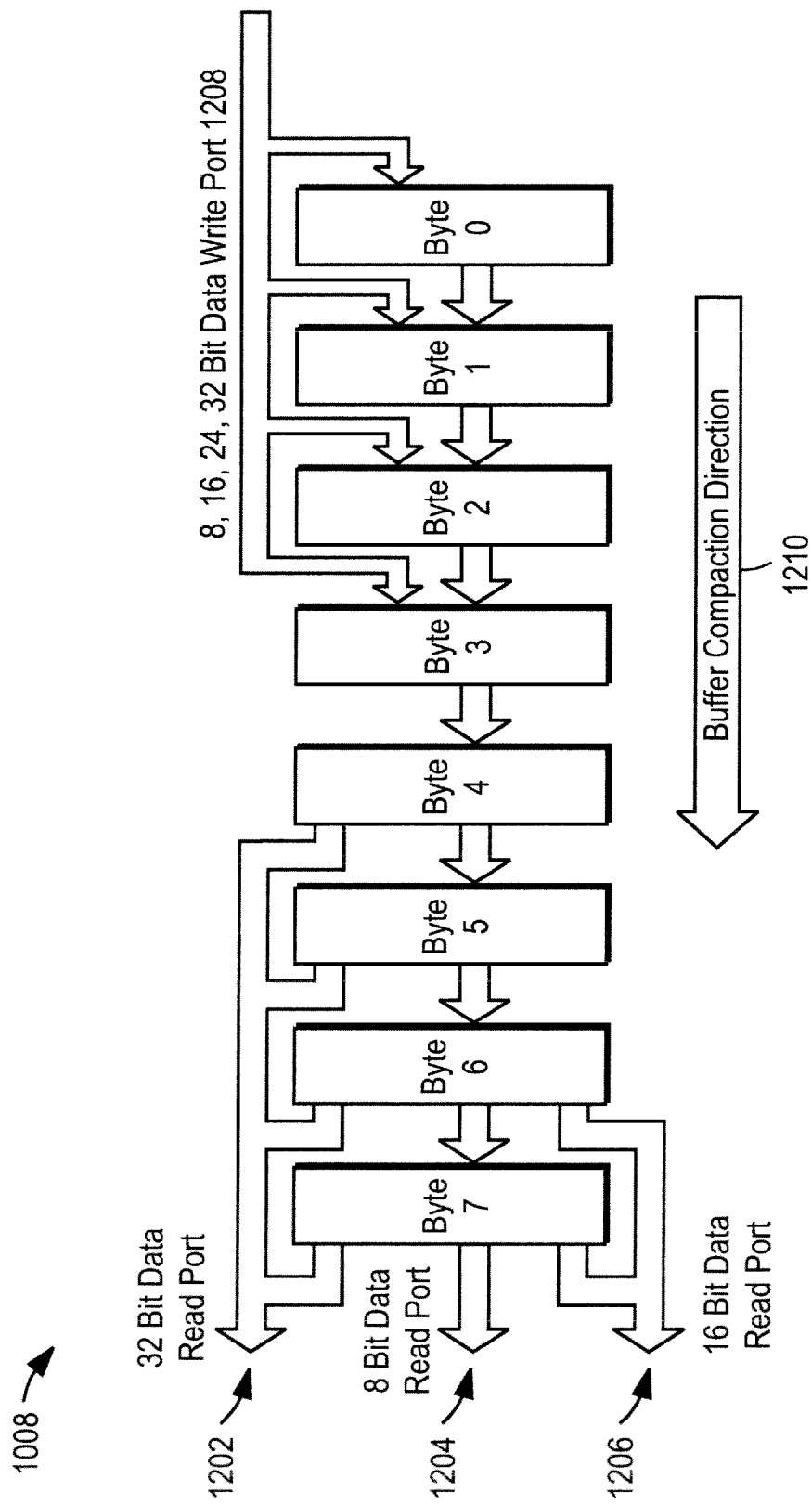
FIG. 12A is a block diagram of an embodiment of a Read Data Buffer.

FIG. 12A is a block diagram of an embodiment of a Read Data Buffer 1008. The Read Buffer 1008 accepts data from the universal local bus 814. In one embodiment, Read Buffer 1008 is an 8 byte deep FIFO with variable input width and variable output width. Data can be read in any width (8/16/24/32 bits) from the data write port 1208 and with any byte ordering and position on the local bus. The Port Mapper 1014 allows for data to be written from any of the ports to any of buffer positions 0, 1, 2 or 3 (i.e. bytes 0, 1, 2 or 3) in any order or combination. This allows for the reordering of data depending on the specific device protocol. For example, this allows for the arrangement of bytes in big endian order for one protocol, and little endian order for another protocol.

In one embodiment, the 8 bit data read port 1204 reads data from buffer position 7. The 16 bit data read port 1206 reads data from buffer positions 7 and 6. The 32 bit read data port 1202 reads data from buffer positions 7, 6, 5 and 4. The Read Data Buffer 1008 is a FIFO (First In First Out) type buffer. Once data is placed in the Read Data Buffer 1008, the data may be compacted 1210 and moved to left most free position, while maintaining the order. For example, in one embodiment, when data is read from buffer positions 7, 7&6, or 7&6&5&4, the buffer positions will be replenished from the next available data location in the buffer 1008. In one embodiment, the priority of data movement across the buffer is 1) 8/16/32 bit read data; 2) Buffer compaction and 3) 8/16/24/32 bit data write to the buffer 1008. This means that in the same cycle, data can be moved out of buffer positions 4, 5, 6 or 7 (read data) and refilled by compaction 1210 from the first valid location on the buffer to the right. In one embodiment, if there is an attempt to read from an empty buffer position or to overwrite already full location, an error will be generated and interrupt signal asserted.

Figure 12B:
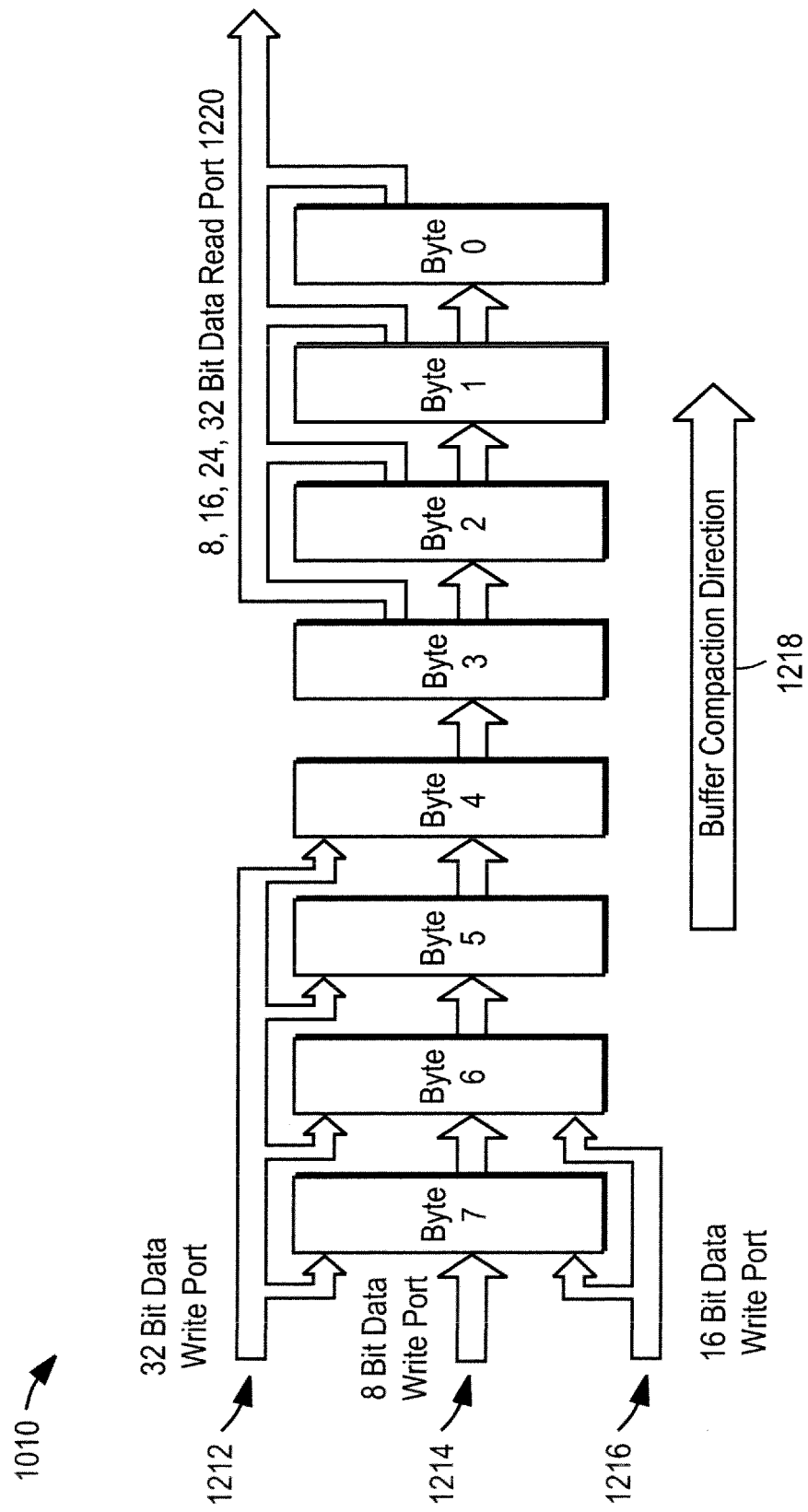
FIG. 12B is a block diagram of an embodiment of a Write Data Buffer.

FIG. 12B is a block diagram of an embodiment of a Write Data Buffer 1010. The Host 904 or DMA may write 8/16/32 bits of data to the Write Buffer 1010 when there is enough space in the FIFO buffer 1010. The sequencer 906 may read any combination of the data bytes from the output FIFO buffer port 1220. In one embodiment, Write buffer 1010 is an 8 byte deep FIFO with variable input width and variable output width. Data may be written to buffer positions 7, 7&6, or 7&6&5&4. In one embodiment, the 8 bit data write port 1214 writes data to buffer position 7. The 16 bit data write port 1216 writes data to buffer positions 7 and 6. The 32 bit write data port 1212 writes data to buffer positions 7, 6, 5 and 4. Once data is read from the any location in the buffer 1010, compaction 1218 will occur, moving data toward right most available position, while maintaining the byte order. Data can be read from the buffer positions 0, 1, 2, or 3 in any combination. In one embodiment, priority of data movement across the buffer is 1) 8/16/24/32 bit data read port, 2) Buffer compaction, and 3) 8/16/32 bit data write port. In one embodiment, if there is an attempt to read from empty buffer position or to overwrite already full location, an error will be generated and interrupt signal asserted.

Figure 13:
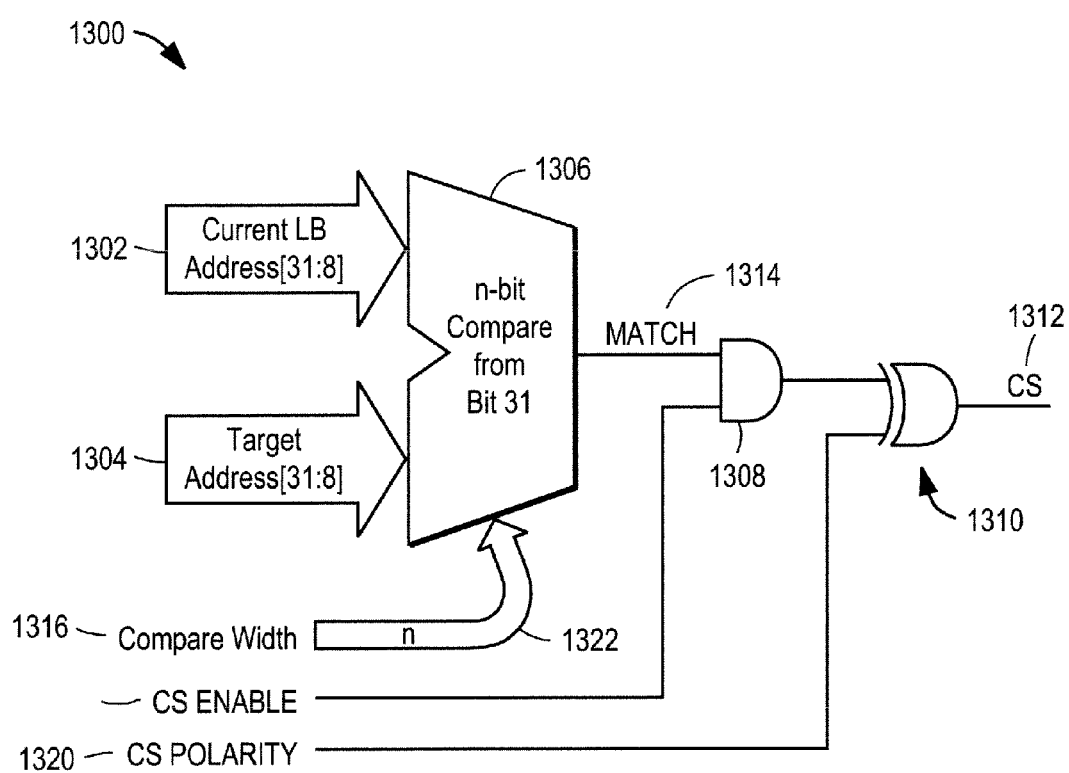
FIG. 13 is a block diagram of an embodiment of a Chip Select generation logic.

FIG. 13 is a block diagram of an embodiment of a chip select generation logic 1300 for generating a chip select for an external device. In one embodiment, the address generator 908 includes chip select logic 1300. In one embodiment, chip select generation logic 1300 is provided for each chip select 1028. For example, in one embodiment where there are six available chip selects 1028 (e.g. CS0-CS5), six separate chip select logics will be provided, one for each chip select. The Chip Select indicates which peripheral device a cycle is addressed to. The CPU 804 provides a current local bus address 1302. The chip select logic 1300 receives the address 1302. Chip select logic 1300 compares a programmed number of address bits with a predefined value 1304, and generates a chip select signal 1312 if they are equal. For example, in one embodiment, for chip select CS0, comparator 1306 compares a range of address bits (e.g. starting from bit 31 to bit 8) of a current local bus address 1302 with a range of address bits (e.g. bit 31 to bit 8) of a target address 1304. A register stores compare width 1316 and the target address 1304 associated with each chip select. In one embodiment, the compare width 1316 is indicated by a variable n 1322 fed into comparator 1306 together with the target address 1304 and the current local bus address 1302. For example, in one embodiment, a compare width 1316 signal of n=0 to 24 will cause comparator 1306 to compare n bits from bit 31 (i.e. bits 31 to 31-*n*) for each of the current local bus address 1302 and the target address 1304. If the comparator 1306 determines that the address bits match, a match signal 1314 is sent to AND logic 1308.

CS ENABLE signal 1318 indicates that the particular Chip Select (e.g. CS0) is enabled, and is input into AND logic 1308. AND logic 1308 outputs to XOR logic 1310. A CS POLARITY signal 1320 is input into XOR logic 1310 and controls the polarity of the Chip Select, i.e. whether it is high active or low active. XOR logic 1310 outputs a chip select signal CS 1312. Once a chip select signal 1312 is generated, the chip select is input into the execution unit 1004, indicating that a cycle is addressed to a specific device. The chip select indicates which protocol is used with a specific device.

Figure 14:
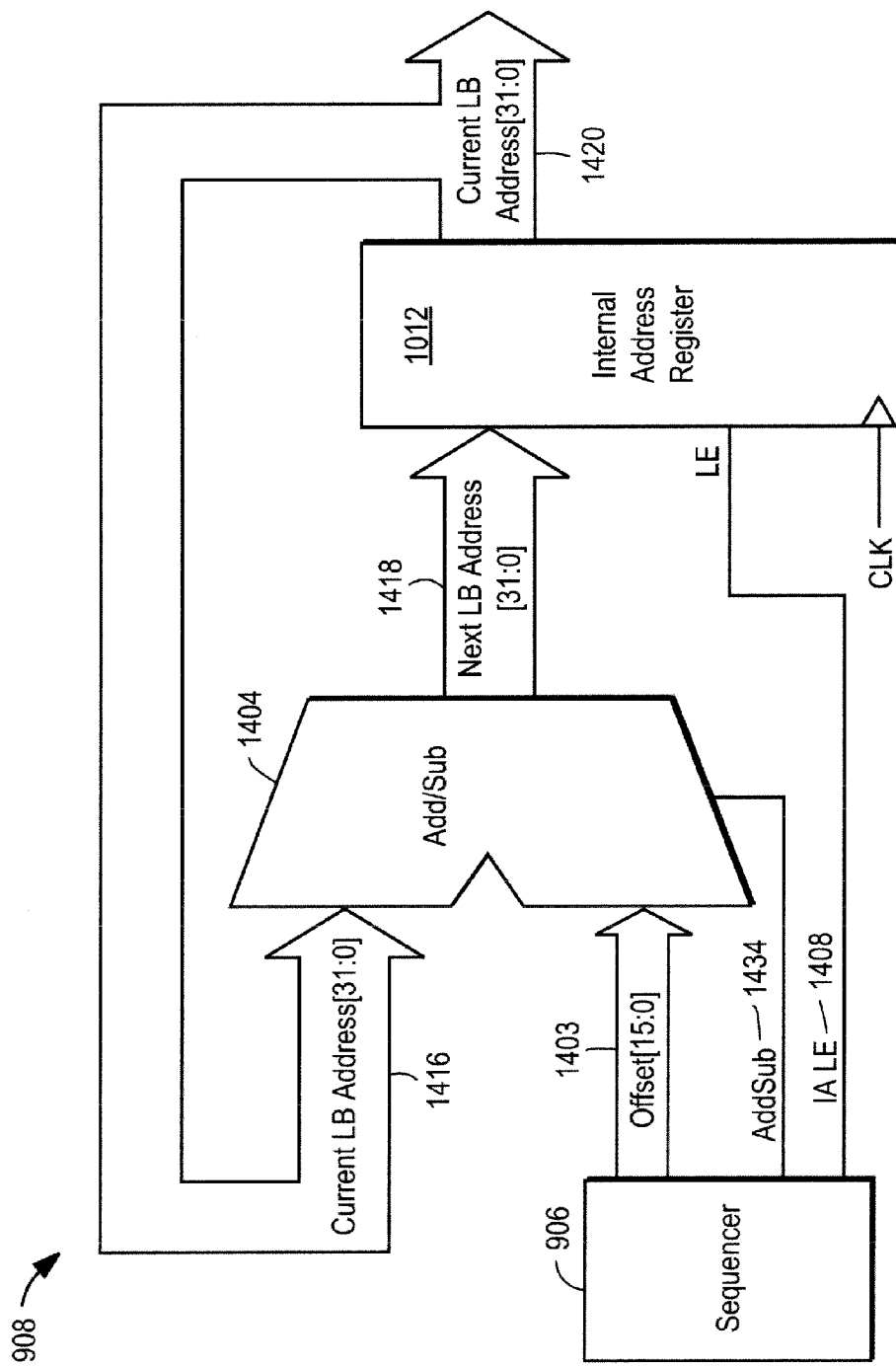
FIG. 14 is a block diagram of an embodiment of a local bus address generator.

FIG. 14 is a block diagram of an embodiment of a local bus address generator 908. Address generator 908 calculates next local bus address 1418. A current local bus address 1416 is input into adder/subtractor unit 1404. Sequencer 906 sends an offset signal 1403 and an AddSub select signal 1434 to adder/subtractor unit 1404. AddSub signal 1434 indicates to the adder/subtractor unit 1404 to increment or decrement the current address by an indicated offset 1403. An Internal Address Latch (IA LE) signal 1408 is an internal control signal from the sequencer 906 to the address register 1012. Adder/subtractor unit 1404 outputs the next local bus address 1418. The next local bus address 1418 indicates the address for the next bus cycle. On the next clock cycle, if the signal is enabled, the address register 1012 outputs the current address 1420. The current address 1420 is fed back into address generator 908.

In one embodiment, the universal local bus interface 812 of the present invention is incorporated into an SOC 802. In another embodiment, the universal local bus interface 812 may be on a separate chip than the CPU 804. Since the universal local bus interface 812 includes a programmable memory, it can be programmed for specific applications. For example, in one embodiment, the universal local bus interface 812 may be programmed to only support Intel-style device protocols. Additionally, the programmable feature of the universal local bus interface 812 allows it to be modified even after being reduced to silicon. In one embodiment, the microcode of the universal local bus interface 812 is stored in ROM. In one embodiment, the microcode of the universal local bus interface 812 is stored in RAM, Flash EPROM or other programmable media, thereby permitting the microcode to be updated.

For example, in one embodiment, universal local bus interface 812 is coupled to a peripheral device connector, which is capable of receiving various different devices having differing protocols. When a device with a specific protocol (e.g. a PCMCIA device or a Flash Memory device) is coupled to the peripheral device connector, the host updates or replaces the microcode of the universal local bus interface 412 to provide support for the particular device protocol.

As described above, the sequencer 906 includes various instructions. The instruction line consists of Opcode, Parameter and Control fields. The Opcode field controls execution flow and it is parameterized by the Parameter field. Instruction flags are modifiers for the Opcode. The Parameter field is a variable format dependent on the Opcode value. The Control field programs the Local Bus control signals. Below are Opcodes, Instruction Flags, Parameters and Control Signals included in one embodiment of the sequencer 906.

The universal local bus interface increases design robustness by providing the ability to interface with devices not originally specified. For example, to provide support for another device protocol, only microcode development is required, rather than chip redesign. The universal local bus interface also may improve the time to market, since peripheral communication protocols can be implemented after the device is taped-out.

In one embodiment, the universal local bus interface 812 is included in SOC 802. In one embodiment, SOC 802 is an integrated high definition digital television controller Image Blending and Warping The high definition television controller may be used to create special effects, for example by blending two or more video signals, blending a video signal with graphics, or by warping the image. This may be useful for enabling the use of overlays for menus, transitions between segments, creating new content, and other features.

In-Line Blending

In-line video blending mixes a video internal source with graphics from an external graphics source "on the fly." The high definition television controller chip provides a method to synchronize the video and graphics source, in one embodiment, using a line-locking mechanism that scales the external graphics in real time, blends them together, and in one embodiment, forwards the result to display. The circuits and software described herein are able to handle graphics and video data that arrives from separate chips in the real time, making synchronization, line locking, and data buffering serious issues.

Figure 15:
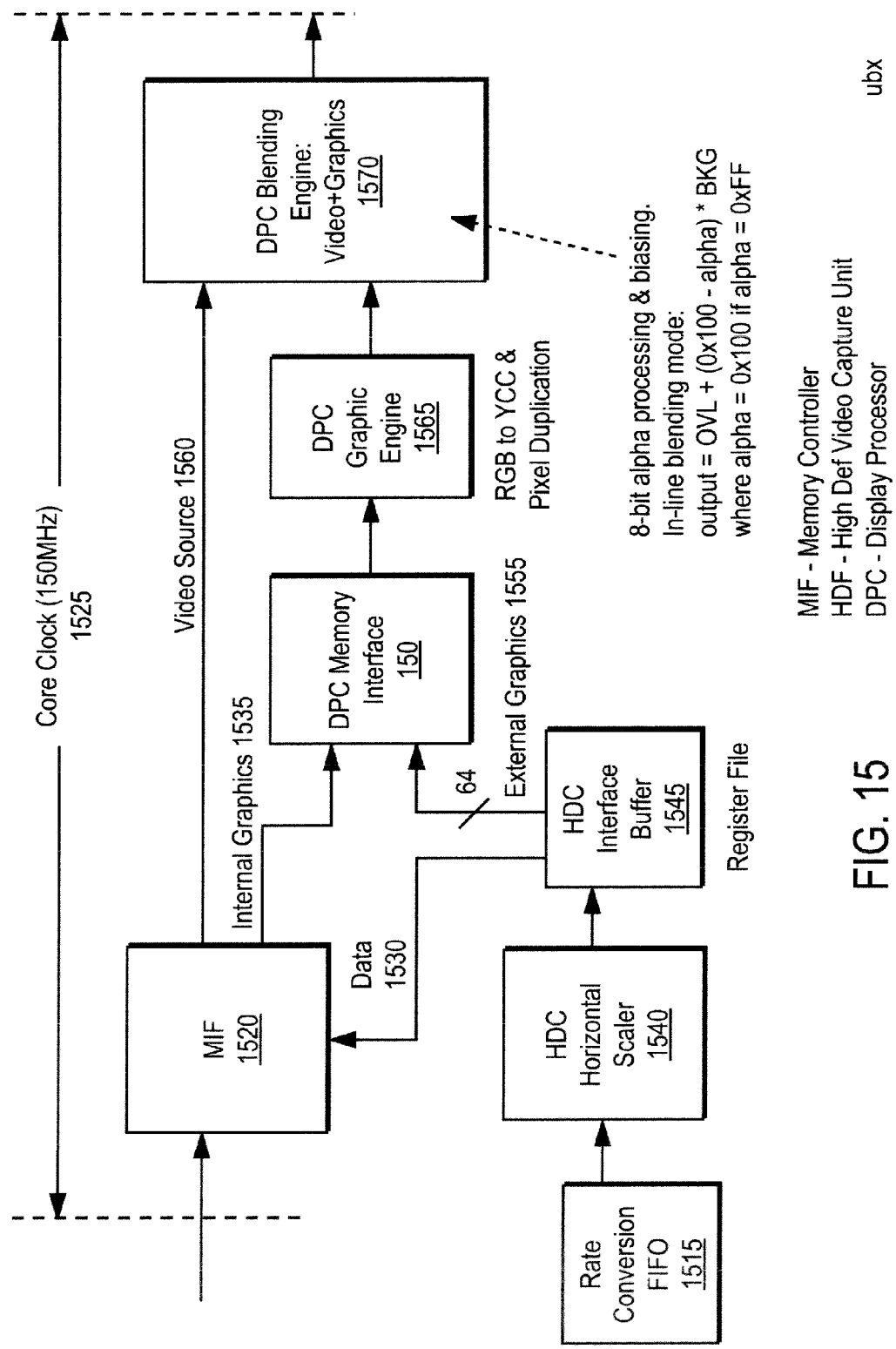
FIG. 15 is a block diagram of one embodiment of the elements of the high definition television chip.
Figure 16:
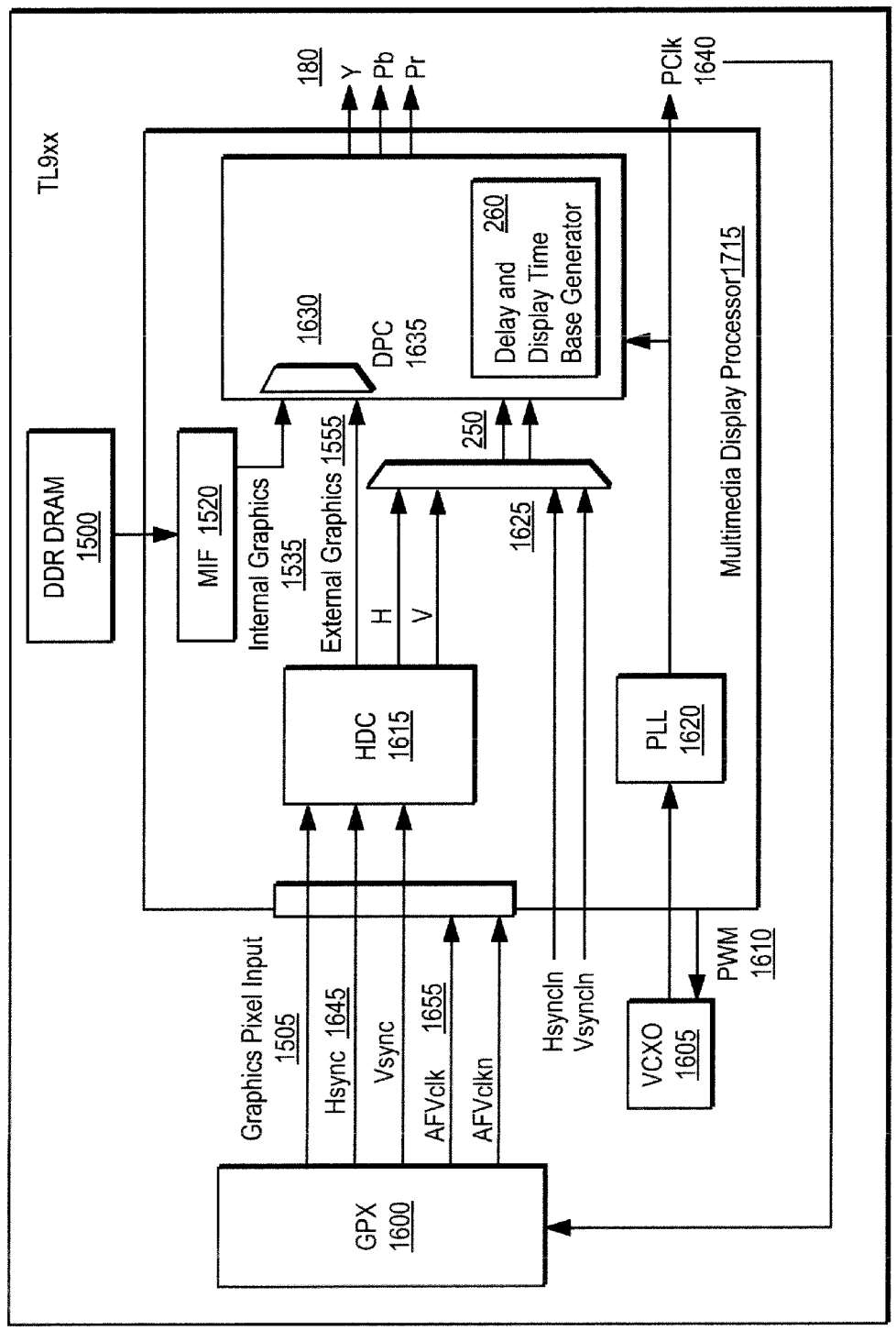
FIG. 16 is one embodiment of an overview block diagram of the signals utilized in the high definition television chip.

FIG. 15 shows one embodiment of selected portions of a typical hardware unit required to execute the in-line video blending. The hardware unit, in one embodiment, is part of the high definition television controller chip, described above. In another embodiment, portions of the hardware unit may reside outside the high definition television chip. FIG. 16 shows the various input and output signals for high definition television chip the high definition television chip, to enable the in-line video blending described. The sections to follow outline the synchronization, buffering, and scaling mechanism for in-line video blending with stored graphics invention.

Referring to FIG. 16, graphics input 1505 (in one embodiment RGB and Alpha) from an external graphics chip (GPX) 1600 is combined with video 1560 and graphics 1535 data generated inside the High definition television chip 1715. In one embodiment, the external graphics chip provides RGBA over a 16-bit double-pumped interface, which is an enhancement of the Intel DVI bus. In one embodiment, the graphics chip also provides H sync (horizontal sync signal) 1645, V sync (vertical sync signal) 1645, AFVclk (input clock) and AFVclkn (inverted input clock) 1655 signals. In one embodiment, raster timing is compatible with the EIA770.3 standard.

The graphics pixel input 1505 is processed by the HDC 1615 (high definition video capture unit, shown as block 326 in FIG. 3, above). The output of the HDC 1615 is the external graphics data 1555. The DPC (Display processor, block 332 in FIG. 3) 1635 combines the external graphics data 1555 with the internal RGBA graphics data 1535, received from MIF (memory controller block 302 in FIG. 3) 1520. In one embodiment, color space conversion is performed and the resulting composite graphics channel is combined with the internal video channel using the alpha channel. In one embodiment, EIA770 compatible syncs are added, and the signal 180 driven out of the DAC.

In one embodiment, the High definition television chip 1715 controls the system clock using the PCR (Program Clock Reference) from the transport stream. It generates the pixel clock (PClk) 1640 using an internal PLL 1620 and VCXO 1605. The PClk 1640 is provided to the external graphics chip 1600. The graphics chip 1600 uses this clock 1640 to output pixels. In one embodiment, the external graphics chip 1600 provides a regenerated pixel clock 1655 (AFVclk) (source synchronous) with data 1505 back to the High definition television chip 1715.

In one embodiment, the High definition television chip 1715 synchronizes its video clock, core clock 1525, to video source 1560. For example, in the case of MPEG video source, the High definition television chip 1715 compares its local STC clock counter with the PCR field in the incoming MPEG stream, and then adjusts its video clock accordingly through PWM 1610 output to control an VCXO 1605.

Figure 18:
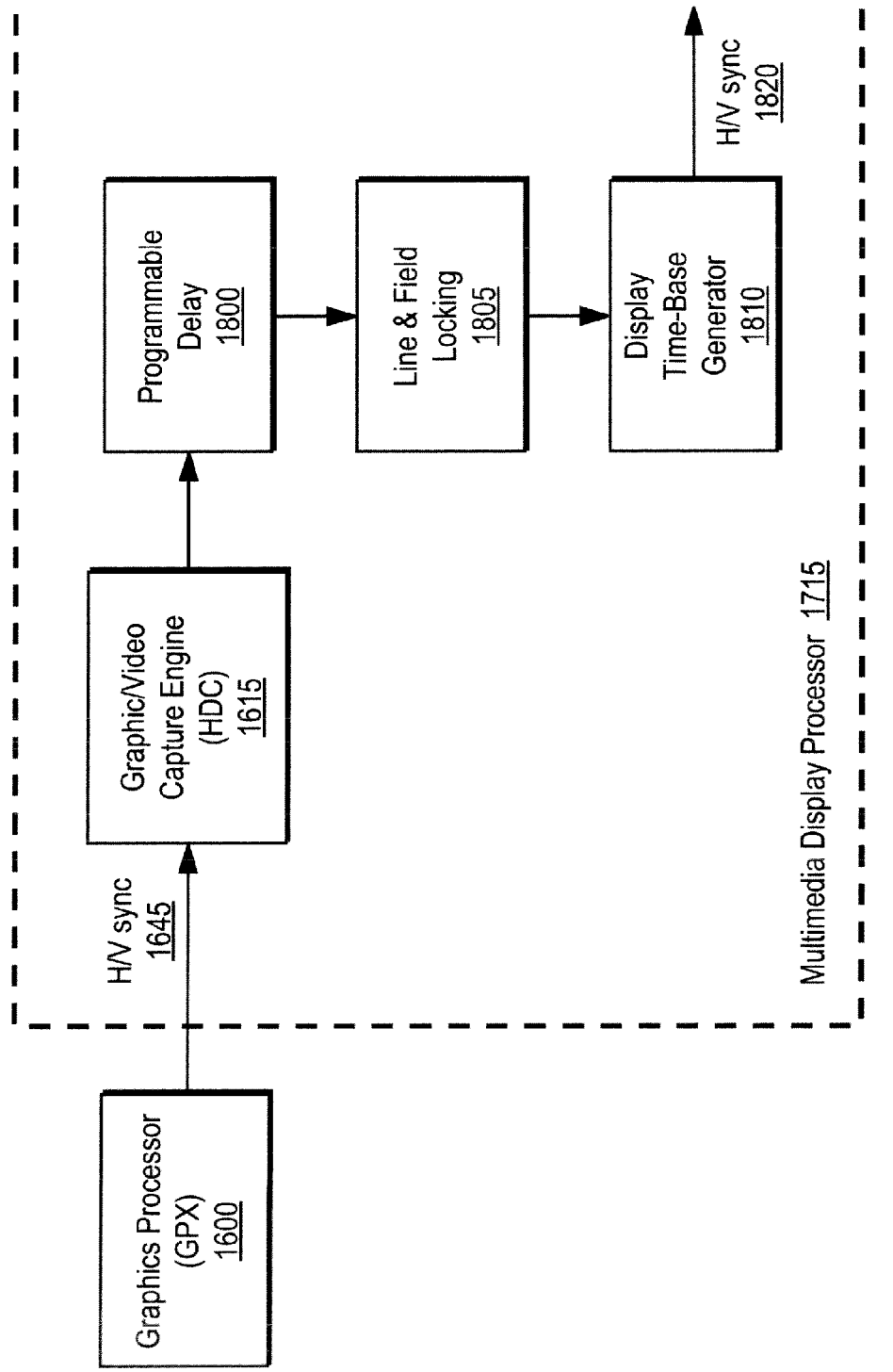
FIG. 18 is a flowchart of one embodiment of synchronization and line locking.

The video clock 1640, generated based on the external video clock generator (VXCO) 1605 by phase locked loop 1620, is input to both the external Graphics Processor (GPX) 1600 and the High definition television chip 1715. The Graphics Processor 1600 generates its horizontal and vertical sync signals 1645 (HN sync) from this video clock 1640, and then sends the HN sync 1645 signals into the High definition television chip 1715. One embodiment of this process is illustrated in FIG. 18.

HN sync 1645 flows through the Graphic/Video Capture Engine 1615 in the High definition television chip 1715. At block 1800 a programmable delay module 1800 inside the Display Processor (DPC) 1635 adjusts the video timing discrepancy between the Graphics Processor 1600 and the High definition television chip 1715. In one embodiment, the user can select the optimal adjustment, based on each different video frame format.

At block 1805, the High definition television chip 1715 is line locked and field locked to the delayed H/V sync signals. At block 1810, the Display Processor 1715 generates its display timing. The H/V sync 1820 output after the display time-base generation 1810 is sent to the display device.

In one embodiment, the relationship between HSync 1645 and VSync 1645 from the Graphics Processor 1600 is defined in EIA770.3 (1080i) and EIA770.1 (480i). In general, field parity is indicated by the relative position of HSync and VSync 1645. The High definition television chip 1715 samples a number of PClk 1640 windows around HSync 1645. In one embodiment, the Display Processor 1715 samples +/−31 PClk windows. If VSync 1645 transitions within this window, the High definition television chip 1715 signals even parity. If VSync 1645 transitions outside this window, the High definition television chip 1715 signals odd parity. Even and odd parity may correspond to either field one or field zero, and is programmable.

As previously noted, in one embodiment, graphics 1505 from the external graphics processor 1600 arrive within the High definition television chip 1715 in real time. Sometimes, however, the Graphics processor 1600 does not provide a format that is the same horizontal size as the video source. In one embodiment this may occur even though the processing, in one embodiment, is accomplished in the Graphics Scaler Engine 1540. In one embodiment, the Scaler 1540 applies itself to SD (standard definition) content only (in which the graphics clock <=13.5 MHz), and HD (high definition) content bypasses the Scaler Engine 1540.

Figure 17:
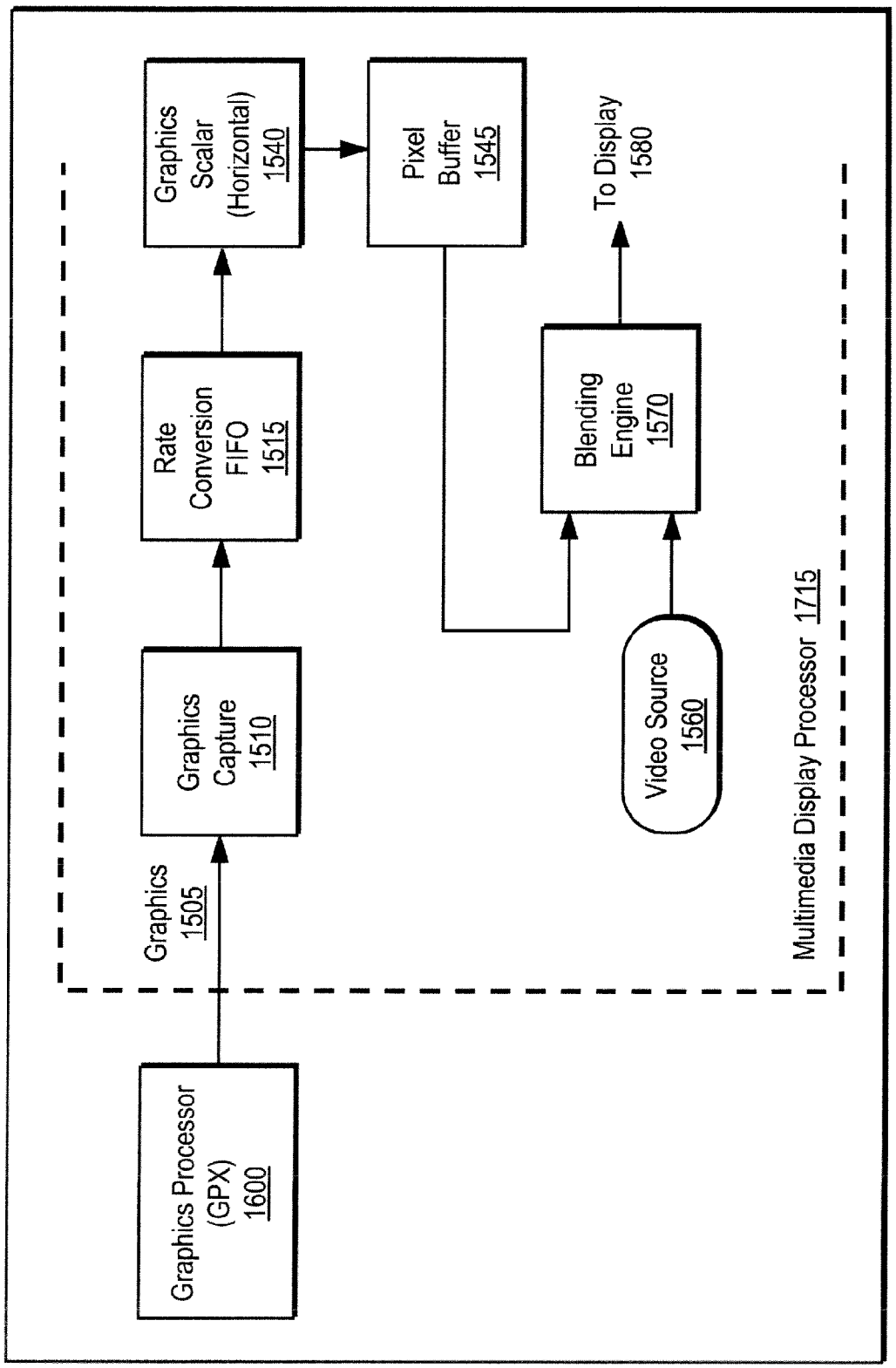
FIG. 17 is a flowchart one embodiment of scaling on the captured graphics.

FIG. 17 illustrates one embodiment of this flow. Graphics input 1505 is captured by HDC Input Process 1510 in the Graphics Processor clock domain, and then is sent to a Rate Conversion FIFO 1515. The Rate Conversion FIFO 1515 converts data from the Graphics Processor 1600 clock domain into the High definition television chip 1715 internal clock domain. In one embodiment, the graphics data is buffered 1545, and waits to be processed further in a later stage. In one embodiment, the graphics data is buffered for a short time period—around 1656 pixels in one embodiment.

The process determines whether scaling is needed. If scaling is needed, the Graphics Scaler 1540 performs horizontal upscaling, and DPC graphic engine 1565 performs pixel duplication. If upscaling/pixel duplication is not needed, the Graphics Scaler 1540 and DPC graphic engine 1565 are bypassed. If executing horizontal upscaling, the Graphics Scaler 1540 performs a bilinear interpolation on the graphics data. In one embodiment, the bilinear interpolation is a fixed-ratio (8:9). Each channel of RGBA (Red, Green, Blue and Alpha) is interpolated. In one embodiment, interpolation of the Alpha channel creates a "soft edge" between graphics and video during blending.

In one embodiment, pixel duplication is used for the ARIB 960×540 to 1920×1080i case. For this mode, ARIB defines 2× pixel duplication, not interpolation. The graphics chip 1600 produces a correctly timed 1100×1080i raster. In one embodiment, the raster is produced with PClk=74.25/2 MHz. Active video is 960×540, thus an identical bitmap is reproduced in each field. The graphics chip is scaled to run at PClk/2, e.g. half speed, to provide enough time for pixel duplication.

The data is stored in the HDC Interface buffer 1545. In one embodiment, parallel to the above process, the video source data is retrieved. The video source data and the processed graphics data from graphics processor 1600 are blended by blending engine 1570. The blended data is sent to display 1580.

PClk generation 1640 for the standard display (SD) case must produce correct line timing, even if the GPX chip 1600 is only producing 640 active pixels (square pixel). In one embodiment, the PClk PLL 1620 produces a PCLK frequency that results in an exact integer number of samples on a scan line. In one embodiment, this frequency must be easily generated from a 27 MHz reference clock. In that embodiment, two possible frequencies are:

- 27 MHz. This represents 858 samples, of which 640 are active pixels, the remainder blank.
- 27 MHz*10/11=24.54 MHz. This represents 780 samples, of which 640 are active pixels, the remainder blank.

For High definition television chip 1715, choice #1 above requires a larger pixel buffer for rate conversion, but uses a pre-existing clock. Choice #2 uses a smaller pixel buffer but a separate clock generator circuit. In one embodiment, choice # 1 is preferred. The net memory bandwidth requirement of the graphics chip 1600 remains the same, though peak bandwidth is slightly higher for choice #1.

The Display Processor 1635 receives external graphics data 1555 from the High-Definition Capture Unit 1615 at the core clock domain. In one embodiment, graphics are overlaid in real time.

A hard switch 1630 exists between internal graphics 1535 and external graphics 1555 in the DPC 1635. Internal graphics 1535 fetched from memory 1500 cannot be used while external graphics mode is selected. In one embodiment, external graphics 1555 have the same blending modes (pre-multiplied mode) as internal graphics 1555. Both global and local alpha can be independently applied. In one embodiment, a hard switch 1650 also selects between sync source from HDC 1615 or a separately generated HN sync In 1625. In one embodiment, the DPC 1635 operates in 'genlock' (external sync) mode. Hsync and Vsync 1645 from the HDC 1615 are used to provide 'external' syncs to the DPC 1635.

In one embodiment, the DPC graphics engine 1565 performs RGB-to-YCC conversion, if needed. In one embodiment the DPC graphics engine 1565 further performs pixel duplication on the incoming graphics data from the HDC Interface buffer 1545. The DPC graphics engine 1565 feeds this data into blending engine 1570 to be blended with video source.

The blending engine 1570 is performed, in one embodiment, in an 8-bit alpha mode. The alpha value is embedded in the RGBA graphics stream from the GPX 1600. The blending formula, in one embodiment is:

$$output = Graphic + (0x100 - alpha) * Video,$$

where alpha=0x100 if input alpha from HDC=0xFF

The output from the blending engine 1570 of FIG. 17 then passes to the external display 1580, after being formatted to an EIA770-compatible format. In one embodiment, Rate conversion FIFO 1515 converts the output data to the appropriate output clock rate.

The following table lists one embodiment of the display modes supported. Note in this table, 74.25 MHz may be 74.25*1.001.

| Raster | Active | Display Pixel Clock |
| --- | --- | --- |
| 858 × 525i | 720 × 480i | 13.5 MHz |
| 858 × 525i | 640 × 480i | 13.5 MHz |
| 780 × 525i | 640 × 480i | 13.5 MHz*10/11 |
| 858 × 525p | 720 × 480p | 27 MHz |
| 858 × 525p | 640 × 480p | 27 MHz |
| 780 × 525p | 640 × 480p | 27 MHz |
| 2200 × 1125i | 1920 × 1080i | 74.25 MHz |
| 1100 × 1125i | 960 × 1080i | 74.25 MHz/2 |
| 864 × 625i | 720 × 576i | 13.5 MHz |

N-Plane Alpha Blending

A method and apparatus for N-plane alpha blending are described. In the following description, for purposes of explanation, numerous specific details are set forth in order to provide a thorough understanding of the present invention. It will be evident, however, to one skilled in the art that the present invention may be practiced without these specific details.

Figure 19A:
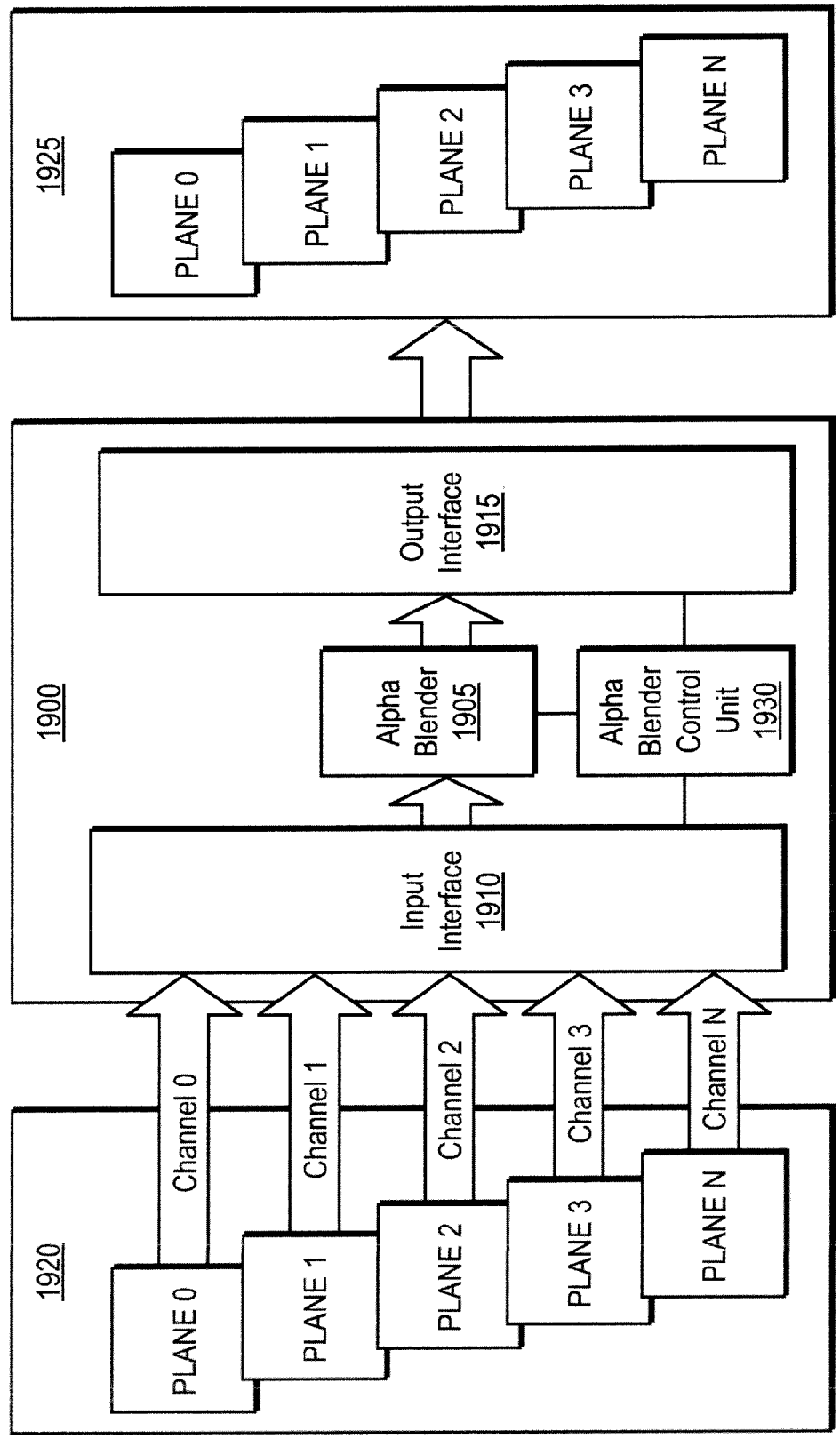
FIG. 19A illustrates a logical block diagram view of one embodiment of an image compositor with an N-plane alpha blender.

FIG. 19A illustrates a logical block diagram view of one embodiment of an image compositor 1900 with an N-plane alpha blender 1905. Each input plane, in one embodiment, represents a distinct graphic or video image. For example, plane 0 might be a background video image from a video source, while planes 1 through N might be computer generated graphic images to overlay the video background. Furthermore, the pixels of each plane have an associated alpha channel values, indicating their transparency. In accordance with one embodiment of the present invention, image compositor 1900 accepts as input multiple graphics and/or video images 1920, blends the multiple images according to their alpha channel values, and outputs a single output image 1925. For example, image compositor 1900 might accept as input five distinct planes, and output a single image with all five planes blended together.

The present invention may be implemented as part of a TV decoder chip, as described above. In one embodiment, TV decoder chip receives standard television transport streams at transport I/O and decodes the streams at an MPEG video decoder. Image compositor receives video/graphics data from memory and blends N planes of video and/or graphics. Because the blending operation is computationally intense, it is advantageous to have image compositor performing the blending operations, thereby freeing up the CPU to perform other tasks. After the N planes are blended, the output plane is combined with the decoded digital video stream output by display processing unit. The output plane is then displayed as a single video image on a display screen.

The planes composited have a spatial relationship, as well as a depth relationship, in one embodiment. For example, plane 4 is on top of plane 3, which is on top of plane 2 and so forth. Each plane of the composition represents a separate and distinct graphic or video image. For example, plane 0 might represent a digital video plane, while planes 1 through 4 might be graphic image planes.

For purposes of the blending operation, in one embodiment, the order of planes is important. The blending sequence is governed by the individual plane position in the multi-layer blending model. For one embodiment of the invention, by executing the right blending equations, blending can be carried out in normal as well as reverse order, and still give the correct final result.

Referring again to FIG. 19A, image compositor 1900, in one embodiment, includes an input interface 1910, an N-plane alpha blender 1905, an output interface 1915, and an alpha blender control unit 1930. Input interface 1910 receives as input N planes, where each plane represents a graphic or video image, and N is two or more. Image compositor 1900 accepts as input, graphics and video images of varying pixel formats. For example, each of planes 0 though N 1920 can be from a different source and therefore have a different pixel format. Image compositor 1900 converts each input plane into a common pixel format, blends the multiple planes according to alpha values associated with the pixels of each plane, converts the blended output image to a single destination format, and then writes the converted and blended output plane to a destination buffer.

Image compositor 1900 receives input planes at input interface 1910. As will be discussed in detail below, input interface 1910 may perform color space conversion, color expansion, and color look-up operations depending on the pixel format received at input interface 1910. After converting input planes to a common pixel format, input interface 1910 routes the converted data to alpha blender 1905.

N-plane alpha blender 1905 performs the actual alpha blending algorithms. Because input interface 1910 converts input pixel formats to a common pixel format for blending, N-plane alpha blender 1905 can be implemented to work with a single pixel format. For example, in one embodiment, to ensure maximum pixel precision on each blending operation, a 32 bit per pixel (bpp) format is implemented as the common format. Alternatively, the N-plane alpha blender 1905 may be implemented so that it can be programmed to work with a variety of common pixel formats. After the blending operation, the data is routed to output interface 1915.

Output interface 1915 converts the blended image data to a desired pixel format before outputting the resulting image to a destination buffer. As will be discussed in detail below, for one embodiment, output interface 1915 includes logic to perform color space conversion, and color compression operations.

For one embodiment, alpha blender control unit 1930 includes a state machine that keeps track of the present pixel row and column as the destination image is being rendered. In one embodiment, alpha blender control unit 1930 asserts signals to input interface 1910, alpha blender 1905, and output interface 1915. For example, alpha blender control unit 1930 asserts signals to alpha blender 1905 indicating whether the blending operation should be performed with a global alpha value.

Figure 19B:
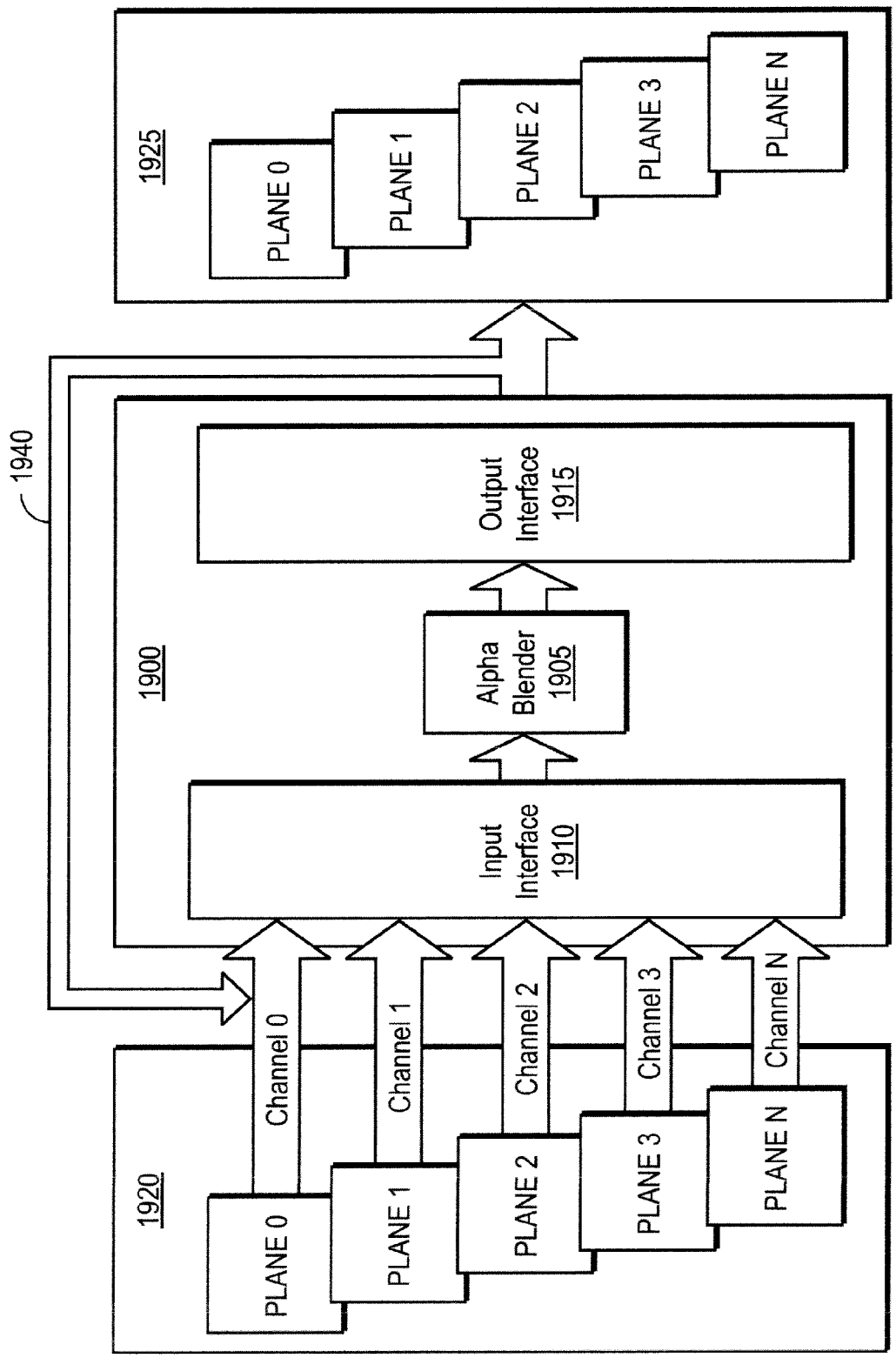
FIG. 19B illustrates a logical block diagram view of one embodiment of an image compositor with a multi-pass processing capability.

FIG. 19B illustrates a logical block diagram view of one embodiment of an image compositor 1900 with an N-plane alpha blender 1905 and with a multi-pass processing capability. Similar to the image compositor illustrated in FIG. 19A, image compositor 1900 allows for multi-pass processing. The image compositor 1900 of FIG. 19B allows the output of N-plane alpha blender 2005 to be re-routed to input interface 2010 through path 1940. This allows the image compositor to process more than N planes by using multiple passes. For example, if the hardware is implemented with a total of three input channels, four planes can be processed by making two passes through the N-plane alpha blender 1905. For one embodiment, the multi-pass operation is only used if there are more planes than the hardware can handle in one pass. In the hardware implementation, the number of input channels will typically depend on the cost and performance requirements. Regardless of the number of passes used to process N planes, output interface 1915 uses only a single output channel.

Figure 19C:
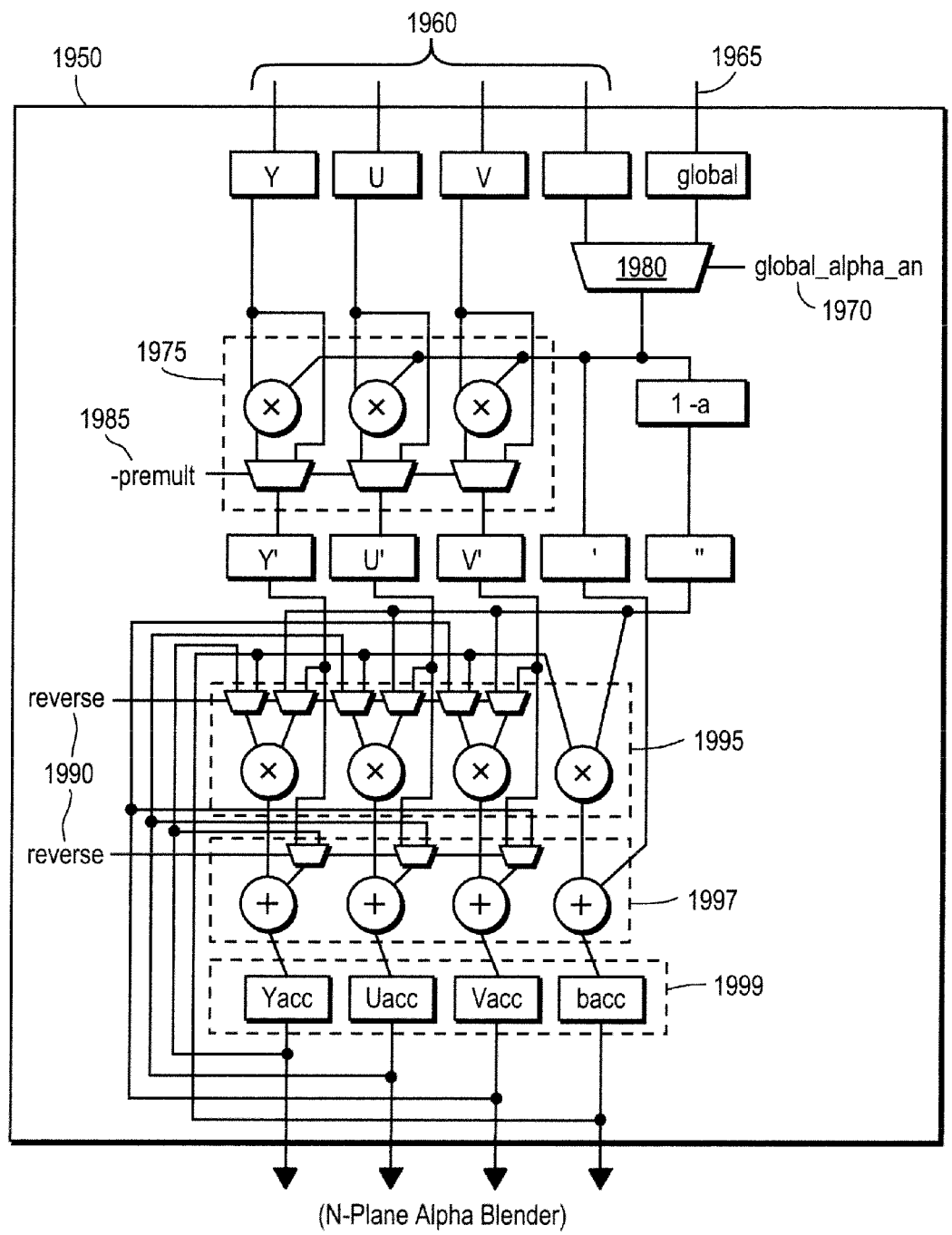
FIG. 19C illustrates one embodiment of an N-plane alpha blender.

FIG. 19C illustrates one embodiment of an N-plane alpha blender 1905. The exemplary N-plane alpha blender 1950 works with 32 bit YUV pixel formats. In other embodiments, N-plane alpha blender 1950 may be implemented to work with more or less than 32 bits, and formats other than YUV.

In one embodiment, N-plane alpha blender 1950 receives pixel data in a YUV pixel format from input interface 1910 via input signals 1960. If a global alpha is used, the global alpha value is received via the global alpha value input signal 1965 and the global_alpha_en signal 1970 will be asserted. For example, global alpha logic 1980 will propagate global alpha signal 1965 in place of the input pixel alpha 1960 if global_alpha_en 1970 is asserted. At multiplication logic 1975 the pixel values from input signals 1960 are multiplied by their corresponding alpha value, or the global alpha value if global_alpha_en has been asserted. However, if premult signal 1985 has been asserted, then the pixel values received at input signals 1960 have been pre-multiplied with their respective alpha value. In this case, the original pre-multiplied pixel data is propagated by multiplication logic 1975.

If alpha blender 1905 has been programmed to work in normal order, then reverse signal 1990 is not asserted. In this case, the next block in the blending equation involves multiplying the accumulated pixel value stored in accumulators 1999 by one minus alpha. At multiplication logic 1995, the pixel values stored in accumulators 1999 are multiplied by one minus alpha. Finally, the result of the two previous multiplication operations are added together at addition logic 1997 and stored in accumulators 1999.

However, if alpha blender 1905 has been programmed to blend in reverse order then reverse signal 1990 is asserted. If reverse signal 1990 is asserted, then multiplication logic 1995 multiplies the result of the first multiplication operation by the accumulated alpha value stored in accumulator 1999. Finally, at addition logic 1997 the result of the two previous multiplication operations is added to the accumulated pixel values stored in accumulators 1999.

Figure 20:
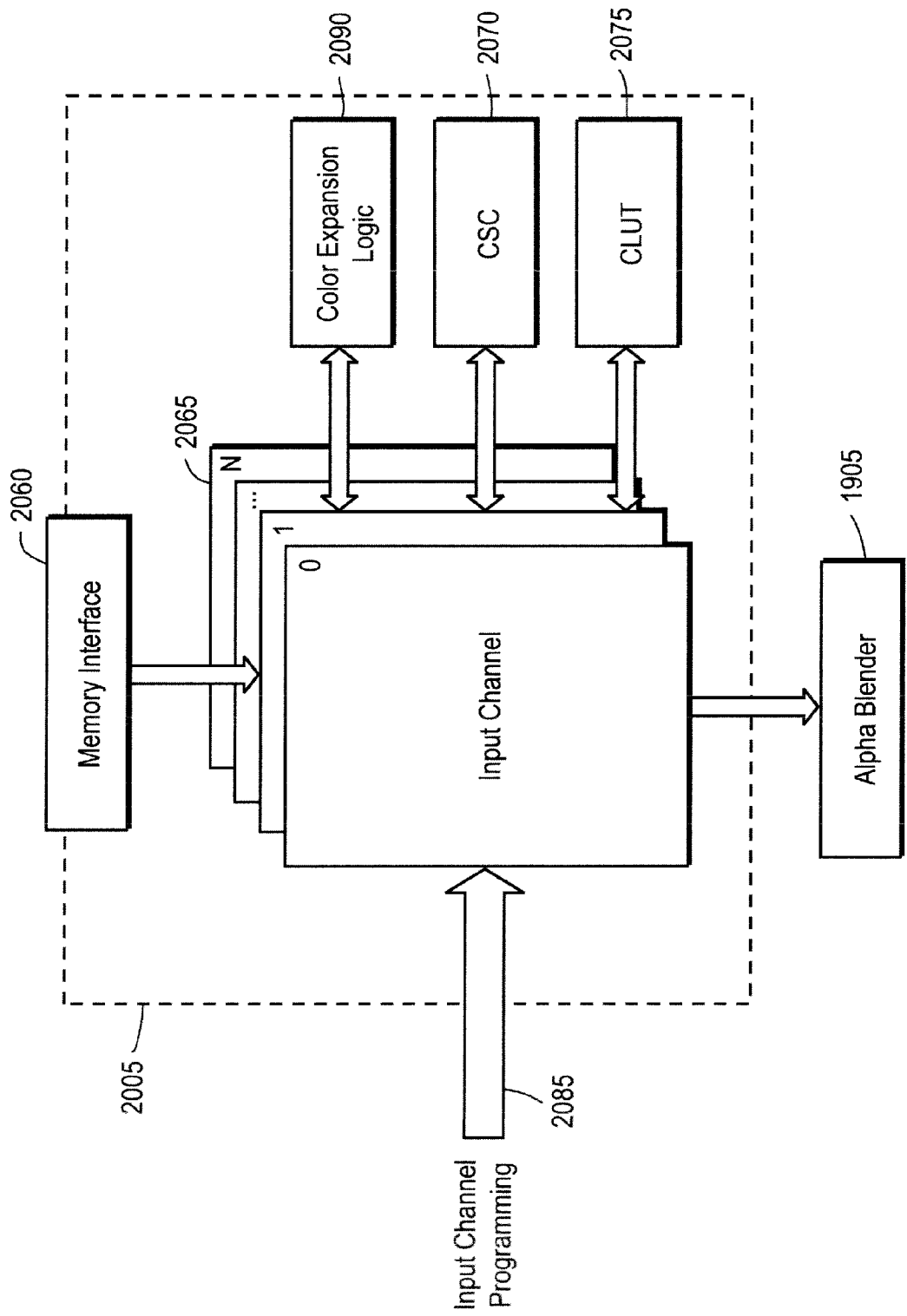
FIG. 20 illustrates a logical block diagram of one embodiment of an input interface for an image compositor.

FIG. 20 illustrates a logical block diagram of one embodiment of an input interface for use with an image compositor. In one embodiment, input interface 2005 may have output to the warp processor and/or alpha blender. In one embodiment, an identical input interface 2005 is used for image warping, described below. In one embodiment, the circuits and/or software implementing the input interface 2005 is duplicated. In another embodiment a single input interface 2005 handles the n-plane alpha-blending and the warp processing. Input interface 2005 includes, in one embodiment, N input channels 2065, a memory interface 2060, color expansion logic 2090, a color space converter (CSC)

2070, a color look-up table (CLUT) 2075, and an input channel programming interface 2085. In one embodiment, input interface 2005 is connected via memory interface 2060 to a memory device (not shown) from which the individual planes are read into the image compositor. A user, the manufacturer, OEM, or other programmer can control the input channels 2065 by programming the input channels 2085 in one embodiment, as represented by the arrow.

Because the input data can be one of several formats, including any of those listed in Table 1 below, in one embodiment the input data is converted into a common format before being passed to the N-plane alpha blender 1905. In one embodiment, in order to preserve the maximum pixel precision on each blending operation, a 32-bpp format is used as the common format. Accordingly, for one embodiment, when the desired output is a YUV pixel format, CSC 2070 is used to convert from RGB formats to YUV formats. Similarly, in an alternative embodiment, when the desired output is an RGB format, CSC 2070 is used convert from YUV formats to RGB formats. Furthermore, in one embodiment, color look-up table 2075 is used to expand color indices from 4-bpp (4I) or 8-bpp (8I) to 32-bpp. Likewise, an input plane having a native 16-bpp format can be expanded to 32-bpp using color expansion logic 2090 before being routed to CSC 2070 for color space conversion, if necessary.

In one embodiment, each of the well-known pixel formats listed below in Table 1 is supported. Of course, additional pixel formats may be supported. Furthermore, some of the below listed pixel formats may not be supported.

TABLE 1

| Format Name | Layout | Description |
| --- | --- | --- |
| RGB16 | RGB, 5:6:5 | 16 bpp, no per-pixel α |
| YUV16 | $C_bYC_rY$, 8:8:8:8 | 16 bpp ("4:2:2"), no per-pixel α |
| YUV16a | YUV, 6:5:5 | 16 bpp, no per-pixel α |
| YUV16b | αYUV, 2:6:4:4 | 16 bpp |
| YUV16c | αYUV, 4:6:3:3 | 16 bpp |
| RGB32 | αRGB, 8:8:8:8 | 32 bpp |
| YUV32 | αYUV, 8:8:8:8 | 32 bpp ("4:4:4") |
| YUV420 | 4:2:0 | 12 bpp ("4:2:0"), no per-pixel α |
| YUV422 | 4:2:2 | 16 bpp ("4:2:2"), no per-pixel α |
| 4I | 4 b/pixel | 4 bpp (converted to YUV32 or RGB32 by CLUT) |
| 8I | 8 b/pixel | 8 bpp (converted to YUV32 or RGB32 by CLUT) |

The pixel formats listed in Table 1 are presented as examples of the types of formats with which the present invention can be implemented. However, one skilled in the art will recognize that the present invention is not limited to the pixel formats listed in Table 1.

As is indicated in Table 1, not every pixel format contains alpha channel information. Alpha channel information indicates the level of transparency of the data. For example, in some computer graphics formats such as RGB16, each pixel has three channels of color information—red, green, and blue—but no alpha channel. For one embodiment of the present invention, a global alpha can be used for pixel formats that do not carry a native alpha channel. For example, the following well known pixel formats listed in Table 1 do not have a native per pixel alpha channel: RGB16, YUV16, YUV16a, YUV420, and YUV422. When the image compositor receives a plane in one of these formats as input, a global alpha can be used as the per pixel alpha for each pixel in the plane. Additionally, in one embodiment, for pixel formats with a native per pixel alpha, the native per-pixel alpha can also be replaced by or scaled by the global alpha.

Besides graphics, the compositor also accepts video planes. Video planes are normally stored in a proprietary format, as each digital television decoder keeps the video data in memory in a fashion that allows an efficient implementation of the MPEG-2 decoding scheme. In addition to the well-known video pixel formats listed in Table 1, in one embodiment the present invention can be implemented to work with a wide variety of standard and proprietary video pixel formats.

In one embodiment of the present invention, color components and alpha values for each pixel are stored in memory and encoded as 8 bit values, giving them a range from 0 to 255, where for the alpha value 0 corresponds to being completely transparent and 255 corresponds to being fully opaque. In order to simplify the blending circuitry, in one embodiment alpha values are re-mapped by input interface 2005 so that the value 255 is replaced with 256. Conversely, output interface, shown below, replaces a resulting alpha value of 256 with 255, before writing it back to memory.

For one embodiment, each of the input channels 0 to N 2065 is independent. For example, each input channel has its own parameters. The parameters for each input channel are programmable, for one embodiment, via the input programming interface, not shown. For one embodiment, the parameters for the input channels are as set out below in Table 3.

TABLE 2

| Parameter | Description |
| --- | --- |
| format | Pixel format (see Table 1) |
| base | Base address |
| pitch | Vertical pitch |
| width | Image width, in pixels |
| height | Image height, in pixels |
| position x | Destination horizontal position, in pixels |
| position y | Destination vertical position |
| alpha | Global α |
| alpha enable | Global α enable |
| alpha scale enable | Per-pixel α scaling by global α |
| source enable | Input channel enable |
| horizontal stretch | Number of times each pixel is replicated |
| vertical stretch | Number of times each line is replicated |
| pre-multiplied | Input pixels are pre-multiplied |
| color fill | Solid color in RGB32 or YUV32 format |
| color fill enable | Color fill enable |

The "format" parameter defines the pixel format of the input plane. As previously described, the input plane can be in a wide variety of pixel formats including any of the pixel formats listed in Table 1 above.

Each input plane can be placed anywhere in the destination plane. The parameters, "position x" and "position y," determine the starting coordinates of the input plane in the destination plane. For example, the "position x" parameter determines where in relation to the x-axis the image will be placed in the destination plane. Likewise, the "position y" parameter defines the position of the input plane with respect to the y-axis. In one embodiment, the position x and position y identify the left top corner of the input plane. Similarly, the "width" and "height" parameters determine the overall width and height of the input planes. In one embodiment, width and height are measured in pixels.

In one embodiment, input channels 2065 can be programmed to prevent actual image fetches from memory by using the "color fill" and "color fill enable" parameters. When color fill is enabled for a channel, the corresponding channel will output a combination of the programmed "color fill" and "alpha fill" values in place of the real pixel element values, thereby avoiding a memory read operation.

The "alpha" and "alpha enable" parameters are used to establish a global alpha value for pixel formats that do not have a native alpha channel. Alternatively, in one embodiment, the global alpha value can replace the per pixel alpha value for a given input plane. When the "alpha scale enable" parameter is set, the per-pixel alpha value for pixel formats with a native alpha is multiplied by the global alpha, thereby scaling the per pixel alpha. In one embodiment, for pixels that do not have a per-pixel alpha value, an implicit alpha value of 255 is assumed, unless global alpha overrides it.

The two parameters, "horizontal stretch" and "vertical stretch," are defined to perform simple stretch operations of images by an integer scale factor. For example, these parameters can be used to scale up simple graphics by pixel replication during blending.

Input interface, for one embodiment, includes color expansion logic 2090 for expanding 16-bpp formats to 32-bpp formats before blending. Pixels not in a 32-bpp format are expanded to the full 32 bits before further processing by CSC 2070. Similarly, for one embodiment, pixels in the index format are converted to 32 bits by CLUT 2070.

For one embodiment, each input channel 2065 has a soft-reset capability to halt operations before completion. A soft reset is achieved in one embodiment by toggling the "input channel enable" parameter.

For one embodiment, input interface 2005 includes a color space converter module 2070 for converting the color space of an input plane when necessary. For example, when the common pixel format that is used during the blending operation is a YUV pixel format, input planes that are in an RGB pixel format are converted before blending. Likewise, a YUV to RGB color space conversion is used when the blending operation is performed with a common RGB pixel format. For one embodiment of the present invention, it is desirable to make CSC unit 2070 programmable to allow users to program the colorimetry matrix for support of different colorimetries.

For one embodiment, the RGB to YUV ($YC_bC_r$) color conversion occurs according to the following equations:

Intermediary Variables:

$$Y' = Y_R \cdot r + Y_G \cdot g + Y_B \cdot b$$

$$U = b - Y'$$

$$V = r - Y'$$

YUV Results:

$$Y = K_Y \cdot Y' + 16$$

$$C_B = K_U \cdot U + 128$$

$$C_R = K_V \cdot V + 128$$

For one embodiment, the constants are defined as:

Constant values:
$$Y_R = 0.299$$
$$Y_B = 0.114$$
$$Y_G = 1 - Y_R - Y_B = 0.587$$
$$\ldots$$
$$K_Y = 219/255 \approx 0.8588$$
$$K_U = \frac{128 - 16}{255(1 - Y_B)} \approx 0.4957$$
$$K_V = \frac{128 - 16}{255(1 - Y_R)} \approx 0.6266$$

For one embodiment, CSC 2070 includes saturation logic to adjust the saturation levels of the YUV results. Accordingly, the resulting YUV values should be within ranges [16 ... 235], [16 ... 240] and [16 ... 240], respectively (range boundaries included).

Using the same saturation logic as above, the YUV to RGB inverse conversion can be implemented using the following equations:

Intermediary variables:
$$Y' = \frac{1}{K_Y}(Y - 16)$$
$$U = \frac{1}{K_U}(C_B - 128)$$
$$V = \frac{1}{K_V}(C_R - 128)$$
$$U' = \frac{Y_B}{Y_G}U = \frac{Y_B}{Y_G K_U}(C_B - 128)$$
$$V' = \frac{Y_R}{Y_G}U = \frac{Y_R}{Y_G K_V}(C_R - 128)$$

RGB Values:

$$r = Y' + V$$

$$g = Y' - U' - V'$$

$$b = Y' + U$$

For one embodiment, color lookup table (CLUT) 2075 is used when input pixels are in an index mode (e.g., 41, or 81). For one embodiment, entries in CLUT 2075 are in either RGB32 or YUV32 and can be loaded via a direct memory access (DMA) operation. To support the blending of multiple indexed input channels with different CLUT's in a single pass, for one embodiment multiple CLUT memories are used, with each table assigned to its corresponding input channel.

Figure 21:
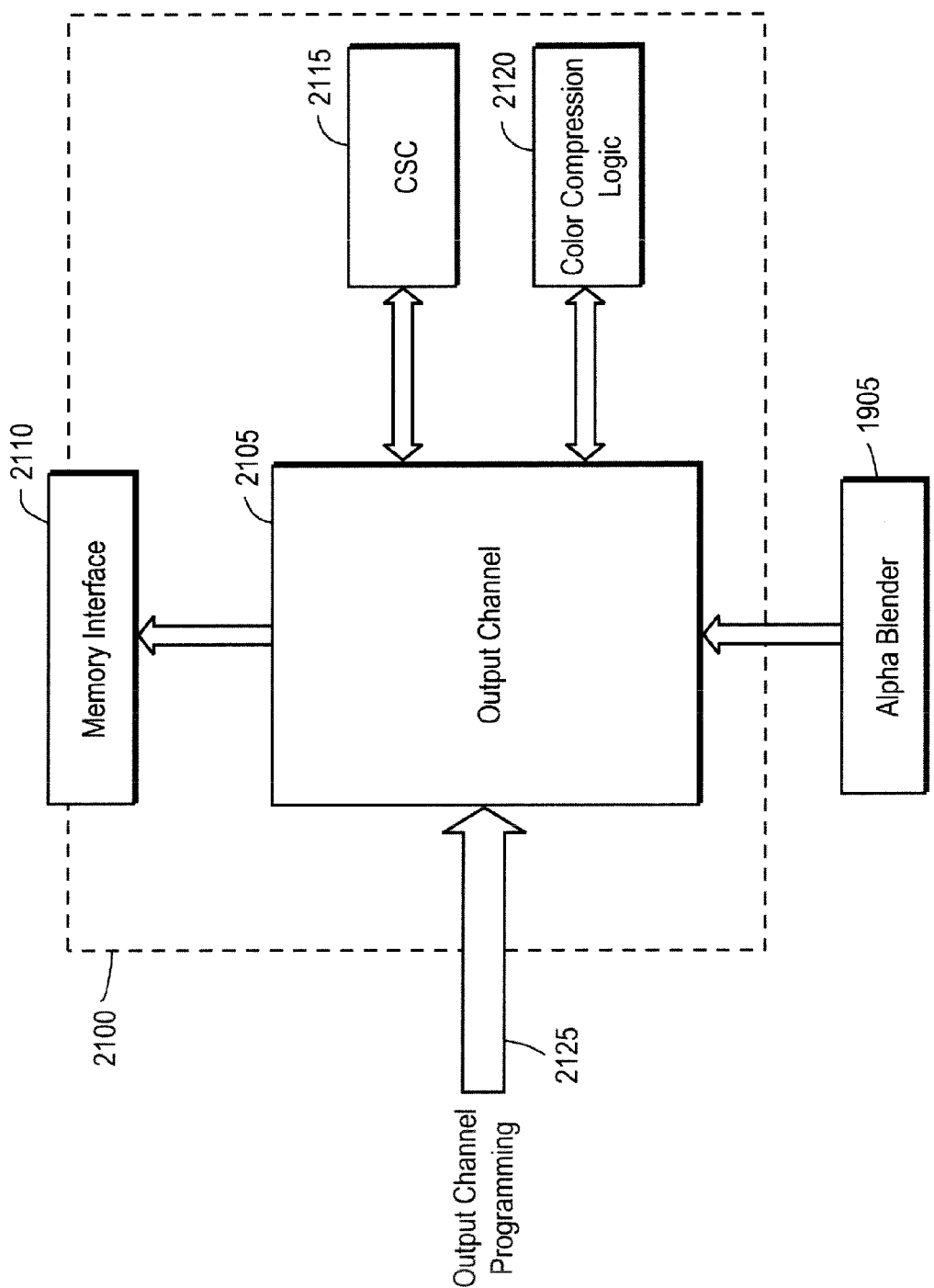
FIG. 21 illustrates a logical block diagram of one embodiment of an output interface for an image compositor.

FIG. 21 illustrates a logical block diagram of one embodiment of an output interface 2100 for an image compositor. Output interface 2100 is coupled to alpha blender from which it receives a blended output plane. In one embodiment, the warp engine, described below, may also be coupled to the same output interface 2100. After performing any necessary conversion operations, for one embodiment output interface 2100 routes blended output plane to a destination buffer (not shown) via memory interface 2110.

In one embodiment, alpha blender 1905 operates in a 32-bpp mode, but the destination frame buffer can be in formats other than RGB32 or YUV32. Consequently, the output interface 2100 converts the 32-bpp formats that alpha blender 1905 produces before outputting the resultant data to the destination frame buffer. Therefore, output interface 2100 includes color space converter (CSC) 2115 to convert pixels from one color space to another. As with CSC 2015 in input interface 1910, CSC 2115 can be implemented as a programmable unit to support various colorimetries.

Output interface 2100 also includes color compression unit 2120 to reduce pixels to less than 32-bpp if necessary. For example, when the destination plane uses a 16-bpp pixel format the color compression unit 2120 reduces the color depth by converting from 32-bpp to 16-bpp. In addition, in one embodiment, color compression unit 2120 includes dithering logic to support conversion pixel formats using an index mode (e.g., 4I, or 8I).

In an alternative embodiment, the pixel format that alpha blender 1905 operates in is programmable and therefore can be a 16-bpp format or a 32-bpp format. Consequently, for such an embodiment, the output interface 2100 only converts the blended plane if the desired output format is different from the format in which the blender has been programmed to operate.

To simplify the design of the output channel 2105, the number of output pixel formats can be reduced. For example, in one embodiment of the present invention, such as a closed system, where the output of the image compositor is to be processed by the display unit of the same hardware, the output pixel formats can be limited to those that are supported by the display unit. In an alternative embodiment, the output channel can be programmed to convert the output to any desired pixel format supported by the image compositor.

For one embodiment of the present invention, the output channel parameters are defined as in Table 3 below.

TABLE 3

| Parameter | Description |
| --- | --- |
| Format | Pixel format (see Table 1) |
| Base | Base address |
| Pitch | Vertical pitch |
| Width | Image width, in pixels |
| Height | Image height, in pixels |

In one embodiment, for the warp processor, described below, the output channel parameters in one embodiment are shown in Table 4.

TABLE 4

| Parameter | Description |
| --- | --- |
| format | Pixel format (see) |
| base | Base address |
| pitch | Vertical pitch |
| width | Image width, in pixels |
| height | Image height, in pixels |
| direction | Write direction |
| pre-mult | Output pixels are pre-multiplied |

In one embodiment, the destination plane pixels are in formats other than 32-bpp. Therefore, color compression is performed to reduce the color depth of each color component to match the output format. In one embodiment, the destination plane uses 16-bpp format and the color compression unit 2120 converts from 32-bpp to 16-bpp to reduce the color depth. In one embodiment where the output data is in an index mode, color dithering is performed to reduce the color. For example, in an eight-bit index mode, an embodiment of the CLUT has 28=256 colors only. Therefore, an output image having over 256 different colors is dithered to having only 256 or fewer colors.

Figure 22:
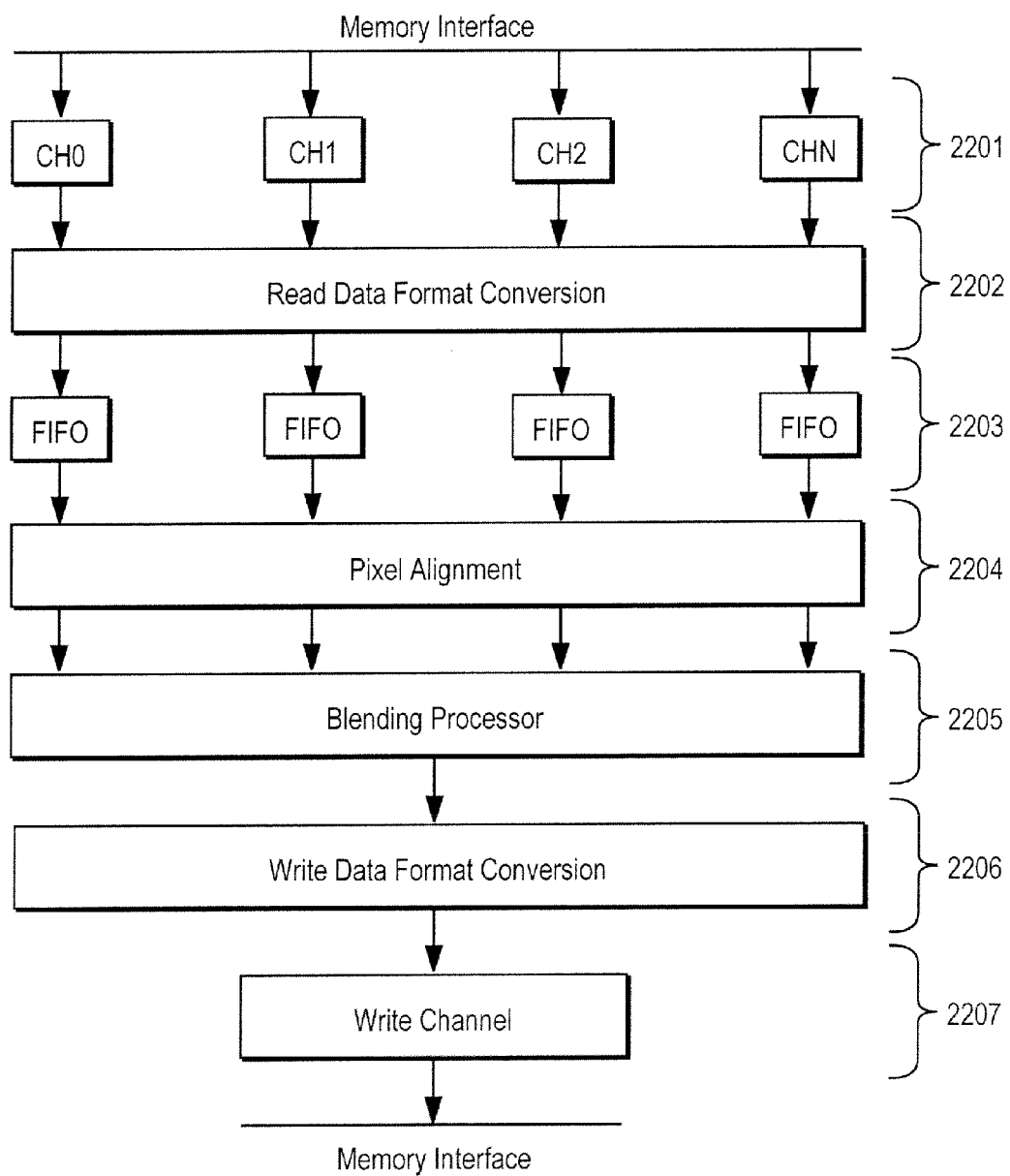
FIG. 22 illustrates a data flow diagram for one embodiment of a method of N-plane alpha blending.

FIG. 22 illustrates a data flow diagram for one embodiment of a method of N-plane alpha blending. At block 2201, the N planes are read from memory into the N channels of input interface 1910. At block 2202, the input interface 1910 of the image compositor performs the necessary pixel format conversion operations. At block 2203 the converted pixel data is routed to FIFOs where it is made available to the N-plane alpha blender.

At block 2204, source and destination planes are aligned by pixel size. For example, 8I formatted pixels may be aligned on any byte boundary, whereas YUV32 pixels are typically aligned on a 32 bit boundary. For one embodiment, pixel sizes for supported pixel formats can be 4 bits, 8 bits, 16 bits or 32 bits. Depending on the memory bus architecture, data fetched from memory may not necessarily be properly pixel aligned. For one embodiment, the input channels of the input interface do not perform full pixel alignment before feeding the blender. Instead, "valid" bits are used to indicate pixel validity. Disabled pixels are still computed but are masked out in the output channel, based on pixel validity information. This saves unnecessary shift logic, at the expense of minor computation penalty. In an alternative embodiment, pixel alignment is performed at the input interface using shift logic.

At block 2205, the alpha blending computation is performed. Alpha blending can occur in normal or reverse order. For example, in normal order the blending process begins by combining the bottom-most plane, plane 0, with the second bottom-most plane, plane 1, and then combining the result with the next order plane, plane 2, until the highest order plane, plane N, is reached. Alternatively, in reverse order the blending process begins by combining plane N with plane N−1, and then combining the result with plane N−2 until the lowest order plane is processed.

In a blending operation involving digital television, the bottom-most plane is normally a decoded video, refreshed at 30 fps. The graphics planes, however, are generally updated at a rate much less than 30 fps. For one embodiment, performing the final composition with live video at the very last stage saves bandwidth and memory. In the normal order blending case, this means skipping the bottom-most plane (e.g., plane 0), while for reverse order blending, the background plane, plane 0, is naturally the last plane to be blended.

In one embodiment, the normal order blending equations are defined as:

$$A_{k+1} = \begin{cases} (1 - \alpha_k)A_k + \alpha_k \cdot P_k & \text{if } \beta_k \neq 0 \\ \alpha_k \cdot P_k & \text{otherwise} \end{cases}$$

$$\beta_{k+1} = (1 - \alpha_k)\beta_k + \alpha_k$$

Where $A_k, P_k$ are the contents of the accumulator and the value of a pixel component, respectively at iteration k (note that k runs from 0 to N−1, and $A_0=0$, $\beta_0=0$), and $\beta_k, \alpha_k$ are the alpha accumulator and current pixel's alpha value, respectively.

Note that it is possible to eliminate the "α pre-multiply" stage by rearranging the blending equation as follows:

$$A_{k+1} = (1-\alpha_k)A_k + \alpha_k \cdot P_k = A_k + \alpha_k \cdot (P_k - A_k)$$

This second expression contains only one multiplication operation, but requires two additions and one multiplication in series, within the same clock cycle.

For the case of reverse order blending, the following equations apply:

$$A_{k+1} = A_k + \beta_k \cdot \alpha_k \cdot P_k$$

$$\beta_{k+1} = (1-\alpha_k)\beta_k + \alpha_k$$

Initially, $A_0 = 0$, $\beta_0 = 0$.

The blending equations above result in a pre-multiplied output plane. A pre-multiplied pixel is defined as a pixel that has its color components pre-multiplied by its alpha component. To convert back to a normal non-pre-multiplied pixel, each color component is divided by its alpha value. For one embodiment, this conversion is avoided in the hardware, as the logic to implement division is expensive. To handle both forms of input pixels, a "pre-multiplied" parameter is provided (e.g., as shown in Table 2) for each input channel to instruct the alpha blender to handle it accordingly.

For pre-multiplied input pixels, in the case of normal order blending, the above equations can be rewritten as:

$$A_{k+1} = \begin{cases} (1-\alpha_k)A_k + P_k & \text{if } \beta_k \neq 0 \\ P_k & \text{otherwise} \end{cases}$$

$$\beta_{k+1} = (1-\alpha_k)\beta_k + \alpha_k$$

and, in the case of reverse order blending:

$$A_{k+1} = A_k + \beta_k \cdot P_k$$

$$\beta_{k+1} = (1-\alpha_k)\beta_k + \alpha_k$$

Regardless of whether the alpha blender operates in normal or reverse order, in one embodiment the final composition takes the result of the blender and performs the final blending with video according to the following equation:

$$F = (1-\alpha) \cdot V + G$$

where V is the video plane, G is the output of the alpha blender and $\alpha$ is the per-pixel alpha value associated with G. In one embodiment, the final composition is executed in the display unit at the video refresh rate.

In one embodiment, when blending functions are performed in YUV space, color components have their bias subtracted before performing computations. However, the bias removal operation is bypassed when blending in an RGB domain. In the YUV space, the luma bias value is 16, whereas the chroma bias value is 128. In one embodiment, the logic is simplified by always removing the bias at the input interface 1910 and adding it back in at the output interface 1915 of the image compositor 1900. Because chroma values are initially unsigned 8 bit quantities, bias removal is accomplished by simply inverting the most significant bit. Unbiased chroma values are signed quantities (e.g., 8 bit, 1.7.0 format) and therefore are be handled accordingly in the arithmetic calculations.

For one embodiment of the present invention, the image compositor is implemented to support simple block copy (BLT) operations. In a BLT operation, original pixel values are propagated unmodified through the image compositor. Block copy operations are performed as normal alpha blending operations, using 255 as the alpha value. Furthermore, in one embodiment pixel formats are selected, regardless of the original formats, so as to prevent unwanted color conversions. If the hardware supports N number of input channels, then up to N copy operations may be performed at a time as long as they do not overlap.

Referring again to FIG. 22, at block 2206, the output of the blending operation is received at the output interface 2100 of the image compositor 1900. If necessary, the output interface 2100 converts the blended output plane to a desired output pixel format. At block 2207, the resulting converted and blended output plane is written to a destination buffer via a memory interface.

Figure 23:
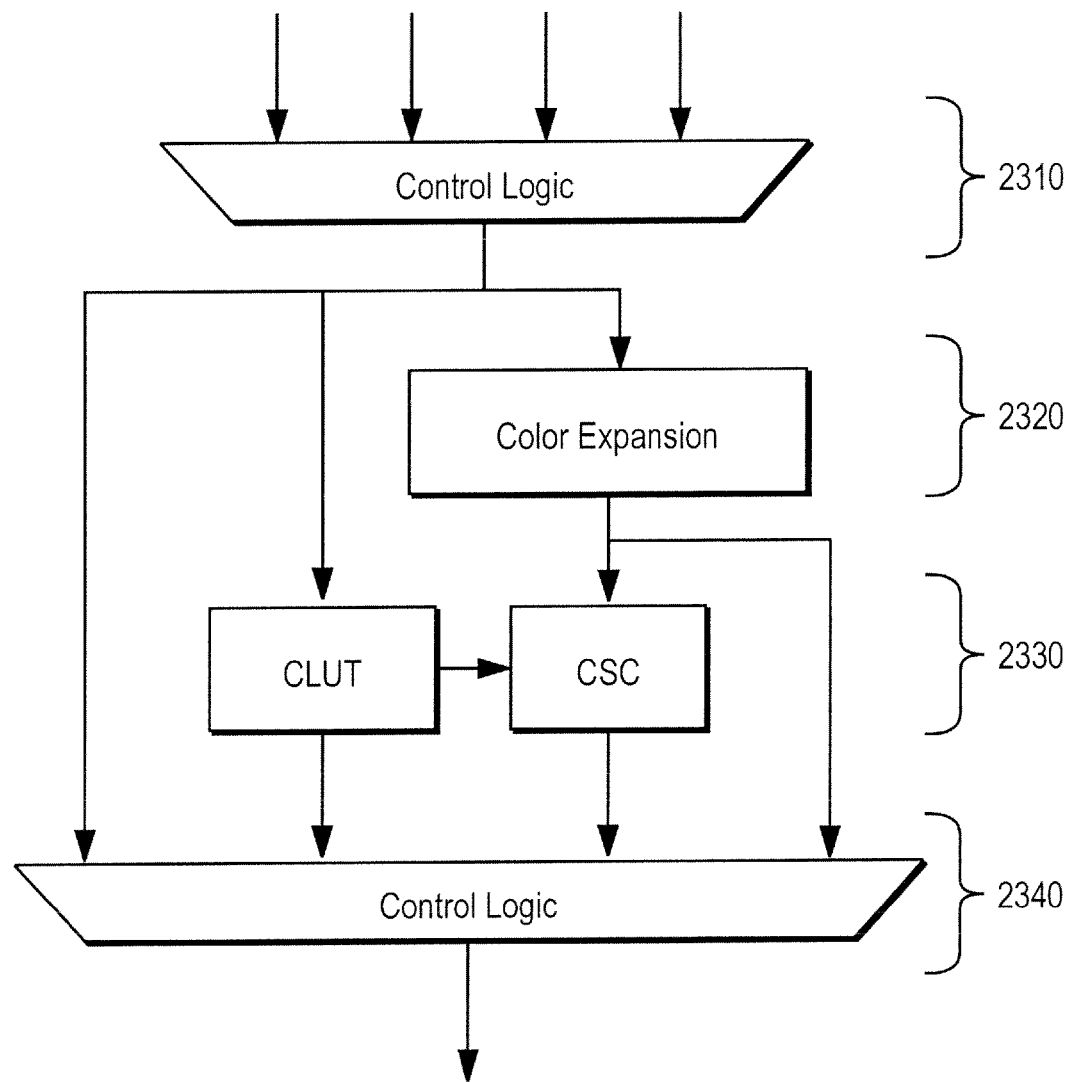
FIG. 23 illustrates a data flow diagram for one embodiment of a read data conversion operation for an N-plane alpha blender.
Figure 24:
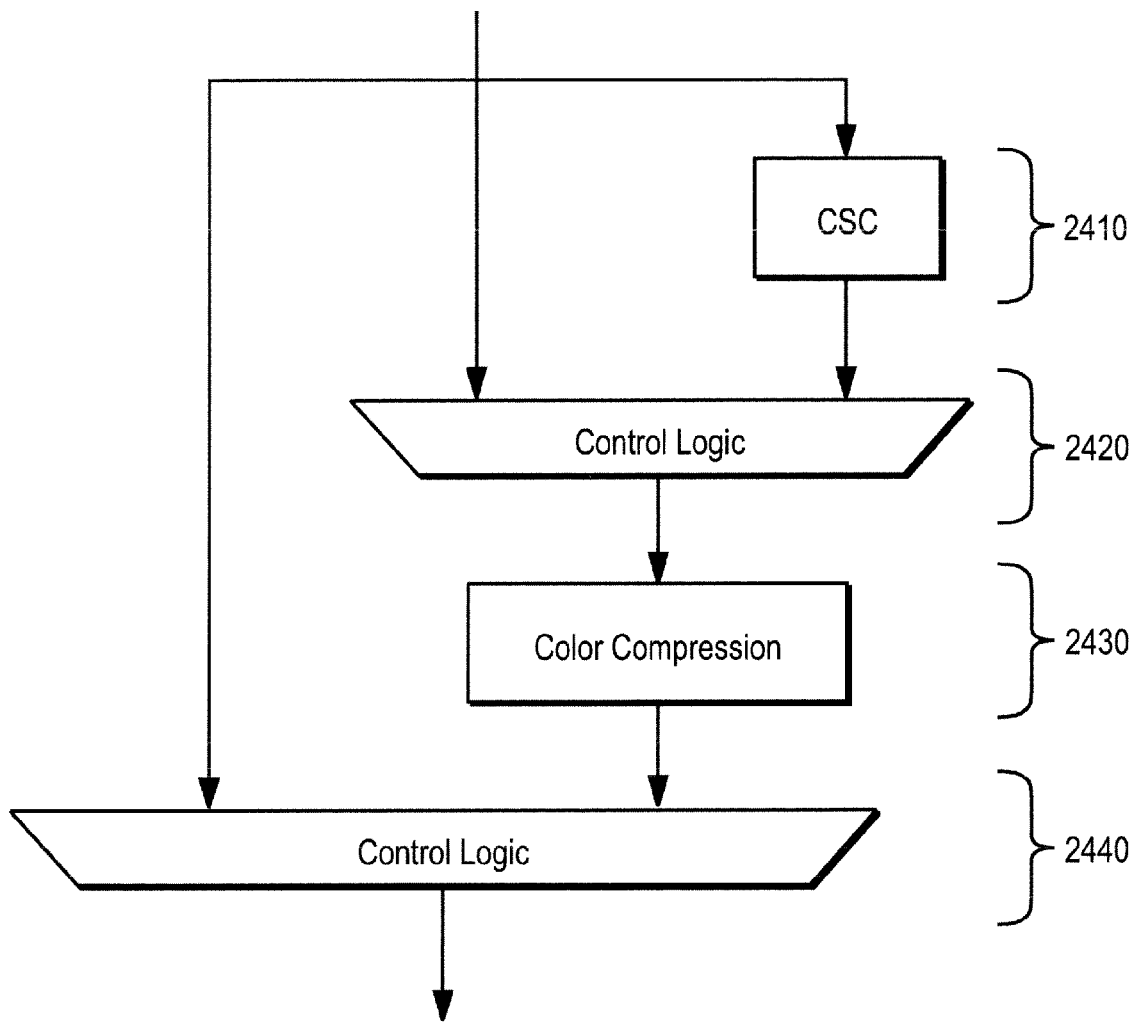
FIG. 24 illustrates a data flow diagram for one embodiment of a write data conversion operation for an image compositor.

FIGS. 23 and 24 illustrate data flow diagrams for on embodiment of a read data conversion and one embodiment of a write data conversion for an input interface 1910 and an output interface 2100, respectively. In FIG. 23, at block 2310 the path control logic receives the input parameters, in one embodiment from memory interface. The path control logic controls the reading of the N planes into the N channels of the input interface. Based on the input parameters received and the format of the N planes, the path control logic determines the data path for each plane at block 2310. For one embodiment, the path control logic routes the N planes in one of three paths. If a plane does not require any conversion, the plane bypasses the CSC and CLUT and is routed directly to the next path control logic, 2340. If the plane is received in a 16-bpp format, at block 2320, the plane is expanded to 32-bpp by the color expansion unit. If the plane uses pixel formats that are in index mode (e.g., 4I, or 8I), at block 2330 they are expanded to full 32-bpp formats by the CLUT. In one embodiment, CLUT is initialized to have the same color space as the common format used by the blender. If not, subsequent processing by the CSC unit is necessary. At block 2340, the path control logic controls the routing of the N planes to the N-plane alpha blender.

Similarly, FIG. 24 illustrates the data flow for a write data conversion operation for output interface. At block 2410, a blended output plane with a pixel format that requires color space conversion is converted by the CSC. The process then continues to block 2420.

At block 2440, a blended output plane with a pixel format that does not require color compression is received at the path control logic. At block 2430, the color compression unit compresses the pixels of a blended output plane, if necessary. Finally, at block 2440, the blended output plane is written to a destination frame in the desired pixel format.

Figure 25:
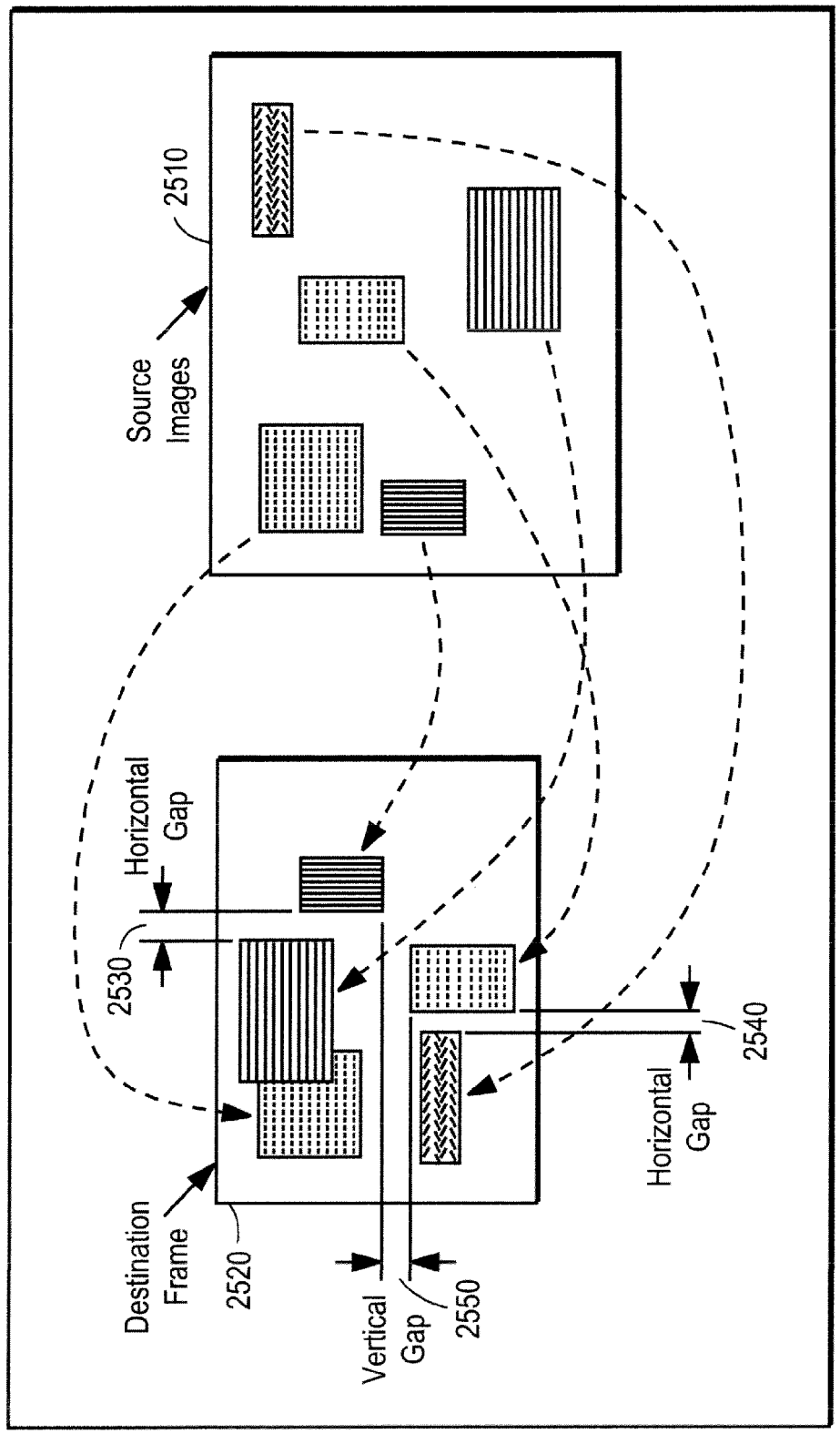
FIG. 25 shows a multi-plane image having vertical and horizontal gaps between planes for illustrating how one embodiment of gap detection processing can be implemented.

FIG. 25 illustrates a multi-plane image having vertical and horizontal gaps between planes. Source images 2510 are put through image compositor to create the destination plane 2520. While processing groups of pixels, in one embodiment the alpha blender control unit of image compositor continuously monitors for gaps 2530, 2540, and 2550. Gaps occur where certain destination areas do not have any sources. Horizontal gaps 2530 and 2540 can happen if some of the sources are no longer contributing to what remains from the current row, while others have not yet started contributing. Whenever a horizontal gap is detected, the hardware can optionally signal the host system to initiate a process to locate the closest source of pixels for the current row. This process involves comparing the current value in the column counter with the start column of all remaining active sources. Similarly, a vertical gap 2520 exists where an entire destination row is not intercepted by any of the sources. In one embodiment, a process to skip these rows can also be implemented to improve performance.

The image compositor can also be implemented to accelerate the blending operation by using tables. For one embodiment, the image compositor is programmable to be fully table driven. In a table driven implementation of the image compositor, programming of the alpha blender can be done offline and stored in memory. Consequently, there is no need for CPU interaction during the blending operation as configuration registers can be read straight from memory.

In one embodiment of the present invention, processing is minimized through the use of linked lists. For example, without a linked list mode, the image compositor uses the host system to initialize the input and output channels before each operation. This can be quite processor intensive if multi-pass operations are needed or real-time blending is required. In linked list mode, a linked list containing all the register values that need to be programmed eliminates the need for heavy interaction of the host system. Multiple blending operations can be built into a linked list and only at the completion of the whole linked list is the host system interrupted.

Warping

In one embodiment, the high definition television chip may further include a warp processor. An embodiment of the warp processor performs digital image warping using separable two-dimensional (2-D) transformations. In one embodiment, the warp processor performs multi-pass scan-line operations to render both graphics and video images. An embodiment of the warp processor includes a warp scaler to perform linear and non-linear sample rate conversions. Some examples of warp operations include scaling, rotation, and perspective.

One embodiment of a warp processor performs linear and non-linear sample rate conversions on incoming pixel streams, and writes the resulting streams back to memory. In one embodiment, the streams of pixels are consumed and generated at rates determined by the spatial mapping. In one embodiment, the warp processor and the N-plane alpha blender described above share a number of sub-components. In one embodiment, the similarly functioning elements are duplicated, to enable higher through-put.

Spatial mappings include 2-D transformations that can be decomposed into a sequence of 1-D transformations. In one embodiment, the 1-D transformations are orthogonal. Some warp operations involve two or more passes. In one embodiment, the first pass applies to the rows of the image and the second pass to the columns. In one embodiment, the result from the first pass is stored in memory for further processing in the subsequent pass.

In one embodiment, each input line may be read in rows or columns at different rates. However, column access is less efficient than row access because it generally takes longer to charge up a column address in a typical memory. One embodiment of the warp processor transposes the result of the row processing when writing the result to a memory at the end of the first pass, making the second pass another row operation.

In one embodiment, the output lines are generated at different rates. In one embodiment, the system buffers multiple output lines in a small buffer and transfers the output lines into a memory when the buffer is filled up. In one embodiment, the size of the buffer determines the number of lines to be processed simultaneously, and therefore, the number of input channels. In one embodiment, the size of the buffer is 256 bytes or 1 Kbytes.

Figure 26:
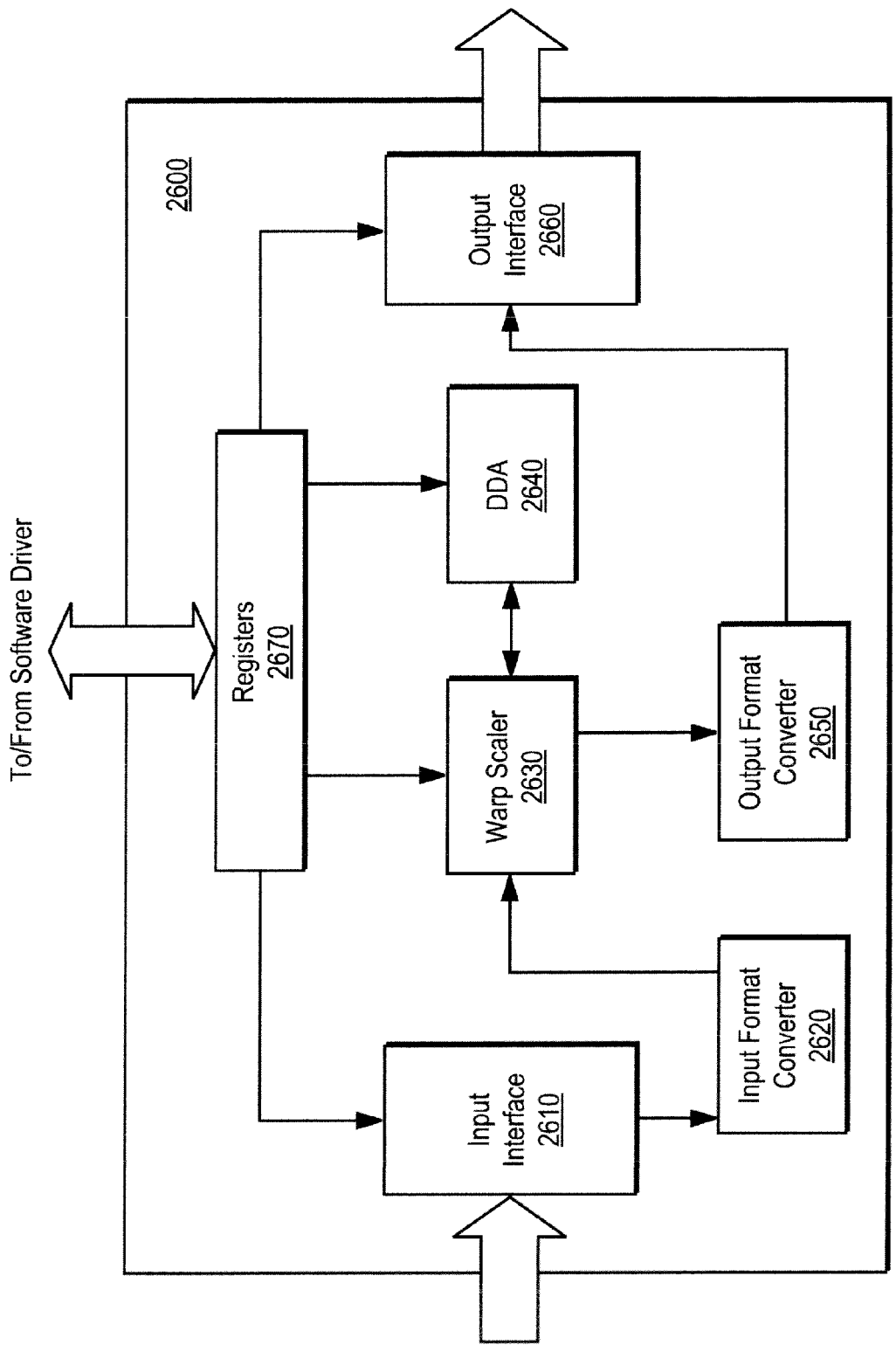
FIG. 26 shows a block diagram of an embodiment of a warp processor.

FIG. 26 shows an embodiment of a warp processor 2600. The warp processor 2600 includes an input interface 2610, an input format converter 2620, a warp scaler 2630, a digital differential analyzer 2640, an output format converter 2650, an output interface 2660, and a set of registers 2670. The input interface 2610 receives input data in pixels from a storage medium, such as, for example, a dynamic random access memory (DRAM), and forwards the data to the input format converter 2620. The input data is also referred to as the source stream, while the output data is referred to as the destination stream. The input format converter 2620 converts the data into the format adopted by the warp scaler 2630 (also known as the native format of the warp scaler 2630). The warp scaler 2630 is coupled to the digital differential analyzer (DDA) 2640.

An embodiment of the DDA 2640 computes pixel positions in the source and destinations streams and provides the pixel positions and phases to the warp scaler 2630. Using the pixel positions and phases from the DDA 2640, the warp scaler 2630 performs warping operations on the input data.

After processing the input data, the warp scaler 2630 outputs the processed data to the output format converter 2650 in one embodiment. The output format converter 2650 converts the output data into a format adopted by the display device (not shown) if necessary and then forwards the output data to the output interface 2660. The output data is sent to the display unit interface to be converted into television signals or stored into a memory, such as, for example, a DRAM.

To configure the warp processor 2600, a software driver (not shown) writes configuration parameters into the set of registers 2670. In one embodiment, the input interface 2610, the warp scaler 2630, the DDA 2640, and the output interface 2660 are configured by the registers 2670. For example, in one application, a television manufacturer can program a software driver to configure the registers 2670 to specify the input data format and the output data format, as well as the type of scaling or transformation to be performed.

To support various types of transformations and to reduce the number of passes, an embodiment of the warp processor reads and writes in opposite directions. FIG. 27A shows some examples of pixel scanning order for read operations. FIG. 27B shows some examples of pixel scanning order for write operations, which include vertical access capability to support transposing.

In one embodiment, the input planes of the input data to the warp processor are in various formats. The pixels in some formats contain an alpha value for each pixel and some do not. The alpha value of a pixel represents the degree of transparency of the pixel. For example, the range of an alpha value in one embodiment goes from 0 to 1, where 0 corresponds to being completely transparent and 1 corresponds to being opaque. In an alternate embodiment, the range of the alpha value goes from 0 to 255, where 0 corresponds to being completely transparent and 255 corresponds to being opaque. For pixels in formats that do not include an alpha value, a global alpha may be used. Moreover, the global alpha can also be used in one embodiment to replace the alpha value that comes with the input pixel.

In one embodiment, the input channels fetch consecutive lines from the source image. To receive an input image of any format, in one embodiment, the input channels converts the input data into the native format of the warp scaler. For example, one embodiment of the warp scaler 2630 adopts a native format of 32-bpp. Therefore, one embodiment of input channels converts the input data into 32-bpp. For example, a 16-bpp pixel is expanded to full 32 bits by shifting the bits in a pixel, as is known in the art.

To convert input data from one color space to another, an embodiment of the input channels includes a color space converter (CSC). In one embodiment, the CSC converts the input data from RGB to YUV because the warp scaler processes and outputs data in YUV. Alternatively, one embodiment of the CSC converts the input data from YUV to RGB because the warp scaler processes and outputs data in RGB. In one embodiment, the input channels share the same set of parameters as defined in Table 2 above.

One embodiment of input channels has soft-reset capability to halt operations before completion. In an alternate embodiment, input channels can be programmed to prevent actual image fetches from a memory with color fill. When color fill is activated, the corresponding channel will output the programmed color and/or alpha fill value in place of the input pixel value in the memory. In another embodiment, the alpha value of an input pixel is multiplied by a global alpha when alpha scale is enabled.

In one embodiment, the warp processor reads pixels from left to right. Alternatively, the pixels are read and reordered from right to left in a buffer temporarily before forwarding to the warp processor when the direction parameter is set. One embodiment includes a vertical pitch parameter. When the vertical pitch parameter is negative, the higher numbered lines are read first.

In one embodiment, each pixel from an input channel goes through the CSC if the pixel is in a different color space from the warp processor's setting. One embodiment of the CSC performs the RGB to YUV, which is also known as $YC_bC_r$, color conversion as described above with respect to N-plane alpha blending.

In one embodiment, the warp operations are performed in the YUV domain, and therefore, input in RGB format is converted into YUV format before warping. Likewise, in an alternative embodiment, the input data in YUV format is converted into RGB format before warping is performed in the RGB domain. One embodiment of the equations that may be used are described above with respect to N-plane alpha blending.

In one embodiment, the CSC is hardwired to support the conversion of data to a particular color space, such as, for example, RGB. In an alternate embodiment, the CSC is programmable to support the conversion of data to different color spaces. In another embodiment, the CSC converts data to a different calorimetric standard, for example, HDTV colorimetry, ITU-R BT.709. For example, to support a display device limited to inputs in RGB, an embodiment of the CSC is programmed to convert signals in other color spaces, such as, for example, YUV, into signals in RGB.

In one embodiment, pixels not in 32-bit format are expanded to the full 32 bits before further processing in 32-bit format. Expansion of color components is carried out in one embodiment by simple arithmetic shift. For example, a 6-bit value is expanded to an 8-bit value by shifting the bits to the left and appending two 0's to the right. In an alternate embodiment, color components can be expanded by more elaborate schemes, such as, for example, determining the additional bits based on the existing bits.

In one embodiment, an implicit alpha value is added to a pixel when the pixel does not come with an alpha value. The implicit alpha value is 255 in one embodiment where the range of the alpha is from 0 to 255. In an alternate embodiment, the global alpha value can override the alpha of the input pixel.

Figure 28A:
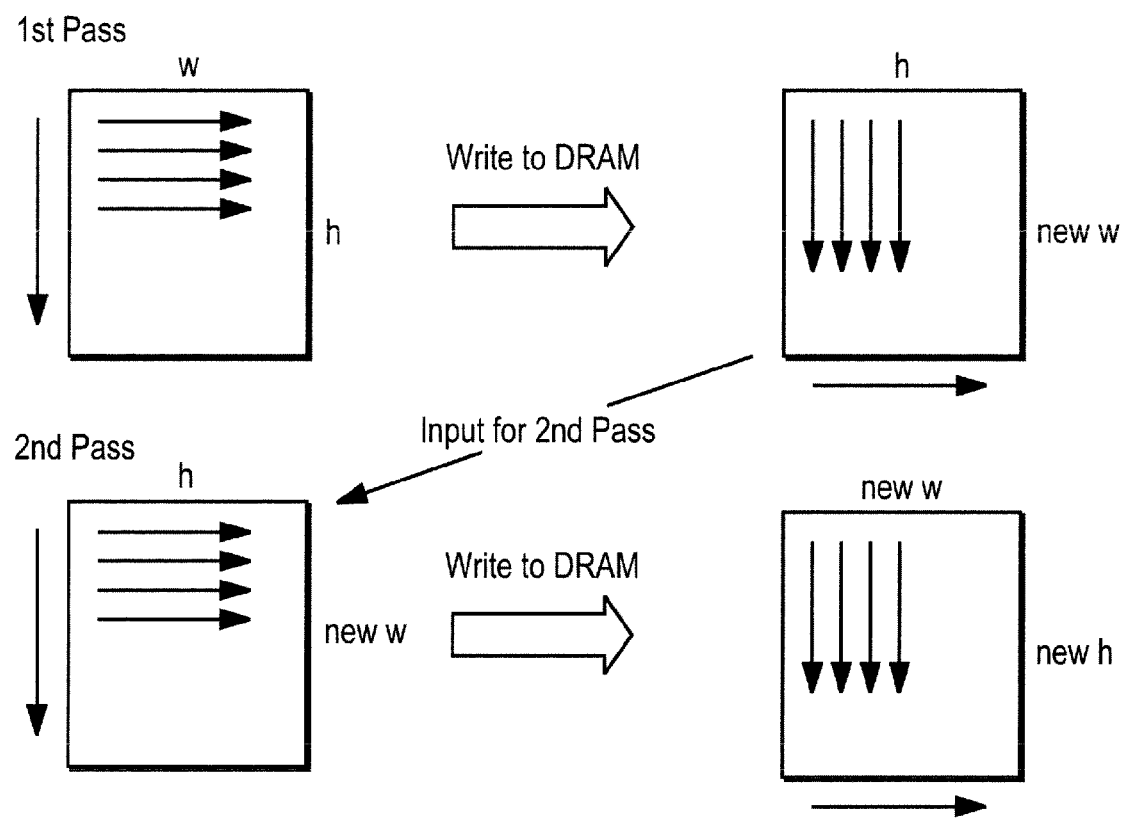
FIG. 28A shows an example of pixel scanning order in an embodiment of scaling.
Figure 28B:
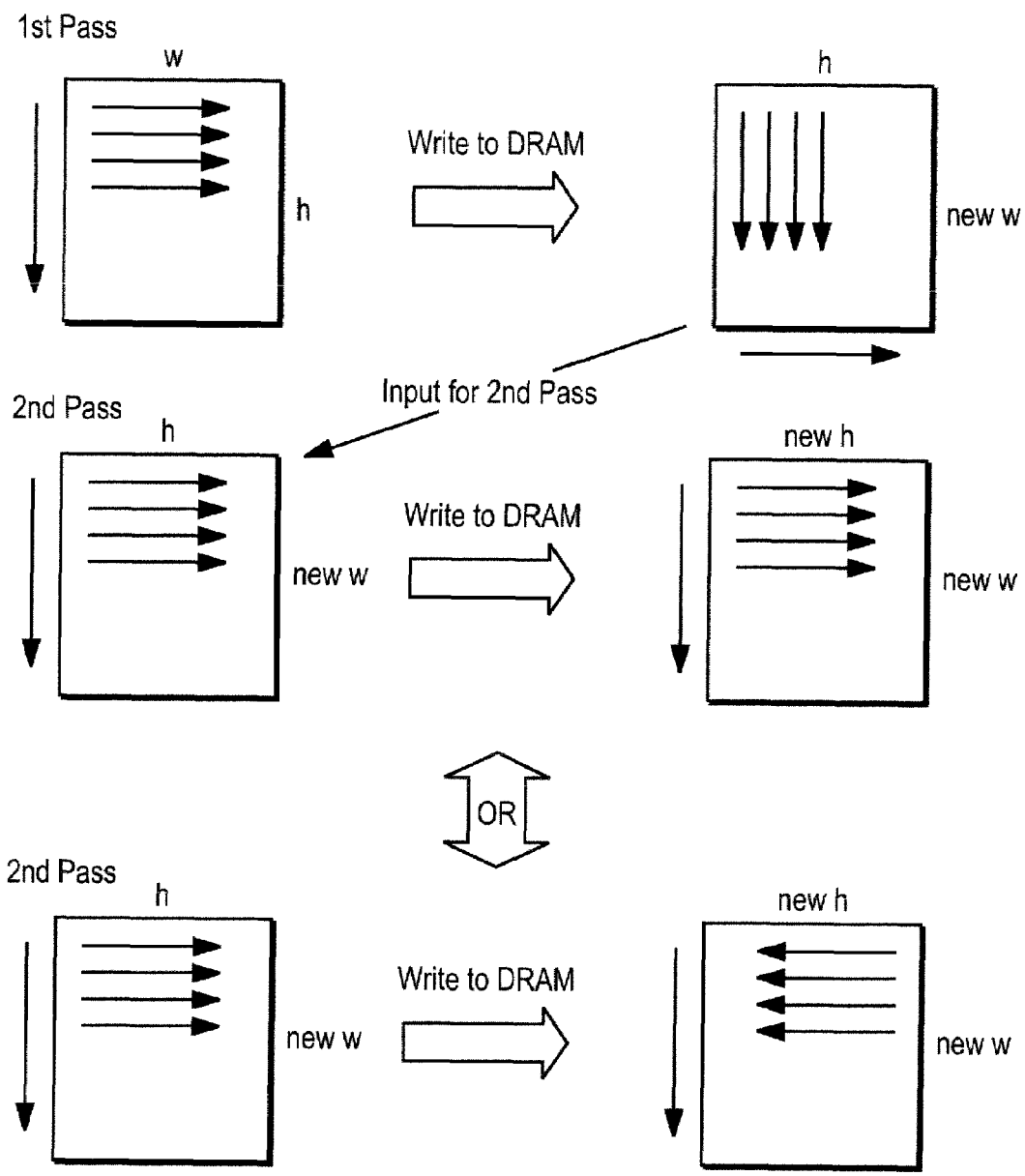
FIG. 28B shows another example of pixel scanning order.

In one embodiment of the warp processor, the transformations performed are separable. The rows and columns are processed separately in two or more passes. FIG. 28A shows one embodiment of the pixel scanning order. In an embodiment of a scaling operation, for instance, the process first scales the input image horizontally and then stores the result vertically into a temporary memory. During the second pass, the intermediate result is read from the temporary memory horizontally and then scaled and written vertically. An example of horizontal write is shown in FIG. 28B. In one embodiment, output pixels are stored into memory horizontally either from left to right or right to left.

The output channel buffer in one embodiment holds the pixels to be written into a memory vertically. Once the output channel buffer contains the whole vertical patch of data, it is stored into memory as a block in one embodiment.

Pixel reordering is also performed in the output channel buffer in one embodiment. Source and destination pixels are aligned according to pixel size. For example, pixels in 8I format may be aligned on any byte boundary, whereas pixels in YUV32 are aligned on 32-bit boundary. Pixel sizes for supported pixel formats can be 4 bits, 8 bits, 16 bits, or 32 bits, in one embodiment. Data fetched from memory is not necessarily pixel aligned, depending on memory bus architecture. For instance, for a memory bus that sends data in 64 bits at a time, data is aligned on 8-byte boundary, in one embodiment.

In one embodiment, the input channels do not perform full pixel alignment before forwarding the data to the warp processor. Instead, one or more valid bits are used to indicate pixel validity. One embodiment of the warp processor skips invalid incoming pixels. Furthermore, the output channel may use the valid bits to communicate with the memory controller to prevent invalid pixels from being written into the memory.

Figure 29:
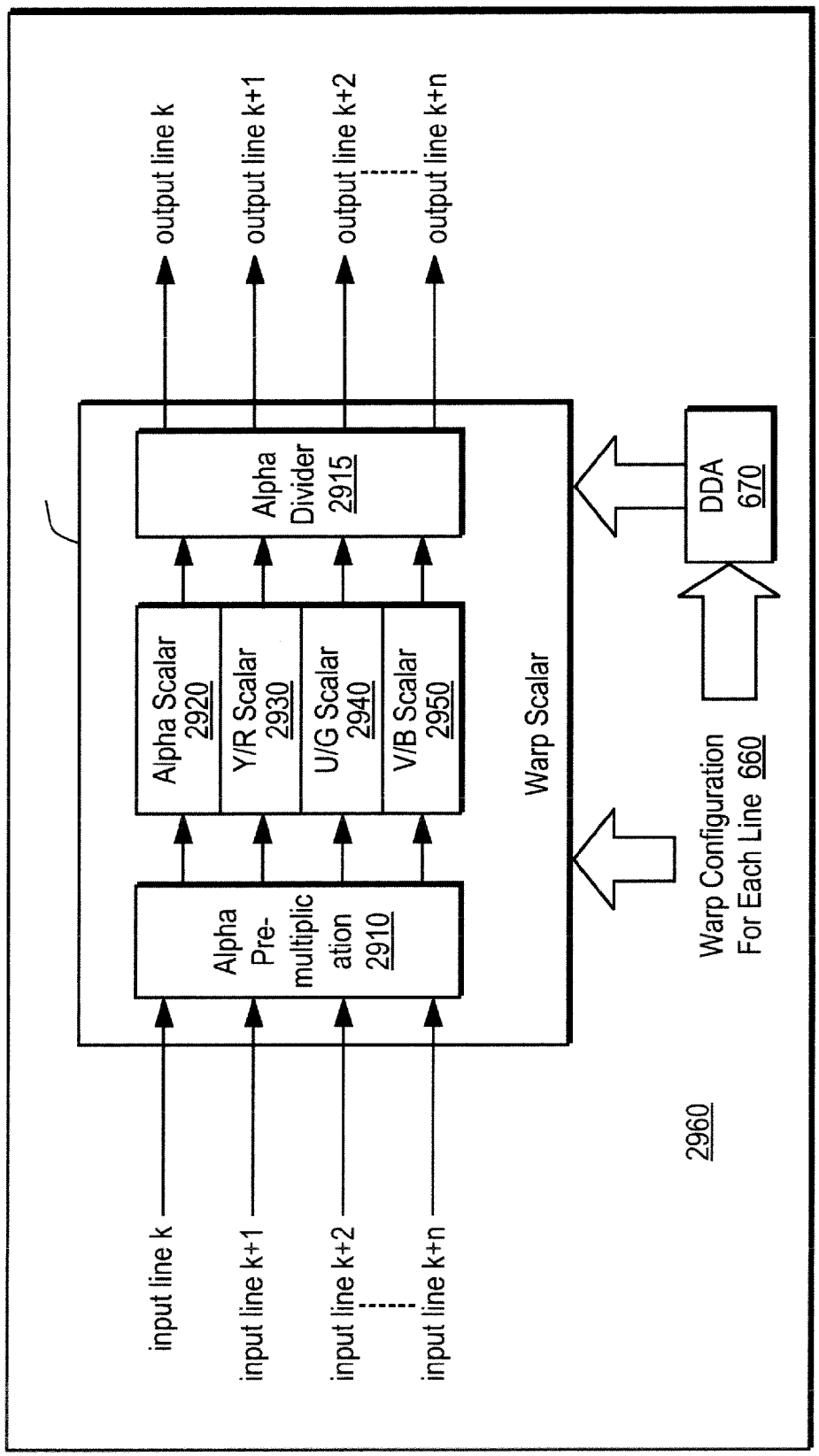
FIG. 29 shows an embodiment of warp scaler.

FIG. 29 shows an embodiment of a warp scaler 2900. The warp scaler 2900 includes an alpha pre-multiplication unit 2910, an alpha divider 2915, an alpha scaler 2920, and three scalers 2930, 2940, and 2950. In one embodiment, the alpha pre-multiplication unit 2910 receives lines of input data. In one embodiment, the input data may be in RGB or YUV format. The alpha pre-multiplication unit 2910 outputs the pre-multiplied data to the scalers 2920-2950. The scaler 2910 scales the alpha value of an incoming pixel and outputs the scaled alpha value. The scalers 2930-2950 perform scaling operations on the corresponding components of the input data and output the scaled components. For example, the scalers 2930, 2940, and 2950 scale the Y, U, and V components of a pixel respectively in one embodiment. In one embodiment, the scalers 2930, 2940, and 2950 scale the R, G, B components of a pixel respectively. In one embodiment, the outputs from the scalers 2920-2950 are forwarded to a divider 2915 to be divided when the input pixel is pre-multiplied but the output does not need pre-multiplication. The warping operations performed are based on the warp configuration 2960 for each line in one embodiment.

One embodiment of the warp processor transforms 2-D images in multiple passes by decomposing the mapping into a sequence of orthogonal one-dimensional (1-D) transformations. In one embodiment, the geometric transformations used for this approach are separable. An example of separable transformations is a rectangular scaling. In one embodiment, the scalers 2920-2950 scale the rows in a first pass and then the columns in a second pass. In one embodiment, the intermediate result from the first pass is transposed when stored in a temporary storage to eliminate the need to fetch data in columns during the second pass. One embodiment of the scaler uses the data transposing technique to perform image rotation and perspective transformation. The technique of performing a warping transformation in two or more passes allows more complicated warping transformations, such as rotation and perspective transformations, to be performed in television related applications with a small internal memory.

An example of image rotation is shown below. An embodiment of a rotation matrix is given as:

$$[x\ y] = [u\ v]\begin{bmatrix} \cos\theta & \sin\theta \\ -\sin\theta & \cos\theta \end{bmatrix}$$

The vectors [x y] and [u v] are output and input coordinates respectively. The first pass equation resulted from the above matrix is:

$$x = u\cos\theta - v\sin\theta$$

During the first pass, one embodiment of the scaler holds v constant and scans the row. This results in an image that is skewed and scaled along the horizontal scanlines. In one embodiment, the second pass operates on the intermediate result from the first pass while holding x constant. The y equation can be expressed as:

$$y = \frac{x\sin\theta + v}{\cos\theta}$$

This final result from the second pass is a rotated image by θ degree. One embodiment of the perspective transformation is defined as:

$$[x\ y\ z] = [u\ v\ 1]\begin{bmatrix} a & d & g \\ b & e & h \\ c & f & i \end{bmatrix}$$

The input and output coordinates are [u v 1] and [x y z] respectively. In the first pass, an embodiment of the scaler evaluates the new x values by holding v constant, yielding:

$$x = \frac{au + bv + c}{gu + hv + i}$$

Similarly, solving the equations above for y in the second pass yields:

$$y = \frac{dC + ev + f}{gC + hv + i},$$

where $$C = \frac{b - hu}{gu - a}v + \frac{c - iu}{gu - a}$$

One embodiment of the scaler uses a constantly changing scale factor throughout a scanline. After each pass, each pixel is mapped to the output in a nonlinear fashion. The scale factor indicates the ratio between the input and the output. In one embodiment of perspective transformation, the ratio between the input and the output is proportional to the viewing distance or depth, represented by z in the equation above.

The inverse scale factor, i.e., old size/new size, indicates the number of input pixels contributed to an output pixel. The inverse mapping where each output pixel is mapped back to the input is used to calculate the inverse scale factors in one embodiment of warping. The warping includes non-linear forward mapping in one embodiment.

To calculate the inverse mapping for perspective transformation in one embodiment, a perspective transformation matrix is used. An example of the perspective transformation matrix is given below:

$$\begin{bmatrix} a & d & g \\ b & e & h \\ c & f & i \end{bmatrix}$$

In the first pass, operations represented by the following equations are performed:

$$x = \frac{au + bv + c}{gu + hv + i}$$

$$c_1 = bv + c$$

$$c_2 = hv + i$$

$$x = \frac{au + c_1}{gu + c_2}$$

$$u = \frac{c_1 - xc_2}{xg - a}$$

For each output pixel x, the corresponding input index, u is calculated. The inverse scale factor for the output pixel x[n] is u[n+1]−u[n] in one embodiment.

In the second pass, operations represented by the following equations are performed:

$$y = \frac{du'ev + f}{gu' + hv + i}$$

$$u' = \frac{b - hu}{gu - a}v + \frac{c - iu}{gu - a}$$

$$c_3 = \frac{b - hu}{gu - a}$$

$$c_4 = \frac{c - iu}{gu - a}$$

$$c_5 = f + dc_4$$

$$c_6 = i + gc_4$$

$$c_7 = h + gc_3$$

$$c_8 = e + dc_3$$

$$y = \frac{d(vc_3 + c_4) + ev + f}{g(vc_3 + c_4) + hv + i}$$

$$v = \frac{f + dc_4 - y(i + gc_4)}{y(h + gc_3) - (e + dc_3)}$$

$$v = \frac{c_5 - yc_6}{yc_7 - c_8}$$

In one embodiment, there is a corresponding v for each pixel y. As a result, the inverse scale factor for the output pixel y[n] is v[n+1]−v[n].

Based on the above equations, the corresponding input pixel u corresponding to an output pixel x is:

$$u = \frac{c_1 + c_2 \cdot x}{c_3 + c_4 \cdot x}$$

Therefore, $$\frac{du}{dx} = \frac{c_2 c_3 - c_1 c_4}{(c_3 + c_4 \cdot x)^2}$$

One embodiment of the DDA is used to compute pixel positions within the source and destination streams. The pixel positions computed are forwarded to a warp scaler to be used in the warp operations. The warp scaler is discussed in more details in the following section. An embodiment of the DDA converts a function relating the input and output pixel coordinates to a set of parametric equations, as shown in the differential equation above. In one embodiment, the DDA computes the numerator and denominator components of the differential equation at each block and uses the results in evaluating the condition for incrementing the source and/or destination pixel positions.

One embodiment of the warp scaler handles both affine transformations as well as non-affine transformations. Affine transformations are characterized by a constant scale factor. In contrast, non-affine transformations are characterized by a scale factor that may vary from pixel to pixel. In this case, the inverse mapping function as described above is used to calculate new scale factors on the fly for non-affine transformations in one embodiment.

Referring to FIG. 29, each of the scalers 2920-2950 is a resampling filter in one embodiment. In an alternate embodiment, each of the scalers 2920-2950 includes a resampling filter as well as other circuits. The output pixel position from the DDA determines the phase of the resampling filters. In one embodiment, each of the scalers 2920-2950 is a Fant filter. The Fant filter can be extended to handle non-linear resampling, where the scale factor may vary from pixel to pixel. A multi-tap polyphase filter may be used in an alternate embodiment. Alternatively, instead of the three scalers 2920-2950, a single scaler, running at least three times as fast as the three scalers 2920-2950, is used in one embodiment to scale all three color components, e.g., Y, U, and V components, to match the throughput of the three scalers 2920-2950.

In one embodiment, the color components of an input pixel, including the alpha channel, are scaled. In an alternate embodiment, the input pixel is pre-multiplied. Pre-multiplication involves multiplying each color component of a pixel by the alpha value of the pixel. Likewise, division involves dividing each color component of a pixel by the alpha value of the pixel. If both the input pixel and the output pixel are not pre-multiplied, then pre-multiplication is skipped, in one embodiment. Likewise, if both the input pixel and the output pixel are pre-multiplied, then division is skipped. If the input pixel is not pre-multiplied but the output is, then pre-multiplication is performed on the input pixel before the actual scaling in one embodiment. In contrast, if the input pixel is pre-multiplied but the output does not have to be pre-multiplied, then division is performed on the scaled pixel before being output.

In one embodiment, the color components of an input pixel may be biased. Since warp operations performed in YUV (also known as $YC_bC_r$) space uses unbiased pixels, one embodiment of the warp processor subtracts the bias of each component of a pixel before warping. In one embodiment, the luma bias value is 16, whereas the chroma bias value is 128. One embodiment removes the bias in the input channels and adds the bias back in the output channel unit. In one embodiment, warping is performed in RGB space, and therefore, it is not necessary to remove the bias.

In one embodiment, the chroma values are initially unsigned eight-bit quantities, and therefore, bias is removed by inverting the most significant bit of the eight-bit value. In an alternate embodiment, unbiased chroma values are signed eight-bit quantities, and the unbiased luma values are signed nine-bit quantities.

Figure 30:
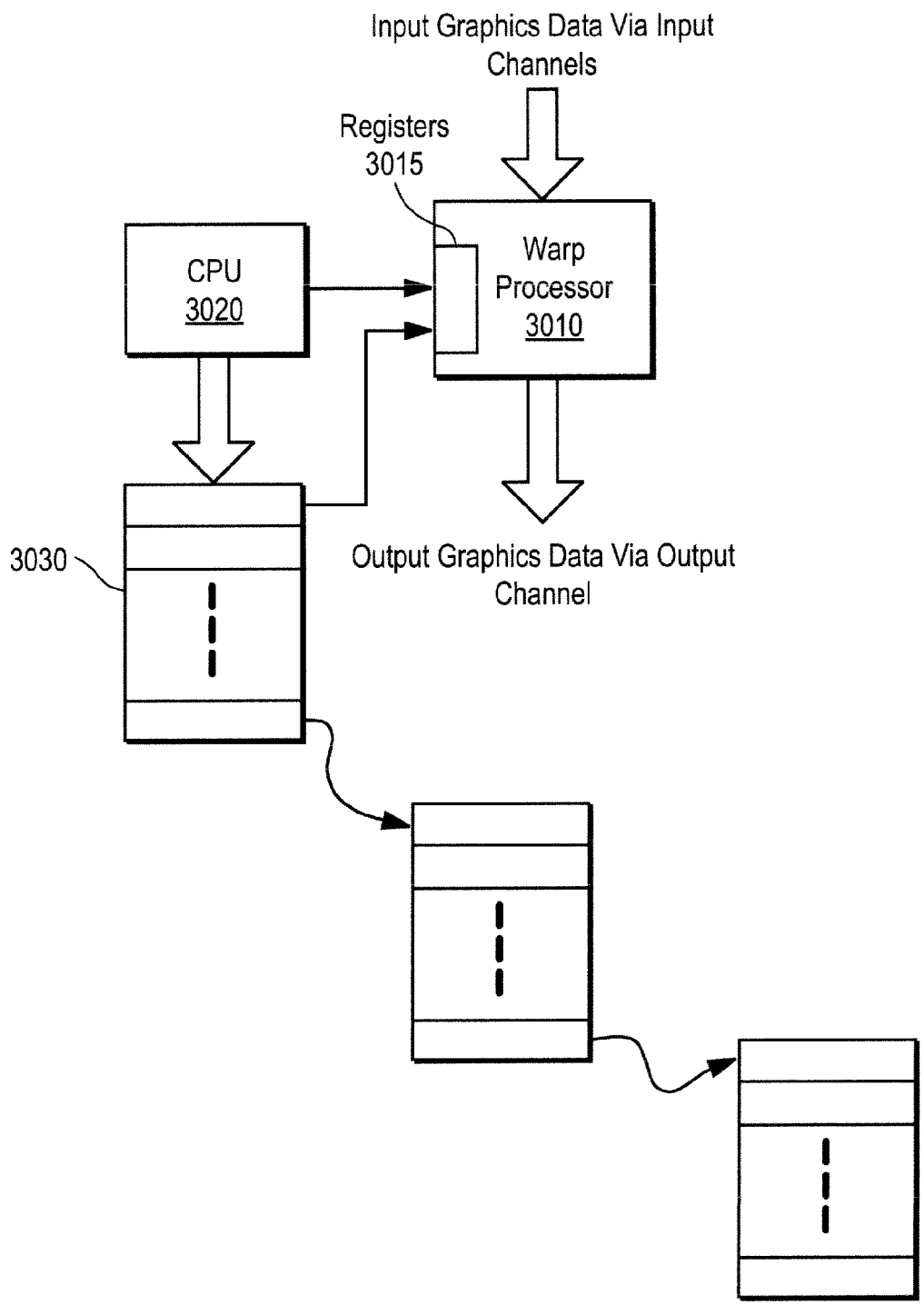
FIG. 30 shows an embodiment of a graphics and video system.

FIG. 30 shows one embodiment of a the relationship of the warp processor to a high definition television controller. The system 3000 includes a warp processor 3010, a central processing unit (CPU) 3020, and a memory 3030 to store one or more linked lists. The memory 3030 includes a DRAM in one embodiment. In one embodiment, the CPU 3020 initializes the input and output channels. The CPU may also compute the warp configuration parameters for each line of the input image data in one embodiment. In one embodiment, the configuration parameters for each line are stored in a linked list. The linked list may be stored in the memory 3030 and the warp processor 3010 retrieves the linked list from the memory 3030. Alternatively, the CPU 3020 writes to the registers 3015 before each warp operation. Multiple warp operations can be constructed into the linked list. Therefore, once the warp processor 3010 receives the linked list, the CPU 3020 does not have to intervene during the execution of the linked list by the warp processor 3010 in one embodiment. Furthermore, the CPU 3020 can start constructing another linked list while the warp processor 3010 is running one linked list. In one embodiment, when all entries in the linked list are exhausted, the CPU 3020 is interrupted to decide the next course of action.

In one embodiment, software may be used to facilitate the methods of the present invention, and may be embodied onto a machine-readable medium. A machine-readable medium includes any mechanism that provides (e.g., stores and/or transmits) information in a form readable by a machine (e.g., a computer). For example, a machine-readable medium includes read only memory (ROM); random access memory (RAM); magnetic disk storage media; optical storage media; flash memory devices; DVD's, electrical, optical, acoustical or other form of propagated signals (e.g., carrier waves, infrared signals, digital signals, EPROMs, EEPROMs, FLASH, magnetic or optical cards, or any type of media suitable for storing electronic instructions. Slower mediums could be cached to a faster, more practical, medium. The present invention may be embodied in firmware logic. In one embodiment, the present invention may be implemented in hardware, by using, for example, an application specific integrated circuit (ASIC). In one embodiment, the present invention may be embodied in a decoder chip. In one embodiment, the present invention may be embodied in a set-top box. In one embodiment, the present invention may be embodied in a television set.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A controller system comprising:
   a plurality of modules sharing a memory to perform high definition and standard definition television processing functions; and
   a memory bus architecture to couple the plurality of modules with the memory, comprising:
      a plurality of buses, wherein low latency low bandwidth and high latency high bandwidth requests are handled by separate buses of the plurality of buses, wherein more than two of the plurality of modules are coupled by more than one of the plurality of buses, and wherein each of the more than one of the plurality of buses is at a different clock speed.

2. The system of claim 1, wherein the controller system supports multiple television standards including: ATSC, DVB, AES, SMTE, ITU, and ARIB.

3. The system of claim 1, wherein the plurality of buses comprises:
   a first set of busses handling requests from a central processing unit (CPU); and
   a second set of busses handling requests from image manipulation modules.

4. The system of claim 1, further comprising:
   a bus bridge to translate different system bus protocols and to enable functional partitioning of the controller into two parts.

5. The system of claim 4, further comprising:
   a bus arbitrator, to handle one part of the controller according to the bus bridge based on multiple priority levels.

6. The system of claim 4, further comprising:
   a synchronization logic in the bus bridge using an unsigned binary counter.

7. The system of claim 1, further comprising:
   a universal local bus interface to transfer data bytes from a plurality of peripheral devices to the memory the universal local bus interface to provide access to the plurality of devices, the devices able to have different protocols.

8. The system of claim 7, further comprising:
   a sequencer to store a plurality of elementary protocol building blocks, and to execute an individual protocol by combining the elementary protocol building blocks.

9. The system of claim 7, further comprising:
   an execution unit to change an address when the local bus interface accesses a device over multiple cycles.

10. The system of claim 7, further comprising:
    a peripheral device connector including a host to update microcode in the universal local bus interface to provide support for a peripheral device coupled to the peripheral device connector.

11. The system of claim 1, further comprising:
    a graphics input to receive graphics data based on an external clock domain; and
    the system to generate video data on an internal clock domain associated with the different clock speed; and
    a rate conversion logic to convert data from the external clock domain to an internal clock domain.

12. The system of claim 11, further comprising:
    phase locked loop to use transport stream program clock reference to generate a pixel clock, provided to an external graphics chip, the external graphics chip to use this clock to output graphics.

13. The system of claim 12, further comprising:
    the external graphics chip providing a regenerated pixel clock with data back to the chip, the regenerated pixel clock being synchronous with a video.

14. The system of claim 11, further comprising:
    high definition video capture unit to receive graphics pixel input, and output external graphics data.

15. The system of claim 11 further comprising:
    a display processor to combine the external graphics data with the video data.

16. The system of claim 15, further comprising:
    the display processor to perform color space conversion and to output a composite graphics channel.

17. The system of claim 11, further comprising:
    a display processor to convert data from ARIB format by using 12× pixel duplication.

18. The system of claim 1, further comprising:
    an image compositor for combining a plurality of images from the memory, the images comprising video and/or still pictures.

19. The system of claim 18, wherein the image compositor comprises an N plane alpha blending engine.

20. The system of claim 19, further comprising:
    an input interface to receive N planes in one of a plurality of pixel formats and to convert the N planes to a common pixel format; and
    the N-plane alpha blender to generate a blended output plane from the N planes based on alpha values associated with the pixels of each plane.

21. The system of claim 20, wherein the input interface includes an input channel programming interface to receive a global alpha value and the N-plane alpha blender generates a blended output plane from the N planes using the global alpha value.

22. The system of claim 20, wherein the N-plane alpha blender is programmable to process the N planes in either normal or reverse order.

23. The system of claim 18, wherein the input interface includes one or more of the following: a color expansion logic to expand pixel data for a plane having a native pixel format different from the common pixel format;
a color space converter logic to convert the color space of a plane; and
a color lookup table logic to expand the color index of a plane that has a native pixel format different from the common pixel format.

24. The system of claim 1, further comprising:
a warp processor to perform digital image warping on digital images retrieved from the memory using a plurality of two-dimensional transformations.

25. The system of claim 24, further comprising:
a warp processor to decompose the plurality of two dimensional transformations into a sequence of one dimensional transformations.

26. The system of claim 25, wherein the one-dimensional transformations are orthogonal.

27. The system of claim 24, further comprising:
the warp processor to transpose results of a row operation when writing results to a memory, in a multi-pass process, such that the second pass is also a row operation.

28. A method for sending request data in a memory bus architecture coupling a plurality of modules with a memory to perform high definition and standard definition television processing functions, the method comprising:
transmitting a low latency low bandwidth request through a first bus; and
transmitting a high latency high bandwidth request through a second bus, wherein the memory bus architecture includes the first bus and the second bus, wherein the first bus and the second bus are separate buses in the memory bus architecture and wherein the first bus and the second bus are clocked at two or more different clock speeds.

29. The method of claim 28, wherein the low latency low bandwidth request is a cache line refill request from a CPU (Central Processing Unit).

30. The method of claim 28, wherein the high latency high bandwidth request is block memory access request.

31. The method of claim 28, wherein the low latency low bandwidth request is associated with uni-direction control programming from a control module to a processing module of the plurality of modules.

32. A apparatus for sending request data in a memory bus architecture coupling a plurality of modules with a memory to perform high definition and standard definition television processing functions, the apparatus comprising:
means for transmitting a low latency low bandwidth request through a first bus; and
means for transmitting a high latency high bandwidth request through a second bus, wherein the memory bus architecture includes the first bus and the second bus, wherein the first bus and the second bus are separate buses in the memory bus architecture and wherein the first bus and the second bus are clocked at two or more different clock speeds.

33. The apparatus of claim 32, wherein the low latency low bandwidth request is cache line refill requests from a CPU.

34. The apparatus of claim 32, wherein the high latency high bandwidth request is block memory access requests.

35. The apparatus of claim 32, wherein the low latency low bandwidth request is associated with uni-direction control programming from a control module to a processing module of the plurality of modules.

* * * * *